(12) United States Patent
Noble et al.

(10) Patent No.: US 8,052,166 B2
(45) Date of Patent: Nov. 8, 2011

(54) TIE-PLATE AND FRAME HANGER OF A SUSPENSION ASSEMBLY

(75) Inventors: Shawn D. Noble, Naperville, IL (US); Michael P. Robinson, Chicago, IL (US); Hormoz Kerendian, Buffalo Grove, IL (US); Ashley T. Dudding, Yorkville, IL (US)

(73) Assignee: Hendrickson USA, LLC., Itasca, IL (US)

( * ) Notice: Subject to any disclaimer, the term of this patent is extended or adjusted under 35 U.S.C. 154(b) by 94 days.

(21) Appl. No.: 12/545,828

(22) Filed: Aug. 22, 2009

(65) Prior Publication Data

US 2010/0044992 A1 Feb. 25, 2010

Related U.S. Application Data

(63) Continuation-in-part of application No. 12/334,195, filed on Dec. 12, 2008, and a continuation-in-part of application No. 12/045,069, filed on Mar. 10, 2008, now Pat. No. 7,926,836.

(51) Int. Cl.
*B60G 5/00* (2006.01)

(52) U.S. Cl. ............. 280/681; 280/124.11; 280/124.178

(58) Field of Classification Search .................. 238/287; 267/140.4, 141.1, 141.2; 280/676, 677, 679, 280/681, 124.11, 124.116, 124.178
See application file for complete search history.

(56) References Cited

U.S. PATENT DOCUMENTS

| | | | |
|---|---|---|---|
| 1,409,044 A | 3/1922 | Tusar | |
| 1,516,051 A | 11/1924 | Lundie | |
| 1,604,961 A | 11/1926 | Bell et al. | |
| 1,608,507 A | 11/1926 | Hogan | |
| 1,640,179 A | * 8/1927 | Buckwalter | ................ 105/182.1 |
| 1,679,528 A | 8/1928 | Johanson | |
| 1,817,325 A | 8/1931 | Sinkovich | |
| 1,853,166 A | 4/1932 | Nibbe | |

(Continued)

FOREIGN PATENT DOCUMENTS

DE 973418 C 2/1960

(Continued)

OTHER PUBLICATIONS

Wikipedia—File:Tie plates.jpg. http://en.wikipedia.org/wiki/File:Tie_plates.jpg. Downloaded from the World Wide Web on Jul. 28, 2009.

(Continued)

*Primary Examiner* — Faye M Fleming
*Assistant Examiner* — Laura Freedman
(74) *Attorney, Agent, or Firm* — McDonnell Boehnen Hulbert & Berghoff

(57) ABSTRACT

An elastomeric spring suspension is described for supporting a longitudinally extending vehicle frame rail above first and second axles forming a tandem axle configuration. The suspension includes a frame hanger assembly mounted to the vehicle frame rail. The frame hanger assembly has two full spring modules, each of which includes two shear springs, a progressive spring rate load cushion having a pyramidal shape with a flattened top surface and a spring mount for mounting the springs. A saddle assembly is connected to the spring mount, and an equalizing beam is connected to the saddle assembly and further connected to the axles. The spring rate for the suspension increases almost linearly as a function of sprung load, resembling a pneumatic suspension. Accordingly, the suspension exhibits excellent ride quality, without sacrificing roll stability.

19 Claims, 54 Drawing Sheets

U.S. PATENT DOCUMENTS

| | | | | | |
|---|---|---|---|---|---|
| 1,949,363 | A | | 2/1934 | Willard | |
| 2,094,335 | A | | 9/1937 | Willard et al. | |
| 2,689,136 | A | * | 9/1954 | Hendrickson | 280/681 |
| 2,788,222 | A | | 4/1957 | Wilson et al. | |
| 2,872,207 | A | * | 2/1959 | Hirst | 280/687 |
| 2,905,390 | A | | 9/1959 | Saul | |
| 2,940,771 | A | * | 6/1960 | Hendrickson | 280/681 |
| 2,980,439 | A | | 4/1961 | Miller | |
| 3,004,715 | A | | 10/1961 | Gadd | |
| 3,121,560 | A | | 2/1964 | Reed | |
| 3,134,585 | A | | 5/1964 | Trask | |
| 3,241,856 | A | * | 3/1966 | Raidel | 280/681 |
| 3,279,820 | A | | 10/1966 | Hickman | |
| 3,297,339 | A | * | 1/1967 | Hendrickson | 280/681 |
| 3,471,165 | A | * | 10/1969 | Raidel | 280/687 |
| 3,482,852 | A | * | 12/1969 | Hickman | 280/124.101 |
| 3,485,040 | A | | 12/1969 | Niskanen | |
| 3,539,170 | A | | 11/1970 | Hamel | |
| 3,545,787 | A | | 12/1970 | Miller | |
| 3,572,745 | A | * | 3/1971 | Willetts | 280/687 |
| 3,580,611 | A | | 5/1971 | McNitt | |
| 3,618,971 | A | | 11/1971 | Wragg | |
| 3,687,477 | A | * | 8/1972 | Miller | 280/681 |
| 3,695,737 | A | | 10/1972 | Alexander et al. | |
| 3,731,913 | A | | 5/1973 | Hirst | |
| 3,797,851 | A | | 3/1974 | Hirst | |
| 3,811,700 | A | * | 5/1974 | Moore | 280/124.178 |
| 3,817,551 | A | | 6/1974 | Moore | |
| 3,955,808 | A | | 5/1976 | Jorn et al. | |
| D240,239 | S | | 6/1976 | Calandrino | |
| 3,984,125 | A | | 10/1976 | Paton et al. | |
| 3,997,151 | A | | 12/1976 | Leingang | |
| 4,082,316 | A | | 4/1978 | Raidel | |
| 4,095,690 | A | | 6/1978 | Baldwin | |
| 4,111,406 | A | | 9/1978 | Zanow | |
| 4,132,433 | A | | 1/1979 | Willett | |
| 4,144,978 | A | | 3/1979 | Drake | |
| 4,162,799 | A | | 7/1979 | Willetts | |
| 4,182,338 | A | | 1/1980 | Stanulis | |
| 4,193,612 | A | | 3/1980 | Masser | |
| 4,213,633 | A | | 7/1980 | Moore et al. | |
| 4,278,271 | A | * | 7/1981 | Raidel | 280/687 |
| 4,358,096 | A | | 11/1982 | Paton et al. | |
| 4,371,189 | A | | 2/1983 | Raidel | |
| 4,382,547 | A | | 5/1983 | Phillips | |
| 4,420,171 | A | | 12/1983 | Raidel | |
| 4,452,007 | A | | 6/1984 | Martin | |
| 4,486,029 | A | | 12/1984 | Raidel | |
| 4,504,080 | A | | 3/1985 | VanDenberg | |
| 4,705,294 | A | | 11/1987 | Raidel | |
| 4,753,456 | A | | 6/1988 | Booher | |
| 4,793,597 | A | | 12/1988 | Smith | |
| D306,476 | S | | 3/1990 | Millard | |
| 4,944,402 | A | | 7/1990 | Wu | |
| 4,995,636 | A | | 2/1991 | Hall et al. | |
| 5,114,178 | A | | 5/1992 | Baxter | |
| 5,150,918 | A | | 9/1992 | Heitzmann | |
| 5,237,933 | A | | 8/1993 | Bucksbee | |
| D344,254 | S | | 2/1994 | Zimmerman | |
| 5,327,674 | A | | 7/1994 | Powell | |
| 5,413,320 | A | | 5/1995 | Herbst | |
| D377,961 | S | | 2/1997 | Dickson et al. | |
| 5,676,356 | A | | 10/1997 | Ekonen et al. | |
| D390,305 | S | | 2/1998 | Dickson et al. | |
| 5,753,429 | A | | 5/1998 | Pugh | |
| 5,810,337 | A | | 9/1998 | McLaughlin | |
| 5,868,384 | A | | 2/1999 | Anderson | |
| 5,887,881 | A | | 3/1999 | Hatch | |
| 5,909,821 | A | | 6/1999 | Guridi | |
| 5,938,221 | A | | 8/1999 | Wilson | |
| 5,957,441 | A | | 9/1999 | Tews | |
| 5,989,075 | A | | 11/1999 | Hsiao et al. | |
| D423,342 | S | | 4/2000 | Popesco | |
| 6,045,328 | A | | 4/2000 | Jones | |
| 6,129,369 | A | | 10/2000 | Dudding | |
| 6,176,345 | B1 | | 1/2001 | Perkins et al. | |
| 6,189,904 | B1 | | 2/2001 | Gentry et al. | |
| 6,206,407 | B1 | * | 3/2001 | Fuchs et al. | 280/686 |
| 6,276,674 | B1 | | 8/2001 | Randell | |
| 6,328,294 | B1 | | 12/2001 | Palinkas | |
| 6,478,321 | B1 | | 11/2002 | Heitzmann | |
| D471,888 | S | | 3/2003 | Solland | |
| D474,274 | S | | 5/2003 | Walters | |
| 6,572,087 | B2 | | 6/2003 | Schleintz et al. | |
| 6,585,286 | B2 | | 7/2003 | Adema et al. | |
| 6,659,438 | B2 | | 12/2003 | Michael et al. | |
| 6,666,474 | B2 | | 12/2003 | Pavuk | |
| D496,887 | S | | 10/2004 | Carlson | |
| 6,817,301 | B1 | | 11/2004 | Bullock | |
| 6,877,623 | B2 | | 4/2005 | Salis | |
| D507,658 | S | | 7/2005 | Wescott, III | |
| 6,951,260 | B1 | * | 10/2005 | Isley | 180/9.54 |
| D515,942 | S | | 2/2006 | Hamblin et al. | |
| D515,943 | S | | 2/2006 | Hamblin et al. | |
| D519,104 | S | | 4/2006 | Richter | |
| 7,185,903 | B2 | | 3/2007 | Dove | |
| D543,492 | S | | 5/2007 | Lyew | |
| 7,229,088 | B2 | | 6/2007 | Dudding et al. | |
| 7,234,723 | B2 | | 6/2007 | Sellers | |
| D551,315 | S | | 9/2007 | Zimmerman | |
| 7,303,200 | B2 | | 12/2007 | Ramsey | |
| 7,320,538 | B2 | | 1/2008 | Ko et al. | |
| D603,303 | S | | 11/2009 | Noble et al. | |
| D606,459 | S | | 12/2009 | Noble et al. | |
| D610,952 | S | | 3/2010 | Noble et al. | |
| D615,005 | S | | 5/2010 | Noble et al. | |
| D632,230 | S | | 2/2011 | Noble et al. | |
| D633,011 | S | | 2/2011 | Noble et al. | |
| 2002/0163165 | A1 | | 11/2002 | Adema et al. | |
| 2003/0047907 | A1 | | 3/2003 | Hicks et al. | |
| 2004/0262877 | A1 | | 12/2004 | Sellers | |
| 2005/0110233 | A1 | | 5/2005 | Hedenberg | |
| 2006/0208445 | A1 | | 9/2006 | Gideon | |
| 2007/0262547 | A1 | | 11/2007 | Warinner | |
| 2008/0018070 | A1 | | 1/2008 | Gottschalk | |
| 2008/0030006 | A1 | | 2/2008 | Sellers | |
| 2008/0122146 | A1 | | 5/2008 | Herntier et al. | |
| 2008/0134413 | A1 | | 6/2008 | Guo | |
| 2008/0258361 | A1 | | 10/2008 | Wen et al. | |
| 2008/0290572 | A1 | | 11/2008 | Desprez et al. | |
| 2009/0008846 | A1 | | 1/2009 | Yamakawa et al. | |
| 2009/0108086 | A1 | | 4/2009 | Mospan et al. | |
| 2009/0230650 | A1 | | 9/2009 | Mayen et al. | |

FOREIGN PATENT DOCUMENTS

| | | | |
|---|---|---|---|
| EP | 1911661 | A1 | 4/2008 |
| EP | 2006129 | A1 | 12/2008 |
| FR | 2550918 | A1 | 3/1985 |
| FR | 2797432 | A1 | 2/2001 |
| GB | 2069424 | A | 8/1981 |
| GB | 2128942 | A | 5/1984 |
| GB | 2226867 | A1 | 7/1990 |
| GB | 2252276 | A | 8/1992 |
| JP | 405149035 | A | 6/1993 |
| WO | 0242097 | A2 | 5/2002 |
| WO | 2006067551 | A2 | 6/2006 |

OTHER PUBLICATIONS

Wikipedia—Tie plate. http://en.wikipedia.org/wiki/Tie_plate. Downloaded from the World Wide Web on Jul. 28, 2009.

Answers.com—tie plate. http://www.answers.com/topic/tie-plate. Downloaded from the World Wide Web on Jul. 28, 2009.

U.S. Appl. No. 29/342,335, entitled "Suspension Tie-plate" and filed Aug. 22, 2009.

Hendrickson, A Boler Company, Hendrickson Frame Hanger Selection Guide, May 1990.

Hendrickson, A Boler Company, Hendrickson RS Series, Single Axle Supension, Sep. 1995.

Hendrickson, RS Series Rubber Load Cushion, Only Hendrickson makes choosing a heavy-duty suspension this easy, Jun. 1993.

Hendrickson, A Boler Company, HN Series Technical Sales Publication, Jun. 1997.

Hendrickson Suspension, RS Series rubber load cushion, Jul. 1991.

Hendrickson Mfg., Tandem Division, Wide spread equalizing beams, sales bulletin, May 1981.

Hendrickson Mfg. Co., Tandem Division, Hendrickson Tandem Suspensions for GMC Trucks, Aug. 1979.
Hendrickson, The Boler Company, RS Frame Hanger, Dec. 1997.
Hendrickson, A Boler Company, RS Series Rubber Load Cushion Suspensions, Mar. 1996.
Hendrickson, A Boler Company, RS Series Rubber Load Cushion Suspensions, Jul. 1996.
Hendrickson, A Boler Company, RS Series Rubber Load Cushion, Mar. 1998.
Hendrickson Suspension, HN Series Premium Rubber, Hendrickson introduces a completely new concept in Walking Beam Suspension, Jun. 1993.
Hendrickson Suspension, A Boler Company, Hendrickson HNT Series, Feb. 1992.
Hendrickson Suspension, Sales Engineering Update, Mar. 1993.
Hendrickson Truck Suspension Systems, A Boler Company, RS Series Rubber Load Cushion, Dec. 1996.
Hendrickson Truck Suspension Systems, A Boler Company, RS Series Rubber Load Cushion, Apr. 1998.
Hendrickson Truck Suspension Systems, A Boler Company, HN Series VariRate Spring System, May 1997.
Hendrickson Truck Suspension Systems, A Boler Company, HN Series VariRate Spring System, Nov. 1997.
Hendrickson Truck Suspension Systems, A Boler Company, HN Series VariRate Spring System, Sep. 1998.
Hendrickson Truck Suspension Systems, A Boler Company, HN Series VariRate Spring System, Jul. 1999.
Hendrickson, HN Series VariRate Spring System, Nov. 2000.
Hendrickson, HN Series VariRate Spring System, Nov. 2005.
Hendrickson Truck Suspension Systems, A Boler Company, HN 402, Feb. 1996.
Hendrickson Truck Suspension Systems, A Boler Company, R Series Solid Mount, Jul. 1999.
Hendrickson Truck Suspension Systems, A Boler Company, RS Series Rubber Load Cushion, Jun. 1999.
Hendrickson, Haulmaax Heavy Duty Suspension, Oct. 2001.
Hendrickson, Haulmaax Heavy Duty Suspension, Dec. 2003.
Hendrickson, Haulmaax Heavy Duty Suspension, Mar. 2005.
Hendrickson, Haulmaax Heavy Duty Suspension, Jan. 2007.
Hendrickson, Haulmaax Heavy Duty Suspension, Mar. 2008.
Hendrickson, Assembly Instructions Haulmaax, Subject: Kit Nos. 64178-003 & 004, Feb. 2003.
Hendrickson, Assembly Instructions Haulmaax, Subject: Tie-bar Bolster Spring Kit Nos. 64179-037, Jun. 2006.
Hendrickson, Assembly Instructions Haulmaax, Subject: Outboard Frame Bracket for Paccar Vehicles Built after May 1, 2005 through Aug. 31, 2006, Oct. 2006.
Hendrickson, Assembly Instructions Haulmaax Saddle Assembly, Subject: Service Kit No. 57974-048, Dec. 2008.
Hendrickson, Technical Bulletin HN 402/462/522, Subject: Auxiliary Spring Shim Design, Oct. 2000.
Hendrickson, Technical Bulletin HN 402/462/522, Subject: Auxiliary Spring Shim Design, Dec. 2000.
Hendrickson, Technical Bulletin HN 402/462/522, Subject: Auxiliary Spring Shim Design, Jun. 2006.
Hendrickson, Technical Bulletin Haulmaax Series, Subject: Mandatory Shock Applications, Nov. 2004.
Hendrickson, Technical Bulletin R, RS, RT/RTE 46K Capacity, Subject: 46K Heavy-Duty Beam Option, Dec. 2004.
Hendrickson, Technical Bulletin Haulmaax, Subject: 54" Equalizing Beam Assembly, Oct. 2005.
Hendrickson, Technical Bulletin Haulmaax 460, Subject: Bolster Spring Assembly with Tie-bar, Jun. 2006.
Hendrickson Truck Supension Systems, A Boler Company, Sales engineering update, Subject: HN-402/462 Auxiliary Spring Assembly, Aug. 1998.
Hendrickson Truck Suspension Systems, A Boler Company, Sales engineering update, Subject: Model Designation and Discontinuance, Aug. 1999.
Hendrickson Truck Supension Systems, A Boler Company, Sales engineering update, Subject: Equalizer Beam, Aug. 1999.
Hendrickson, Parts List RS Series, Nov. 2004.
Hendrickson, Parts List Haulmaax, May 2002.
Hendrickson, Parts List Haulmaax, Jul. 2003.
Hendrickson, Parts List Haulmaax, Jul. 2006.
Hendrickson, Parts List Haulmaax, Dec. 2007.
Hendrickson, Parts List RS 400/460/480/520 Jan. 1998.
Hendrickson, Parts List HN 402/462, Sep. 1997.
Hendrickson, Parts List HN Series, Dec. 2004.
Hendrickson Truck Suspension Systems, A Boler Company, Technical Publication RS-340 thru 520, Subject: Springing: Frame Hangers, Load Cushions and Saddle Assembly, Jul. 1993.
Hendrickson Truck Suspension Systems, A Boler Company, Technical Publication HN Series Truck & Trailer Suspension No. 17730-198, Mar. 1993.
Hendrickson, Technical Procedure HN/HNT-400/460 Truck & Trailer Suspension in Production Nov. 1988-Sep. 1996, Apr. 1998.
Hendrickson Truck Suspension Systems, A Boler Company, Technical Publication HN 402 Series, Subject: Service Instructions, Aug. 1996.
Hendrickson Truck Suspension Systems, A Boler Company, Technical Publication HN 402/462 Series, Subject: Service Instructions, Aug. 1998.
Hendrickson, Technical Procedure Haulmaax, Subject: Service Instructions, May 2002.
Hendrickson, Technical Procedure Haulmaax, Subject: Service Instructions, Jun. 2007.
Hendrickson, Technical Procedure Haulmaax, Subject: Pre-delivery Inspection and Preventive Maintenance, Apr. 2006.
Hendrickson, Technical Procedure Haulmaax, Subject: Service Instructions, Dec. 2007.
Hendrickson, Technical Procedure R/RS/RT Heavy Duty, Subject: 650K/850K/1000K Pound Capacity Beam End Connection Tightening Torque Procedure, Jul. 2006.
Hendrickson, RS Series Rubber Load Cushion, Feb. 2000.
MOR/RYDE, The MOR/ryde Steer and Drive Axle Suspension Systems, Mar. 7, 2008.
MOR/RYDE, Company Profile, downloaded from the World Wide Web at http://www.morrydede.com/php/about/profile/php on Feb. 28, 2008.
MOR/RYDE, T/A Modular Rubber Suspension System, Service Manual, Mar. 5, 2003.
MOR/RYDE, Tandem Axle Rubber Suspendion Sytem, Service Manual, Suspension Codes: TO1-01 and L01-01, Mar. 5, 2003.
MOR/RYDE, RL Rubber Leaf Suspension System, Owner's Manual, Mar. 12, 2003.
MOR/RYDE, Commercial Trailer Suspension, Jun. 1973.
MOR/RYDE, School Bus Suspension, Aug. 1973.
MOR/RYDE, A rubber spring . . . heart of the Mor/ryde system, Aug. 1973.
Jorn, Technology in Rubber—Metal, Sep. 29, 2008.
Hendrickson, Parts List RS Series, Apr. 2008.
Hendrickson, Technical Procedure, R/RS Heavy Duty, Subject: 85K/100K/120K lbs Capacity Tightening Torque for Torque Rod and Saddle Assembly Fasteners, Oct. 2008.
U.S. Appl. No. 12/334,195, entitled "Modular Suspension System and Components Thereof" and filed Dec. 12, 2008.
Vincent Ciulla, "Progressive Rate Spring," downloaded from the World Wide Web at http://autorepair.about.com/library/glossary/bldef-227.htm?p=1 on Nov. 11, 2009.
"PT-Tuning," downloaded from the World Wide Web at http://pt-tuning.com/pdfs/suspensionInstall.pdf Score:1, Aug. 11, 2003.
"Progressive Springs—Linear Springs," downloaded from the World Wide Web at http://www.scoobytuner.com/tuning/?tSflD1=16&tuningID=21 on Nov. 11, 2009.
"Hydropneumatic Suspension"—Wikipedia, the free encyclopedia, downloaded from the World Wide Web at http://en.wikipedia.org/wiki/hydropneumatic_suspension on Nov. 11, 2009.
Paul Mocioce, Rouch Industrisies, Inc., Viscoelastic Damping 101, Sep. 9, 2002.
Hendrickson USA, L.L.C., Technical Procedure R/RS/RT Heavy Duty, Lit. No. 17730-149, Revision C, Jul. 2006.
Elastomer, downloaded from the World Wide Web at http;//en.wikipedia.org/wiki/Elastomer on Nov. 24, 2008.
U.S. Appl. No. 12/045,069, entitled "Elastomeric Spring Vehicle Suspension" and filed Mar. 10, 2008.

U.S. Appl. No. 29/344,284, entitled "Suspension Spring" and filed Sep. 25, 2009.
U.S. Appl. No. 29/344,283, entitled "Suspension Spring" and filed Sep. 25, 2009.
U.S. Appl. No. 29/344,282, entitled "Suspension Spring" and filed Sep. 25, 2009.
U.S. Appl. No. 29/329,357, entitled "Spring Housing for a Suspension" and filed Dec. 12, 2008.
U.S. Appl. No. 29/329,354, entitled "Suspension Assembly" and filed Dec. 12, 2008.
U.S. Appl. No. 29/329,343, entitled "Suspension Saddle" and filed Dec. 12, 2008.
U.S. Appl. No. 29/329,338, entitled "Shear Spring for a Suspension" and filed Dec. 12, 2008.
U.S. Appl. No. 29/337,985, entitled "Spring Housing for a Suspension" and filed Jun. 2, 2009.
U.S. Appl. No. 29/337,974, entitled "Progressive Rate Spring for a Suspension" and filed Jun. 2, 2009.
U.S. Appl. No. 29/315,182, entitled "Suspension Assembly" and filed Jun. 2, 2009.
U.S. Appl. No. 29/337,977, entitled "Spring Mount for a Suspension" and filed Jun. 2, 2009.
U.S. Appl. No. 29/337,973, entitled "Saddle for a Suspension" and filed Jun. 2, 2009.
U.S. Appl. No. 29/339,128, entitled "Spring Mount" and filed Jun. 24, 2009.
U.S. Appl. No. 29/339,132, entitled "Spring Housing" and filed Jun. 24, 2009.
U.S. Appl. No. 29/339,134, entitled "Suspension Assembly" and filed Jun. 24, 2009.

Hendrickson, HN FR Series, HN FR Suspension 42—58K Fire/Rescue, Feb. 2009.
Hendrickson, Haulmaax Heavy-Duty Suspension, Jan. 2009.
Kenworth Truck Company, Haulmaax, May 14, 2009.
European Patent Office, International Search Report for International Application No. PCT/US2009/036662, Feb. 17, 2010.
European Patent Office, Written Opinion of the International Searching Authority for International Application No. PCT/US2009/036662, Feb. 17, 2010.
European Patent Office, Communication Relating to the Results of the Partial International Search, PCT/US2009/036662, Mar. 2, 2010.
Hendrickson, Technical Procedure, Non-Steerable Suspension Systems, Subject: Installation Instructions, Lit. No. H621, Dec. 2003.
Hendrickson, Bus Air Ride Suspensions No. 45745-123, Oct. 1998.
ABOUT.COM, Progressive Rate Spring, downloaded from the World Wide Web at http://autorepair.about.com/library/glossary/bldef-277.htm on Nov. 21, 2008.
U.S. Appl. No. 12/545,828, filed Aug. 22, 2009 and entitled "Tie-plate and frame hanger of a suspension assembly."
U.S. Appl. No. 12/876,158, filed Sep. 5, 2010, and entitled "Suspension Assembly with Tie-Plate."
Mar. 29, 2011 Notification of Transmittal of the International Preliminary Report of Patentability Application No. PCT/US2009/056575 filed Oct. 9, 2009.
European Patent Office, International Search Report for International application No. PCT/US2009/056575, Mar. 3, 2010.
European Patent Office, Written Opinion for International application No. PCT/US2009/056575, Mar. 3, 2010.

* cited by examiner

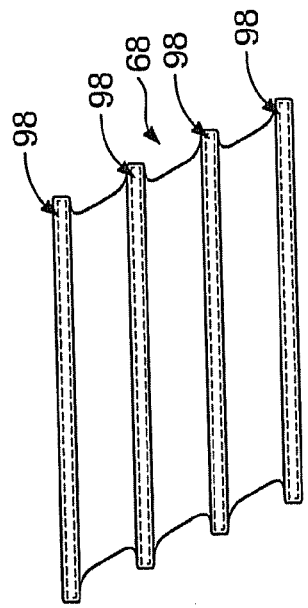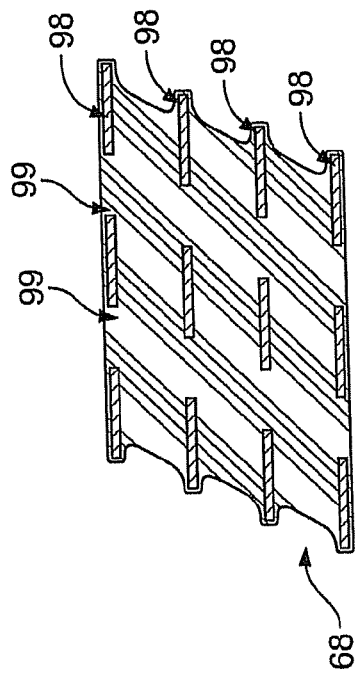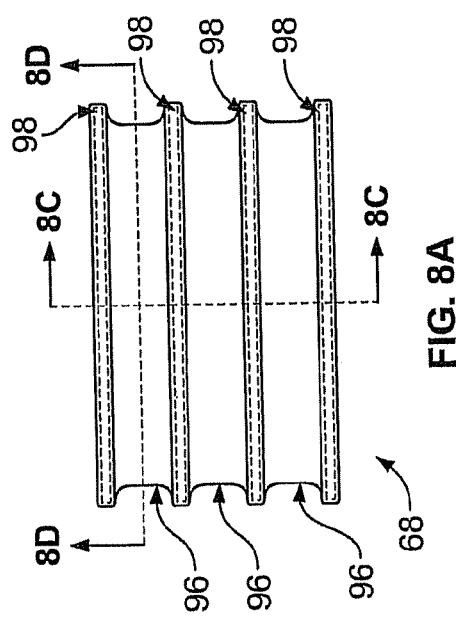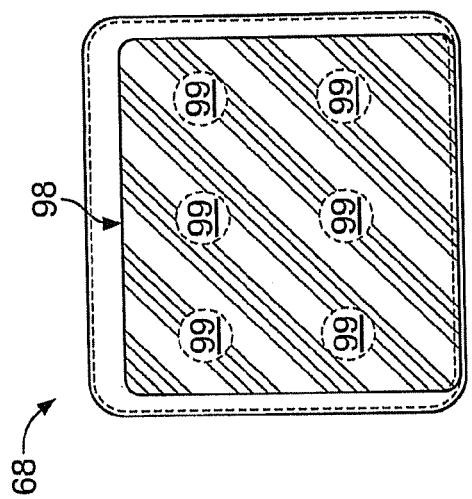

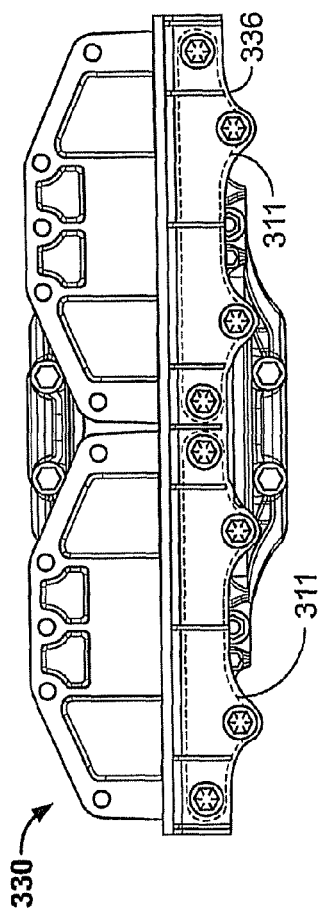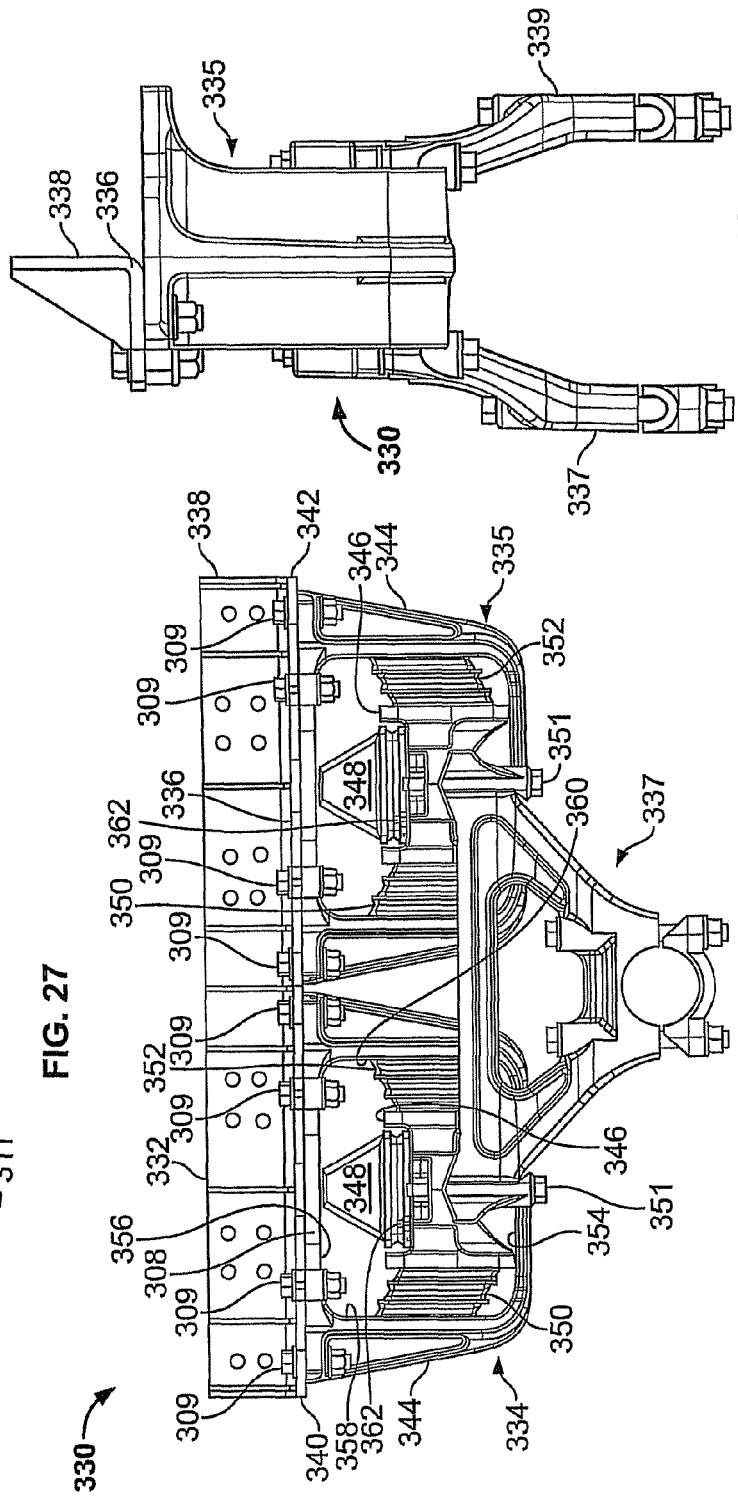
FIG. 27
FIG. 28
FIG. 26

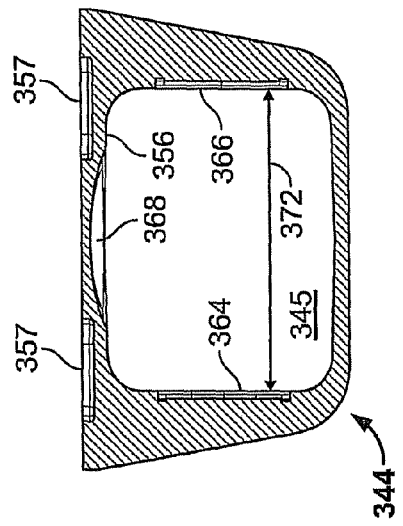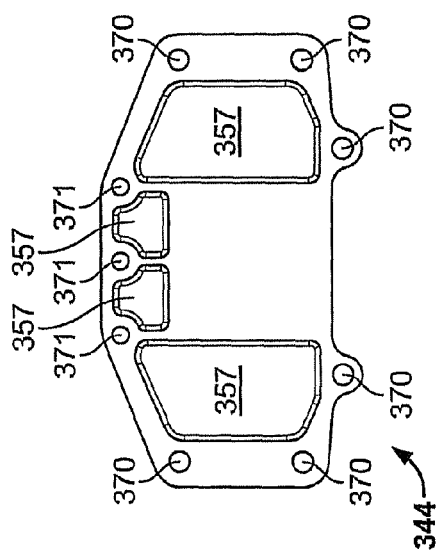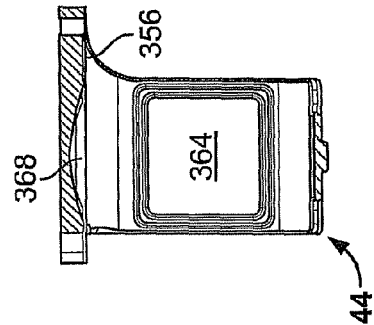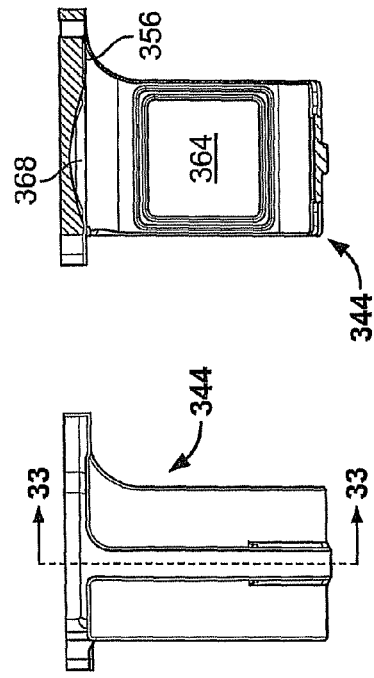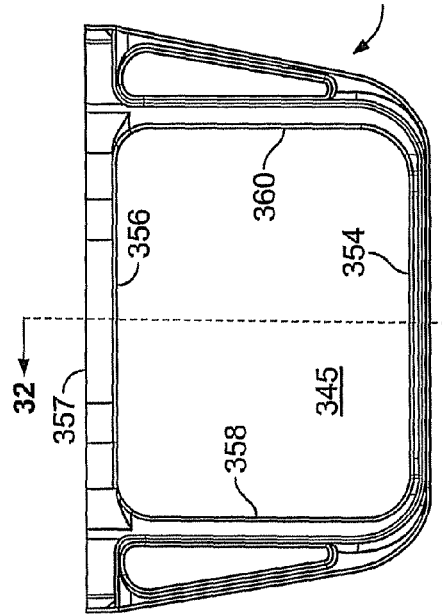

TIE-PLATE AND FRAME HANGER OF A SUSPENSION ASSEMBLY

CROSS-REFERENCE TO RELATED APPLICATIONS

This application is a continuation-in-part of U.S. patent application Ser. No. 12/334,195, which is entitled "Modular Suspension System and Components Thereof" and was filed on Dec. 12, 2008. This application is a continuation-in-part of U.S. patent application Ser. No. 12/045,069, which is entitled "Elastomeric Spring Vehicle Suspension" and was filed on Mar. 10, 2008. This application claims the benefit of U.S. patent application Ser. Nos. 12/334,195 and 12/045,069 under 35 U.S.C. §120, and incorporates U.S. patent application Ser. Nos. 12/334,195 and 12/045,069 herein by reference.

BACKGROUND

The present invention generally relates to vehicle suspensions. More particularly, the present invention relates to elastomeric spring vehicle suspensions, such as for use in vocational or heavy haul truck applications.

Single spring rate suspensions and variable spring rate suspensions for use in vocational or heavy haul truck applications are known.

Single spring rate suspensions have a fixed spring rate that generally must be set at a level that produces a suspension with either a comfortable ride or a stiff suspension exhibiting adequate roll stability. As a result, either roll stability or ride quality is compromised in single spring rate suspensions, depending upon the selected spring rate.

Variable rate suspensions overcome this deficiency of single rate suspensions by providing for multiple spring rates during operation. As the sprung load is increased, the spring rate is correspondingly increased.

An example of a variable spring rate elastomeric spring suspension for use in vocational or heavy haul truck applications is shown in U.S. Pat. No. 6,585,286, the disclosure of which is hereby incorporated herein by reference. That suspension utilizes bolster springs and auxiliary springs to achieve its variable spring rate.

The spring rate for such a suspension can change due to the engagement or disengagement of the auxiliary spring as a function of load. The ride quality of a lightly loaded chassis having such a suspension is quite good without sacrificing roll stability at rated chassis load. When a lightly to moderately loaded chassis with such a suspension encounters moderate to large variations in roadway or operating conditions, frequent engagement and disengagement of the auxiliary spring may occur. For each such engagement or disengagement of the auxiliary spring, the spring rate for the system may undergo an abrupt change known as strike-through effect. Ride quality may be compromised as a result. Graphically, the spring rate has a discontinuity, which may be represented as a step function, at the load where the auxiliary spring is engaged or disengaged.

Prior elastomeric spring suspensions for vocational or heavy haul truck applications require their elastomeric springs to undergo loading that is compressive, tensile and/or shearing in nature. Tensile loading causes elastomeric break down.

In view of the conditions identified above with respect to prior spring vehicle suspensions for vocational or heavy haul truck applications, it is desired to provide a new and improved suspension for those applications.

BRIEF DESCRIPTION OF THE DRAWINGS

Exemplary embodiments of the invention are described herein with reference to the drawings, wherein like parts are designated by like reference numerals, and wherein:

FIG. 8A is a top view of the shear spring illustrated in FIG. 8;

FIG. 8B is a side elevational view of the shear spring illustrated in FIG. 8;

FIG. 8C is a sectional view of the shear spring illustrated in FIG. 8A, taken along lines A-A thereof;

FIG. 8D is a sectional view of the shear spring illustrated in FIG. 8A, taken along lines B-B thereof;

FIG. 26 is a side-elevational view of a frame hanger assembly in accordance with an exemplary embodiment;

FIG. 27 is a top plan view of the frame hanger assembly illustrated in FIG. 26;

FIG. 28 is an end view of the frame hanger assembly illustrated in FIG. 26;

FIG. 29 is a side elevational view of a spring housing in accordance with an exemplary embodiment;

FIG. 30 is a top plan view of the spring housing illustrated in FIG. 29;

FIG. 31 is an end view of the spring housing illustrated in FIG. 29;

FIG. 32 is a sectional view of the spring housing illustrated in FIG. 29, taken along lines A-A thereof;

FIG. 33 is a sectional view of the spring housing illustrated in FIG. 31, taken along lines B-B;

DETAILED DESCRIPTION OF THE INVENTION

1. Exemplary Suspension

Figure 1:
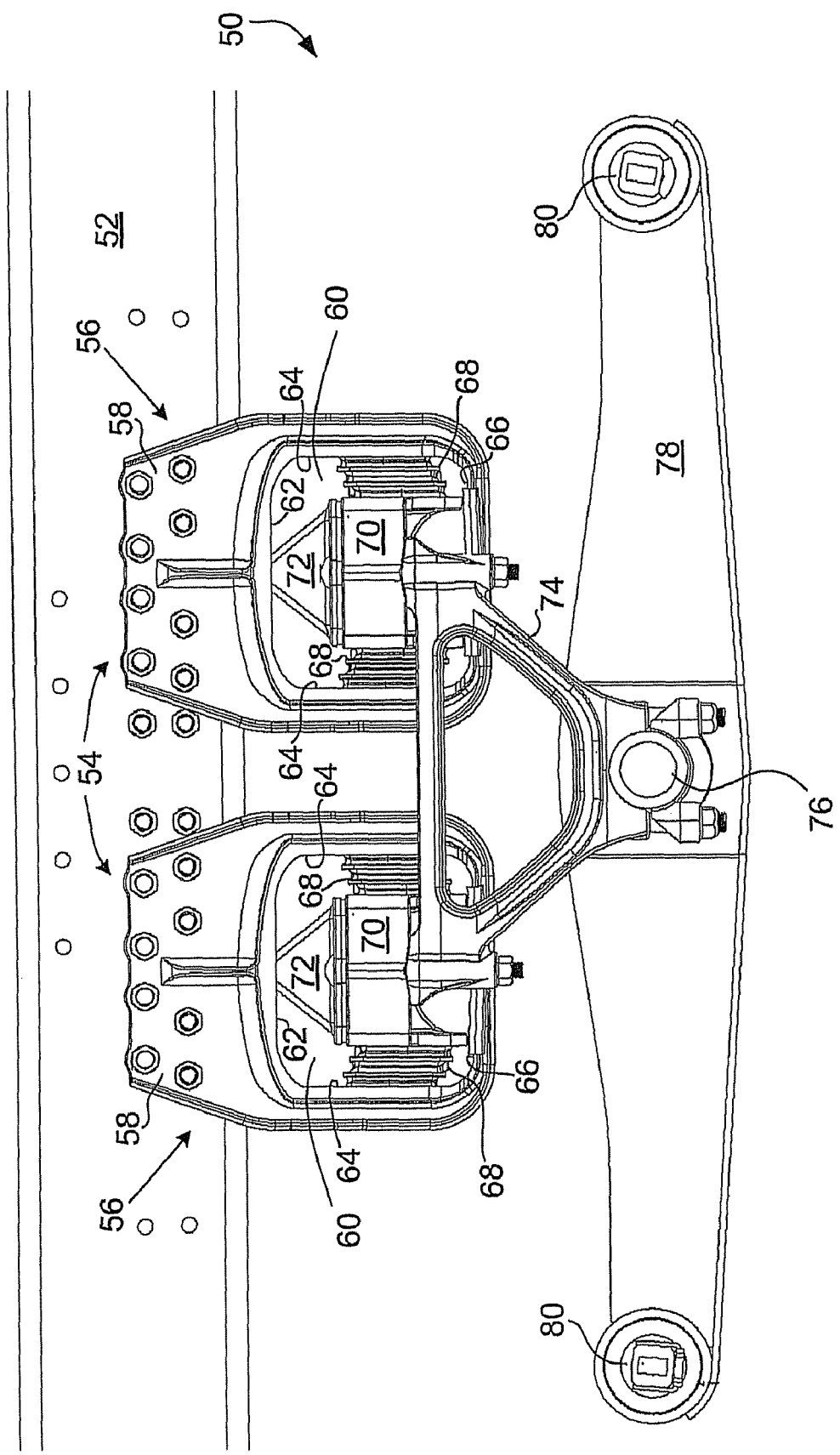
FIG. 1 is a side elevational view of a vehicle suspension constructed in accordance with principles disclosed herein.

FIGS. 1-21 illustrate embodiments of a vehicle suspension generally designated 50 and components thereof. The vehicle suspension 50 is designed to support longitudinally extending C-shaped vehicle frame rails 52 above laterally extending vehicle axles (not shown) of a tandem axle configuration for the vehicle. In an alternative embodiment, the vehicle frame rails 52 may comprise box frame rails, I-frame rails (for example, frame rails comprising an I-beam), or some other type of frame rail. As will be appreciated by those skilled in the art, components for the vehicle suspension 50 and the other suspensions described herein are duplicated on each side of the vehicle. It will also be appreciated that vehicle wheels (not shown) are mounted to the ends of the vehicle axles in a known manner. Further, it will be appreciated that the vehicle frame rails 52 may be connected by one or more vehicle frame cross members (not shown).

Those skilled in the art will further understand that a suspension, arranged in accordance with the suspension 50 and the components thereof, alternatively may be attached to frame rails of a trailer (for example, a trailer that connects to a semi-tractor). The frame rails of a trailer may comprise frame rails such as those described above or another type of frame rail.

For purposes of this description, unless specifically described otherwise, hereinafter, "vehicle" refers to a vehicle or a trailer. In this way, for example, a vehicle frame refers to a vehicle frame or a trailer frame. Furthermore, for purposes of this description, the left side of a vehicle refers to a side of the vehicle on an observer's left-hand side when the observer faces the back of the vehicle, and the right side of the vehicle refers to a side of the vehicle on an observer's right-hand side when the observer faces the back of the vehicle. Furthermore still, for purposes of this description, "outboard" refers to a position further away from a center line, running from the front to the back of a vehicle, relative to "inboard" which refers to a position closer to that same center line.

The vehicle suspension 50, in accordance with a given embodiment, may have and/or provide, but is not limited to having and/or providing, one or more of the following characteristics: (i) a continuously increasing spring rate (curvilinear and with no discontinuities) as a function of an increasing load applied to the suspension 50, (ii) an almost linearly increasing spring rate as a function of increasing load applied to the suspension 50, (iii) minimal interaxle brake load transfer and/or improved articulation due to a pivot point created at a center bushing 76 of an equalizing beam 78, (iv) minimal or no tensile loading to one or more springs of the suspension 50, (v) improved durability due to a reduced number of fasteners, mechanical joints that reduce the criticality of fastener preloads, and the elimination of tensile loading in one or more springs of the suspension 50, (vi) good ride quality on a lightly loaded chassis without sacrificing roll stability at rated chassis load, (vii) no restrictions with regards to the usage of tire chains, and (viii) no abrupt change in spring rate due to engagement or disengagement of an auxiliary spring as the vehicle employing the suspension 50 encounters moderate to large variations in roadway or operating conditions.

As shown in FIG. 1, the suspension 50 includes a frame hanger assembly 54 having two spring modules 56 which are mounted on the frame rail 52 in a known manner. In this regard, each spring module 56 includes a frame attachment portion 58 having holes for attaching the spring module to an adjacent frame rail 52.

Figure 6:
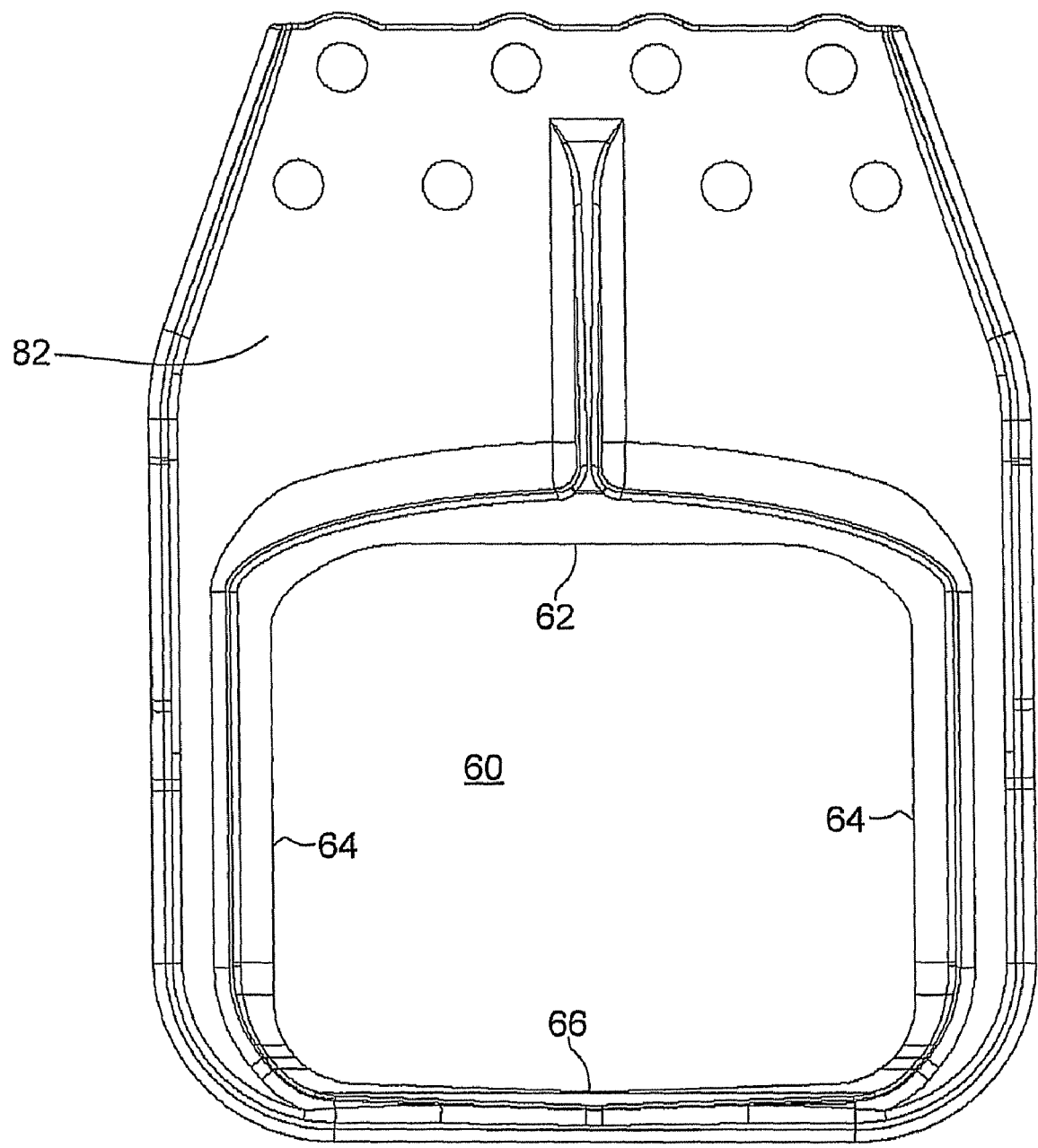
FIG. 6 is a side elevational view of a frame hanger illustrated in FIG. 1.
Figure 7:
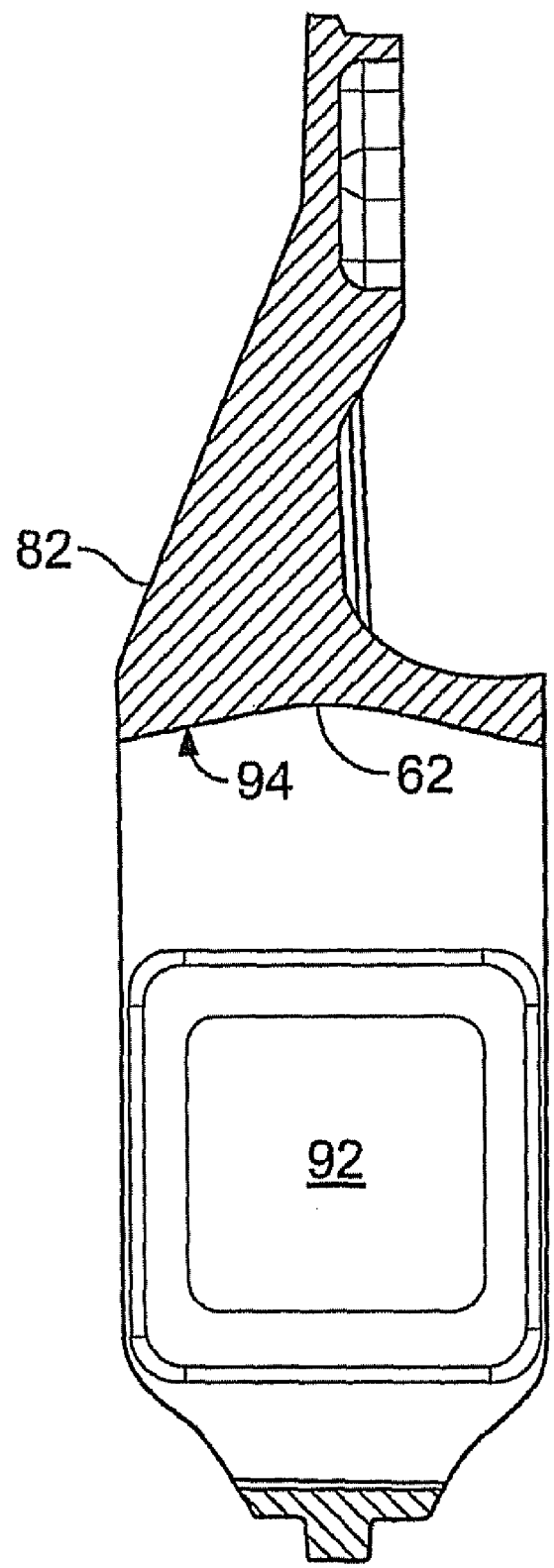
FIG. 7 is a sectional view of the frame hanger illustrated in FIG. 6, taken along lines 7-7 thereof.

Each of the spring modules 56 includes a window-like opening 60 defined by the top wall 62, the side walls 64 and the bottom wall 66 (see, also, for example, FIGS. 6 and 7). Within each opening 60, shear springs 68 are positioned between the side walls 64 and a spring mount 70 centrally positioned within the opening. Preferably, the shear springs 68 are mounted in compression in the spring module 56. The compression load applied to the shear springs 68, the side walls 64, and the spring mount 70 may increase as the expected maximum load rating of the vehicle is increased. For example, for a first expected maximum load rating, the shear springs 68, the side walls 64, and/or the spring mount 70 may be mounted in compression on the order of approximately 13,000 pounds of load. As another example, for a second expected maximum load rating which is greater than the first expected maximum load rating, the shear springs 68, the side walls 64, and/or the spring mount 70 may be mounted in compression on the order of approximately 20,000 pounds of load.

In addition, within each opening 60, a progressive spring rate load cushion 72 is positioned between the spring mount 70 and the top wall 62 of the opening 60. Preferably, the load cushion 72 has a continuously increasing spring rate (during the loading of the load cushion 72), as described in greater detail below.

It will be appreciated herein throughout that while the spring modules 56 are described as having the shear springs 68 and the progressive spring rate load cushions 72, if the vehicle load has a sufficiently small magnitude in the fully loaded state, a spring module 56 having only the shear springs 68 (i.e., not having a progressive spring rate load cushion) may suffice. By way of example only, the sufficiently small magnitude of the vehicle load in the fully loaded state may be a vehicle load between 0 and 8,000 pounds or between 0 and 10,000 pounds.

Figure 3:
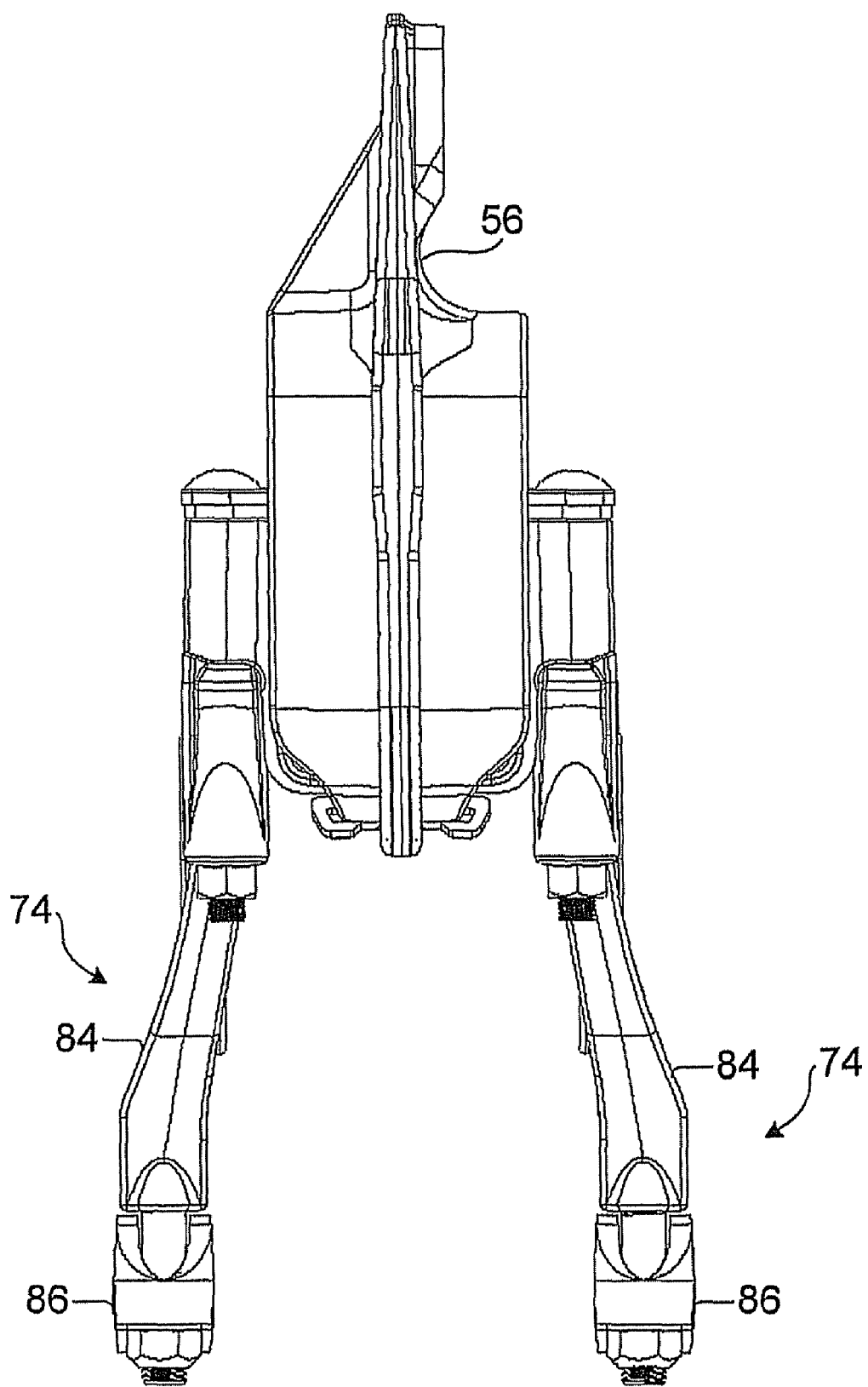
FIG. 3 is an end view of the frame hanger assembly and the saddle assembly illustrated in FIG. 2.

Two suspension saddle assemblies 74 are attached to the spring mounts 70 included within each opening 60. One saddle assembly 74 is positioned on the outboard-side of spring modules 56, as shown in FIG. 3. The other saddle assembly 74 is positioned on the opposite (inboard) side of the spring modules 56, as also shown in FIG. 3. The saddle assemblies 74 are attached to a center bushing 76 of a longitudinally extending fabricated equalizing beam 78, also known in the art as a walking beam.

Each beam 78 includes bushing tubes or canisters 80 positioned on opposite ends thereof. Each end of beam 78 is connected to a respective end of the vehicle axles (not shown) in a known manner.

Figure 2:
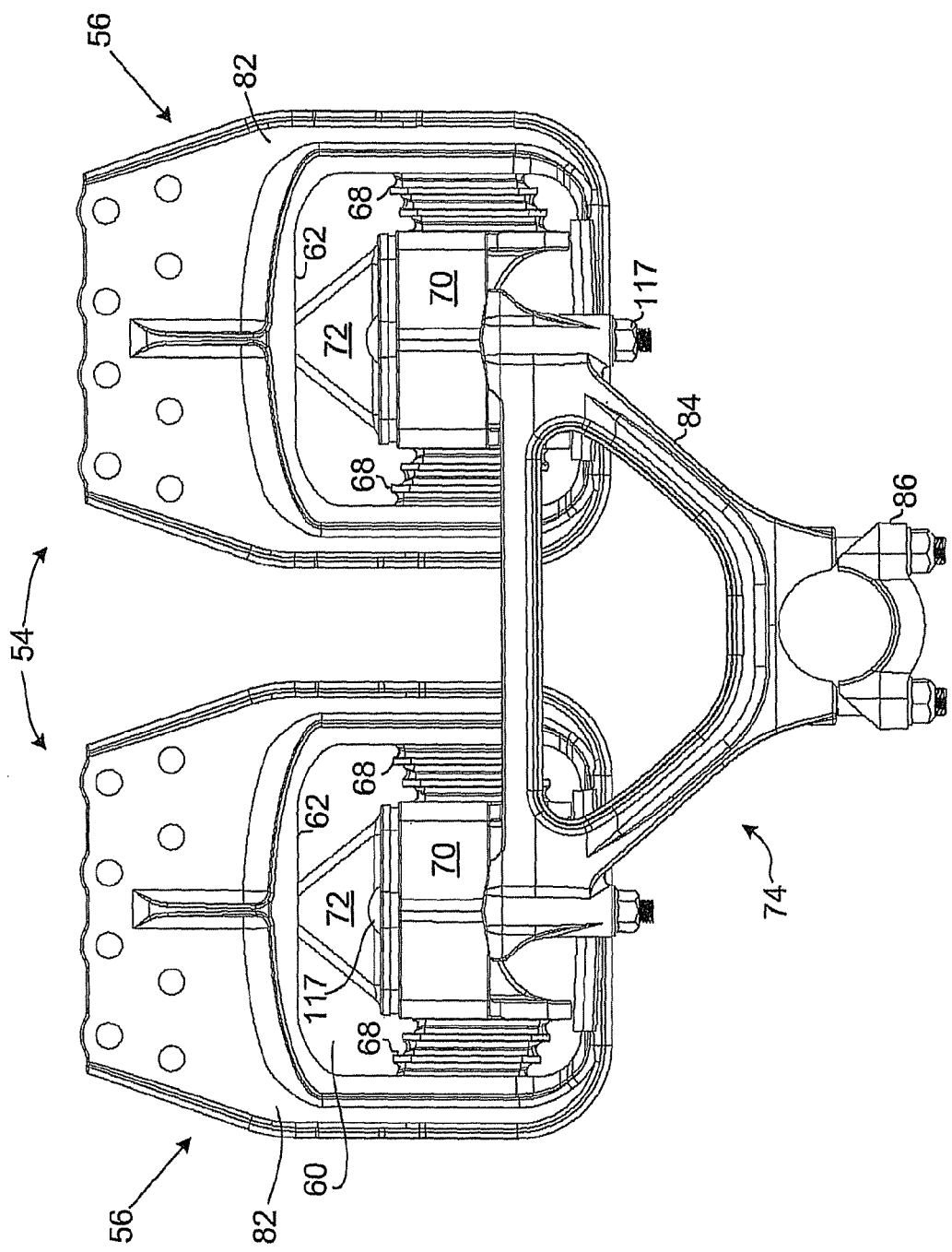
FIG. 2 is a side elevational view of a frame hanger assembly and a saddle assembly illustrated in FIG. 1.

FIGS. 2 and 3 illustrate embodiments of frame hanger assembly 54 and the saddle assembly 74. In this embodiment, frame hanger assembly 54 includes the two spring modules 56, in which each spring module 56 includes a frame hanger 82, two shear springs 68, a progressive spring rate load cushion 72, and a spring mount 70. Likewise, in this embodiment, each saddle assembly 74 includes a saddle portion 84 and a saddle cap end portion 86. The saddle portion 84 of each saddle assembly 74 is connected to the spring mounts 70, which provide mounting surfaces for shear springs 68 and progressive spring rate load cushions 72.

While installed between the spring mounts 70 and the side walls 64, the shear springs 68 are preferably held in compression between the spring mounts 70 and the side walls 64, preferably under approximately 13,000 to 20,000 pounds of load. In other words, the shear springs 68 do not undergo tensile loading. In this way, the fatigue life of the shear springs 68 is increased compared to elastomer springs that are subjected to such loading. The shear springs 68 are also oriented generally sideways, as illustrated, such that they act in shear and thereby have improved performance. One or both of the shear springs 68 in the spring module 56 may be replaced with another shear spring or springs that is/are configured like the shear springs 68.

The progressive spring rate load cushions 72 are mounted between the spring mounts 70 and the respective top walls 62 of the openings 60. The load cushions 72 preferably have a continuously increasing spring rate during loading. Accordingly, the suspension 50 has a continuously increasing spring rate during loading. The load cushions 72 act in compression and do not undergo tensile loading, so they also have increased fatigue life over other springs (for example, elastomer springs) that are subjected to such loading.

Figure 4:
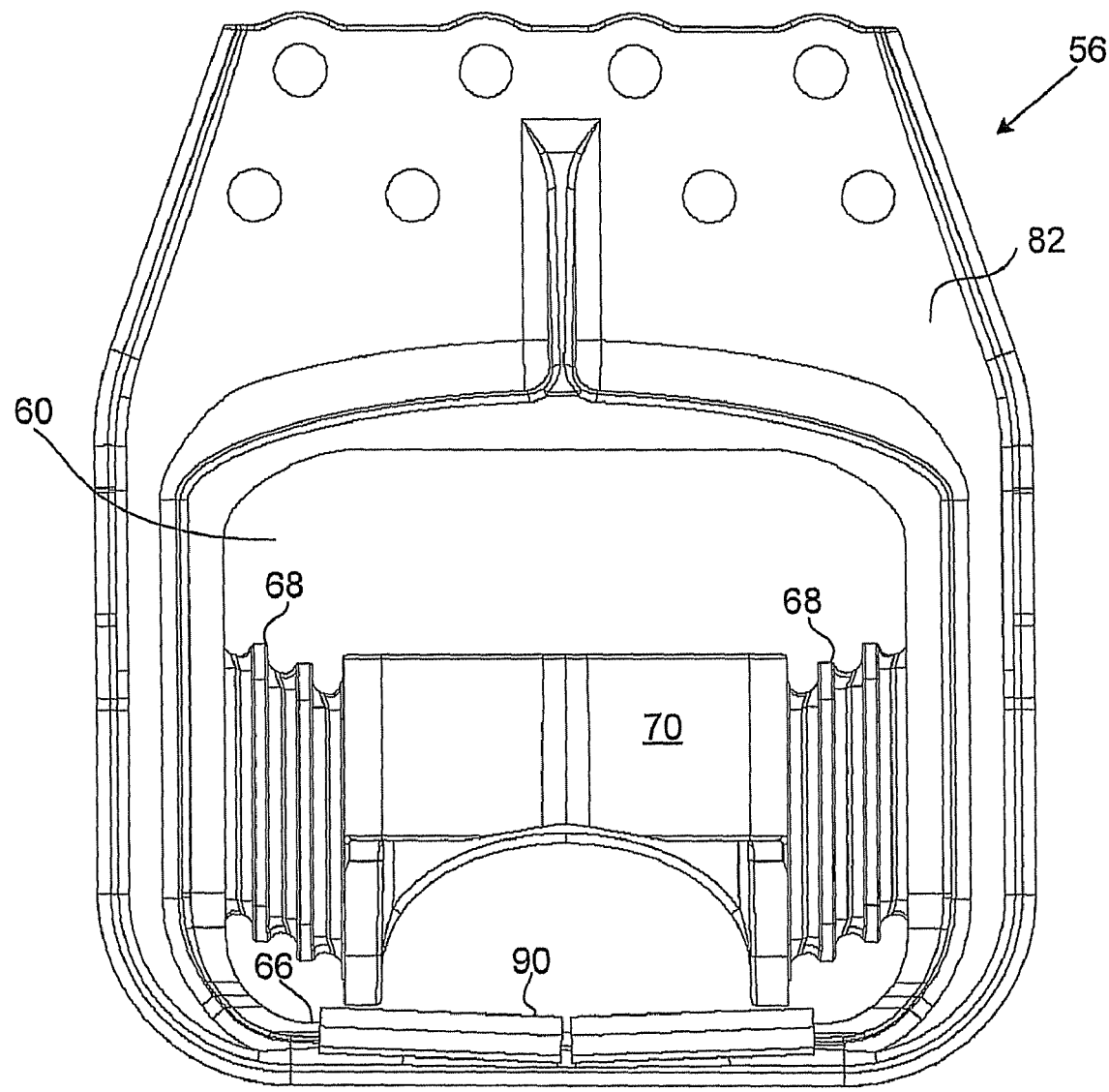
FIG. 4 is a side elevational view of a frame hanger spring module illustrated in FIG. 1.
Figure 5:
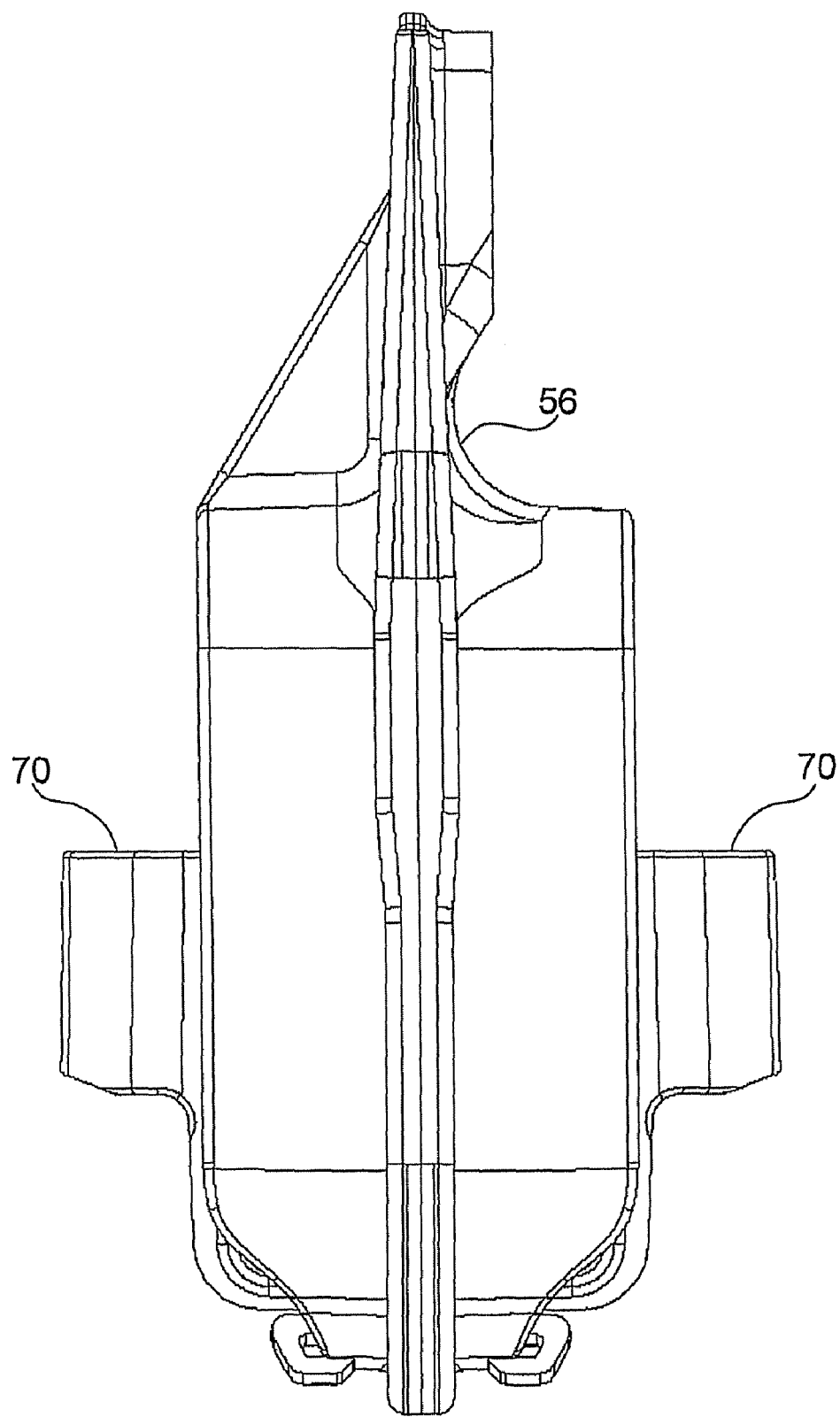
FIG. 5 is an end view of the frame hanger spring module illustrated in FIG. 4.

FIGS. 4 and 5 illustrate an embodiment of a full frame hanger spring module 56. In this embodiment, each full frame hanger spring module 56 includes a frame hanger 82, a spring mount 70, two shear springs 68 and a progressive spring rate load cushion 72 (see FIG. 2). Each spring mount 70 includes two saddle mounting bores 114 (see FIGS. 12-15) that are positioned inboard and outboard, respectively, of the frame hanger 82 to permit the saddle assembly 74 to be attached (see also FIGS. 2 and 3).

The bottom wall 66 of the opening 60 constitutes a rebound stop for suspension 50. This integrated rebound control eliminates the need for ancillary devices for such purpose. A snubber 90 may be included and attached to the bottom wall 66 of the opening 60, as shown, to further reduce audible noise that may be generated when the suspension goes into rebound. As an example, the snubber 90 may comprise an elastomeric material that may be attached to the bottom wall 66 using an adhesive or other fastener(s). Examples of the elastomeric material described hereinafter are applicable to the elastomeric material of the snubber 90.

FIGS. 6 and 7 illustrate additional details of an embodiment of the frame hanger 82. In particular, FIGS. 6 and 7 illustrate that side wall 64 of this embodiment includes a pocket 92. The other side wall 64 preferably includes a similarly arranged pocket 92 (not shown). Pockets 92 preferably have height and width dimensions optimized for locating a respective shear spring 68, and thus this embodiment eliminates the need for fasteners to retain the shear springs 68, which may alternatively be used. The width of the frame hanger opening 60, and hence the span between the pockets 92, is also preferably optimized for compression of the shear springs 68 in assembly. Further, the depth of pocket 92 is optimized for clearance of the shear springs 68 in operation as the shear springs 68 move through their full stroke. Pocket depth optimization also provides secondary vertical and horizontal retention of the shear springs 68 in addition to the retention provided by the compression of the shear springs 68 and by the coefficient of friction between the shear springs 68 and the mating member (for example, a pocket in side wall 64 or a pocket in the spring mount 70). With the preferred dimensions, no fasteners are required to retain the shear springs 68 in assembly, although embodiments that do require fasteners are also within the scope of the subject matter disclosed herein.

Referring again to FIG. 7, the top wall 62 for each opening 60 may use and/or comprise, for example, two elliptical shapes in perpendicular planes to form a dome-like configuration 94 to control bulging of the progressive spring rate load cushion 72 during loaded conditions, thereby increasing the useful life of the load cushion. Another advantage of dome-like configuration 94 is that it eliminates potential sharp edges that could damage the load cushion.

Each frame hanger 82 preferably has a symmetrical design, as shown. This permits each frame hanger 82 to be positioned on either the left side or the right side of the vehicle. Each frame hanger 82 may have a frame bolt pattern optimized for retaining frame hanger 82 to its associated vehicle frame rail under all operating conditions. Optimizing the bolt pattern may include, for example, minimizing the quantity of fasteners needed to reliably tighten the frame hanger 82 to the frame rail 52 and/or to maximize stretching of the fasteners.

Figure 8:
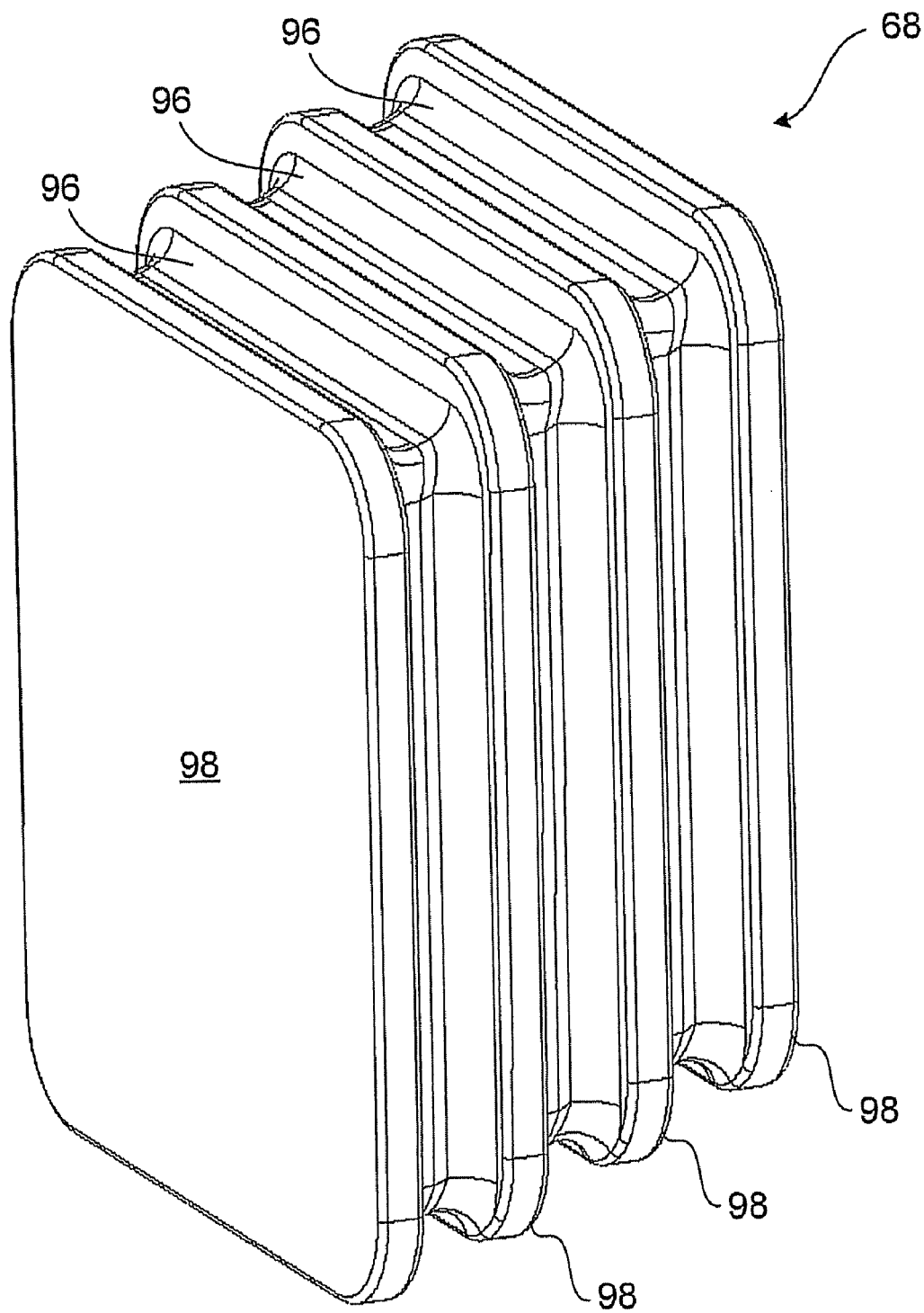
FIG. 8 is a perspective view of a shear spring in accordance with an exemplary embodiment.

FIGS. 8, 8A, and 8B illustrate various views of an embodiment of a shear spring 68. In this embodiment, the shear spring 68 is constructed of load blocks 96 bonded to plates 98. In one respect, the load blocks 96 (for example, elastomeric load blocks) may comprise an elastomeric material (i.e., an elastomer) such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer.

In this regard and in particular, the load blocks 96 may comprise an elastomer defined as American Society of Testing and Materials (ASTM) D2000 M4AA 717 A13 B13 C12 F17 K11 Z1 Z2. In this case, Z1 represents natural rubber and Z2 represents a durometer selected to achieve a desired shear rate. The selected durometer may be based on a given predefined scale, such as the Shore A scale, the ASTM D2240 type A scale, or the ASTM D2240 type D scale. In a preferred embodiment, in accordance with the Shore A scale, Z2, for example, is preferably 70±5. In another embodiment, in accordance with the Shore A scale, Z2 is, for example, within the range of 50 to 80. Other examples of Z2 and ranges for Z2 are also possible.

In another respect, the load blocks 96 (for example, viscoelastomeric load blocks) may comprise a viscoelastomeric material that (i) has elastic characteristics when the shear spring 68 is under a load within a given range and when that load is removed, and (ii) has non-elastic characteristics (for example, does not return to an original non-loaded shape) if the applied load exceeds the greatest load of the given range. The given range may extend from no load to a maximum expected load plus a given threshold. The given threshold accounts for possible overloading of the shear spring 68. As an example, the viscoelastomeric material may comprise amorphous polymers, semi-crystalline polymers, and biopolymers. Other examples of the viscoelastomeric material are also possible.

In accordance with an embodiment, the load blocks 96 may also comprise one or more fillers. The filler(s) may optimize performance of the load blocks 96. The fillers may include, but are not limited to, wax, oil, curing agents, and/or carbon black. Such fillers may optimize performance by improving durability of the load blocks 96 and/or tuning the load blocks 96 for a given shear load and/or a given compressive load applied to the load blocks 96. Improving durability of the load blocks 96 through the use of fillers may include, for example, minimizing a temperature rise versus loading characteristic of load blocks 96 and/or maximizing shape retention of the load blocks 96.

The shear springs 68 may be formed, for example, by inserting the plates 98 into a mold (not shown). The plates 98 may each be coated with a coating material. As an example, the coating material may comprise a material comprising zinc and phosphate, modified with calcium. The coating material may have a coating weight of 200-400 milligrams per square foot. Other examples of the coating material are also possible. A bonding agent may be applied to the coated plates for bonding the plates 98 to the load blocks 96. As an example, the bonding agent may comprise Chemlok® manufactured by the Lord Corporation, Cary, N.C., USA. Other examples of the bonding agent are also possible. Applying the coating material and/or applying the bonding agent may occur prior to, during, and/or after insertion of the plates 98 into the mold. After applying the coating material and the bonding agent, the load block material (while in a pourable form) may be inserted into the mold to form the load blocks 96.

In a preferred embodiment, any exposed portion of the plates 98 (for example, a portion of the plates 98 not covered by the load block material) is protected against corrosion by a means other than the load block material. In other embodiments, some exposed portions of the plates 98 (e.g., the edges of the plates 98) may not be protected against corrosion, whereas any other exposed portions of the plates 98 are protected against corrosion. FIGS. 8C and 8D illustrate sectional views of an embodiment of the shear spring 68, and in particular, through-holes 99 within the plates 98. The through-holes 99 permits the load block material to flow more easily through the mold when forming the load blocks 96.

As explained above, the shear springs 68 are mounted in compression. In an illustrated embodiment, compression of the shear spring 68 is due to the compressive load provided by mounting them between the spring pockets (for example, pocket 92) in the side walls 64 of the spring module 56 and pockets formed in the spring mount 70. Other means of preloading the shear springs may alternatively be used.

The shear springs 68 contribute to the vertical spring rate of the suspension 50 through their shear spring rate. This vertical spring rate is constant over the entire range of motion for the suspension 50. For a spring module with elastomeric shear springs, the vertical spring rate can be customized for any given shear spring geometry by using an elastomer with a different durometer rating.

The compressive spring rate for the shear springs 68 is preferably designed to be constant over a small range of compression, to aid in assembly, to be asymptotic in the as-installed condition, and to keep suspension longitudinal travel due to shear spring compression during vehicle acceleration or deceleration to a minimum, preferably under five millimeters.

Each of the plates 98 for the shear spring 68 has minimal, if any, effect on the shear spring rate thereof. The plates 98 are used for optimization of the compressive characteristics of the shear springs 68. The compression rate of the shear spring 68 may be increased by adding an additional plate 98 with a corresponding load block 96, whereas the compression rate of the shear spring 68 may be decreased by removal of a plate 98 and a corresponding load block 96. The plates 98 can be made of any of a variety of suitable materials, including, but not limited to, iron, steel, aluminum, plastic, a composite material, or some other material. The dimensions and shape of the plates 98 may be selected so as to obtain preferred packaging, weight and aesthetic characteristics of the shear springs 68 and for locating the shear springs 68 in the hanger and spring mount pockets. The plates 98 may be fully, or at least substantially, encapsulated in elastomer to further enhance their corrosion resistance and friction at the mating suspension members.

In accordance with an embodiment, the desired shear rate of the shear spring 68 is approximately 403 N/mm (or approximately 2,300 pound force per inch (i.e., $lb_f/in$)), the initial compressive spring rate of the shear spring 68 is approximately 6,000 N/mm (or approximately 34,200 $lb_f/in$), the maximum shear travel of shear spring 68 is approximately 68.7 mm (approximately 2.7 inches), and the installed height of shear spring 68 is approximately 83.8 mm (approximately 3.3 inches).

Figure 9:
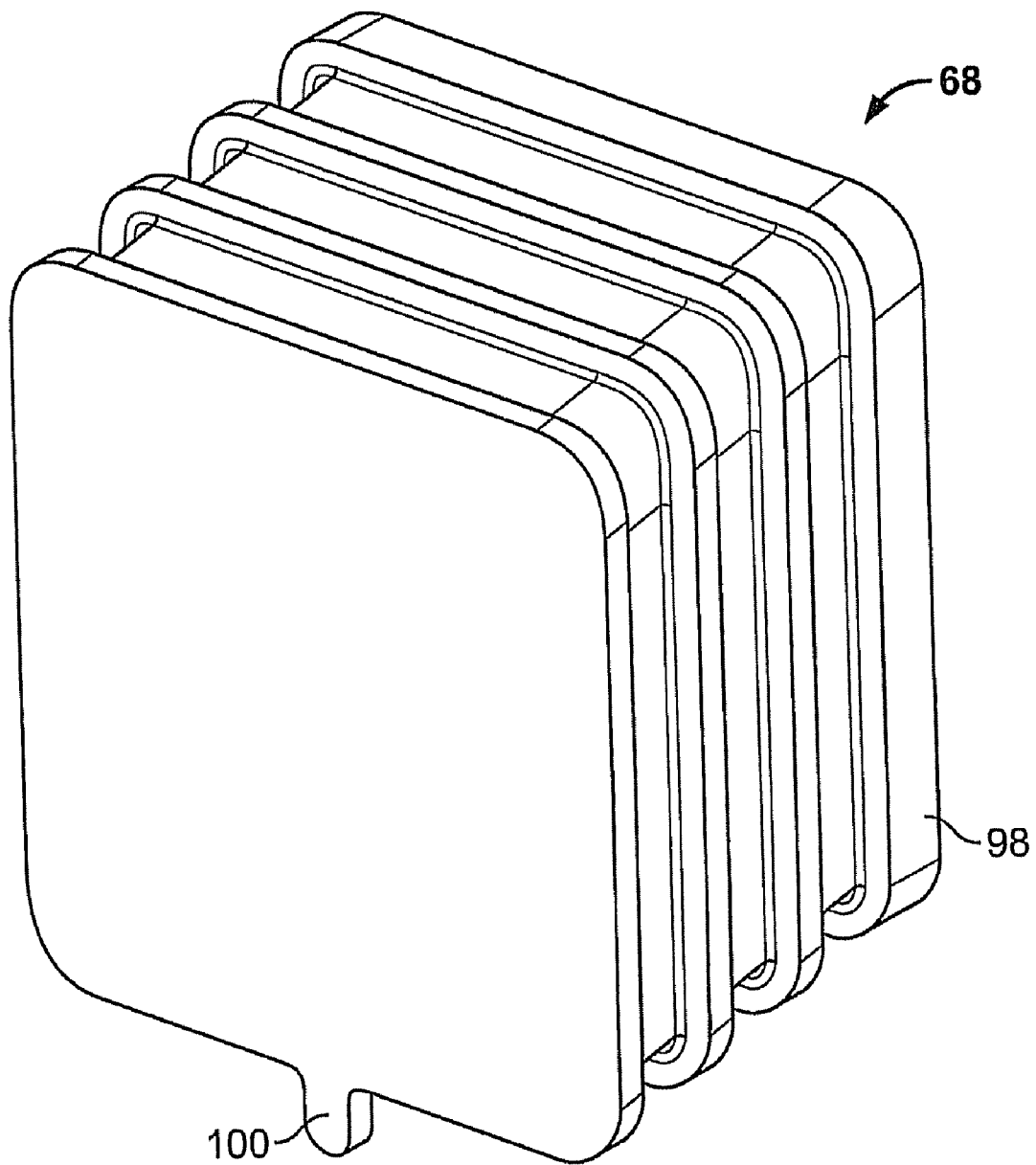
FIG. 9 is a perspective view of another shear spring in accordance with an exemplary embodiment.

FIG. 9 illustrates an embodiment of a shear spring 68 having an optional tab 100 incorporated into the periphery thereof. The tab 100 ensures proper shear spring orientation during assembly. It will be appreciated that any such tabs, if used, can by any shape, size or count.

Figure 10:
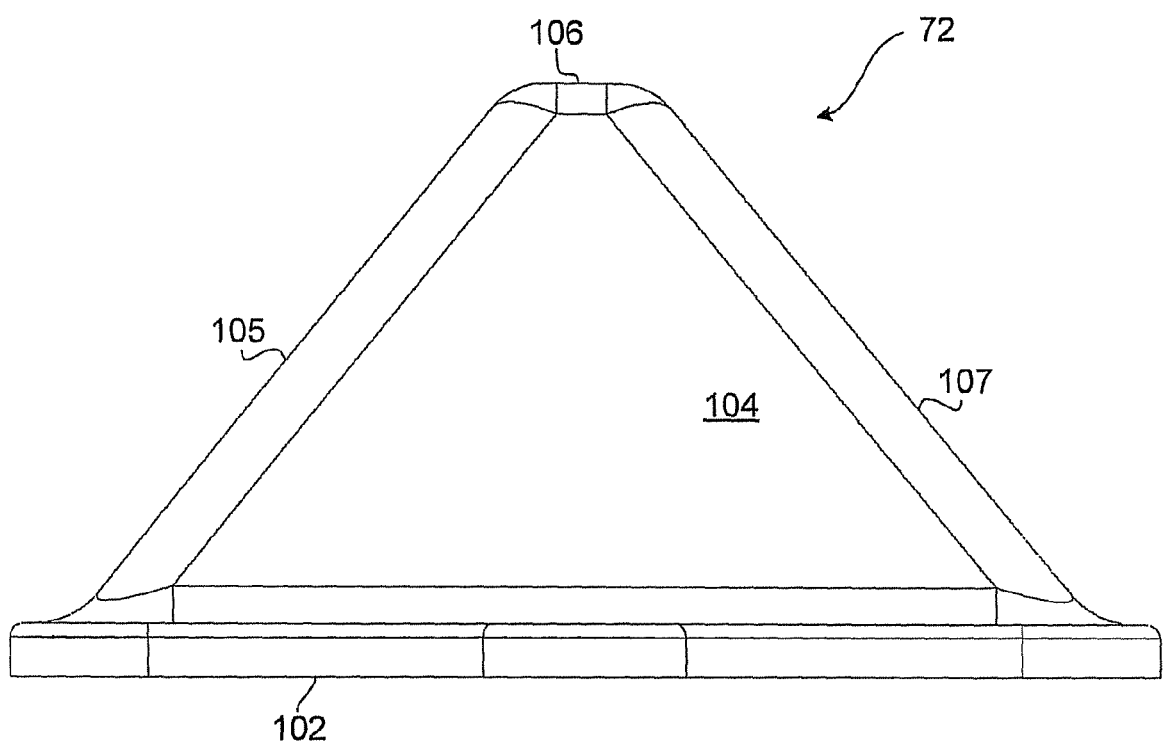
FIG. 10 is an elevational view of a progressive spring rate load cushion illustrated in FIG. 1.

FIG. 10 illustrates an embodiment of a progressive spring rate load cushion 72. The progressive spring rate load cushion 72 may be positioned between the spring mount 70 and the dome-like configuration 94 and attached to the spring mount 70 by fasteners. Generally, each progressive spring rate load cushion 72 is designed to have at least one tapered wall (for example, tapered walls 105, 107) and generally similarly shaped horizontal cross sections of different sizes throughout. For these embodiments, each horizontal cross section has a generally similar shape as other horizontal cross sections, but it does not have the same size or sectional area as other horizontal cross sections. The size change factor, or ratio of similitude, is a function of the taper of the at least one tapered wall. The horizontal cross sections can be any geometric shape desired for packaging, weight or aesthetics.

In accordance with an exemplary embodiment, the load cushion 72 is an elastomeric progressive spring rate load cushion shaped to resemble a pyramid. In this regard, the load cushion 72, as illustrated in FIG. 10, includes a base plate 102, an elastomer 104 shaped to resemble the pyramid, and a flattened top surface 106. The base plate 102 can be made of a variety of suitable materials, including, but not limited to, iron, steel, aluminum, plastic, and a composite material. The base plate dimensions and shape can be varied to any dimension or shape desired for packaging, weight, and aesthetics. Preferably, the base plate 102 is dimensioned to match the top surface of the spring mount 70, to locate the fasteners securing it to the spring mount 70, and to minimize overall mass.

The size and dimensions of the elastomer 104 for the progressive spring rate load cushion 72 is optimized for the vertical spring rate requirements. For the present application, the vertical spring rate for the progressive spring rate load cushion 72 continuously increases with increasing load, defining a curvilinear shape with no discontinuities on a graph illustrating spring rate as a function of sprung load. The size and dimensions of the elastomer 104 may be based on a shape factor, which is a ratio of an area of a loaded surface (for example, a flattened top surface 106) to the total area of unloaded surfaces free to expand (for example, the four walls of the elastomer 104 leading from the base plate 102 to the top surface 106).

A preferred progressive spring rate load cushion 72 has a shape closely resembling a pyramid with a flattened top surface 106, as indicated. With this preferred shape, the vertical spring rate for the progressive spring rate load cushion 72 linearly increases with increasing load. In one embodiment, the cross section of the base of the elastomer 104 is 5 inches by 6 inches, the cross section of the top surface 106 is 0.8 inches by 0.8 inches and the height of the elastomer 104 is 3.2 inches. The spring rate of the progressive spring rate load cushion 72 may be optimized by varying the durometer of the elastomer 104. By varying the durometer, a family of interchangeable progressive spring rate load cushions can be created.

Figure 11:
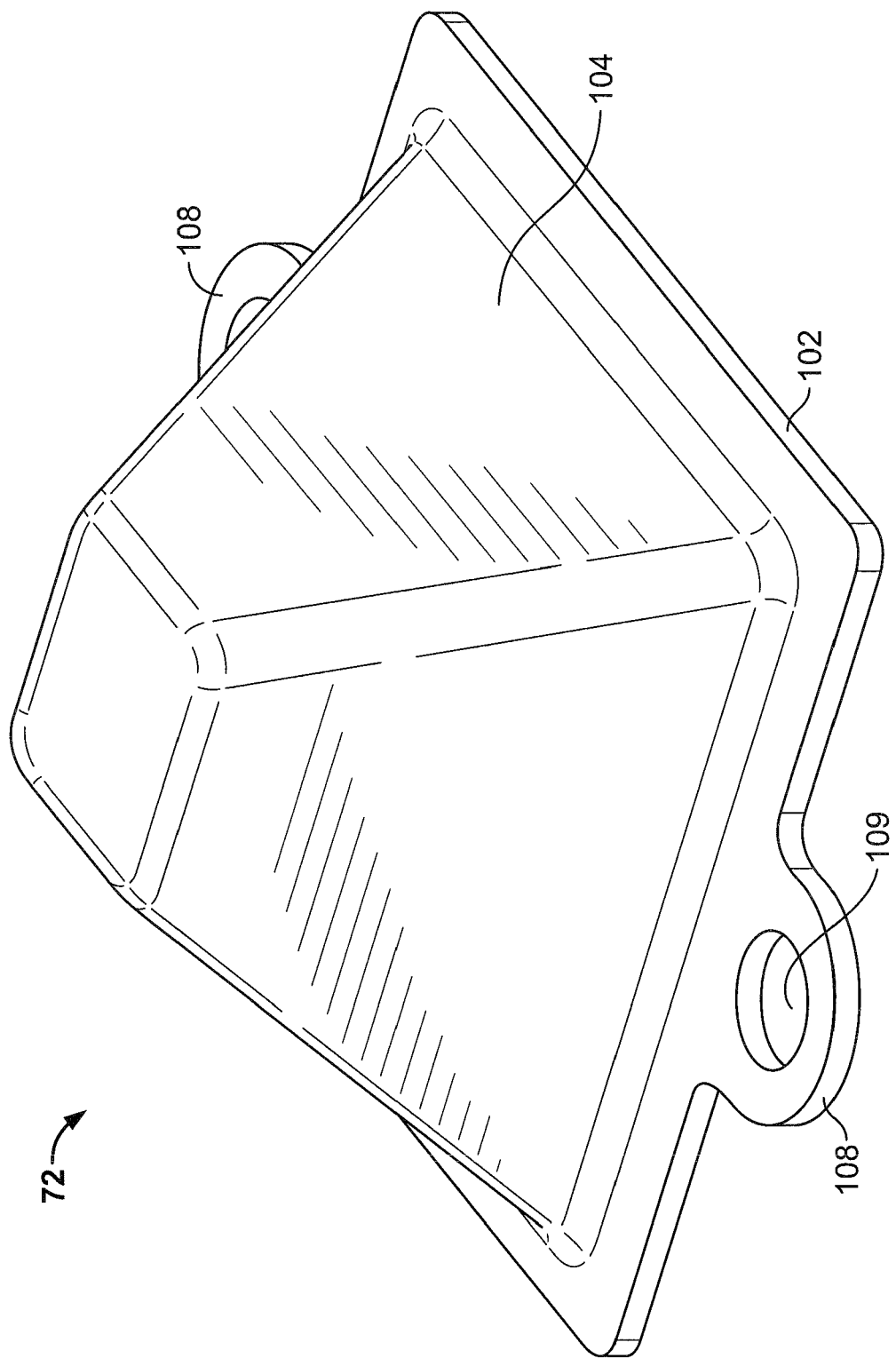
FIG. 11 is a perspective view of another embodiment of a progressive spring rate load cushion.
Figure 12:
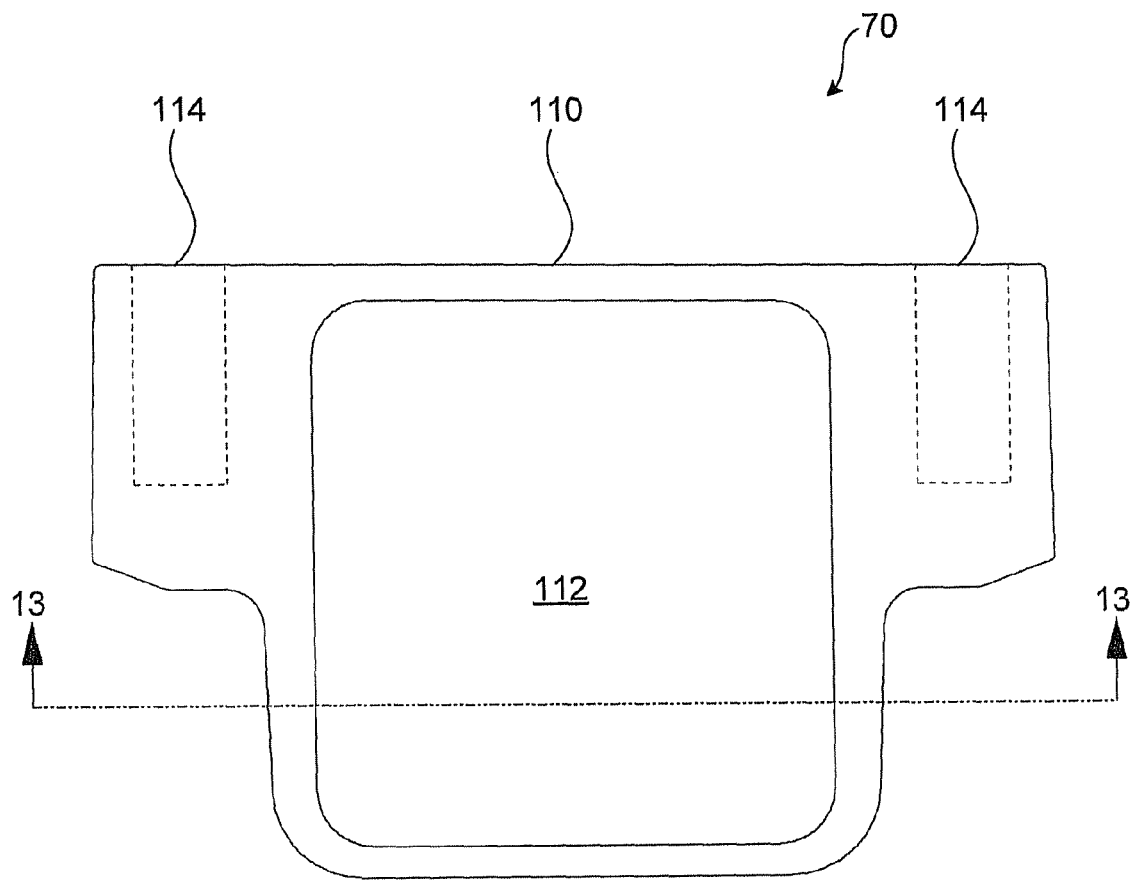
FIG. 12 is a side elevational view of a spring mount illustrated in FIG. 1.
Figure 13:
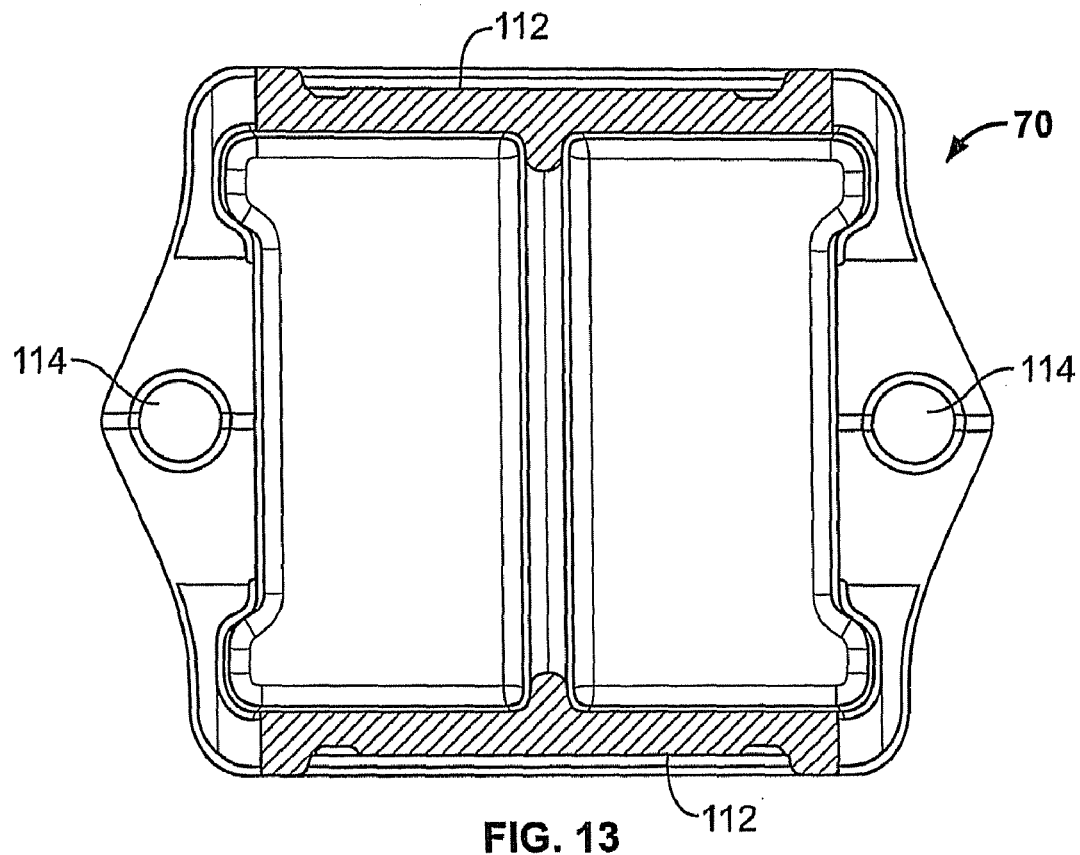
FIG. 13 is a sectional view of the spring mount illustrated in FIG. 12, taken along lines 13-13 thereof.
Figure 15:
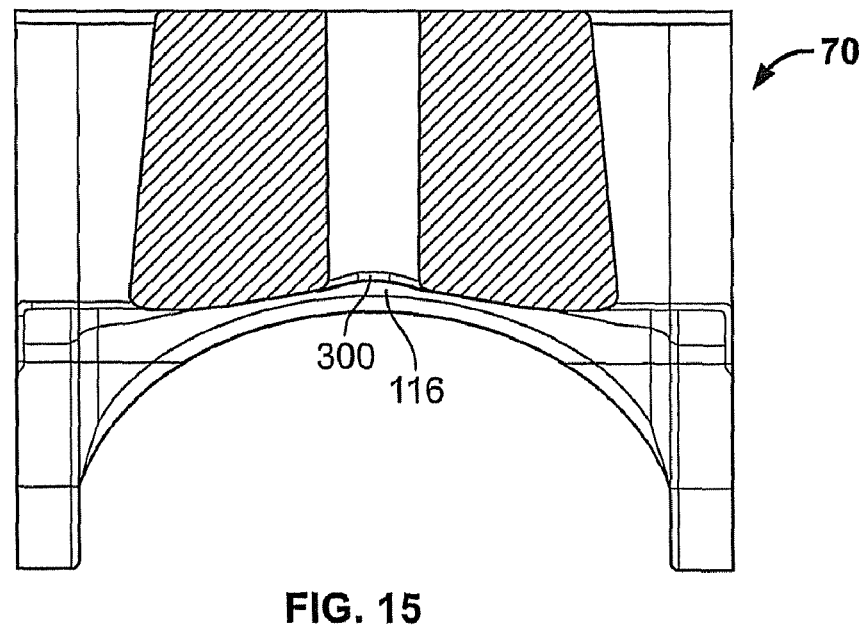
FIG. 15 is a sectional view of the spring mount illustrated in FIG. 14, taken along lines 15-15 thereof.
Figure 14:
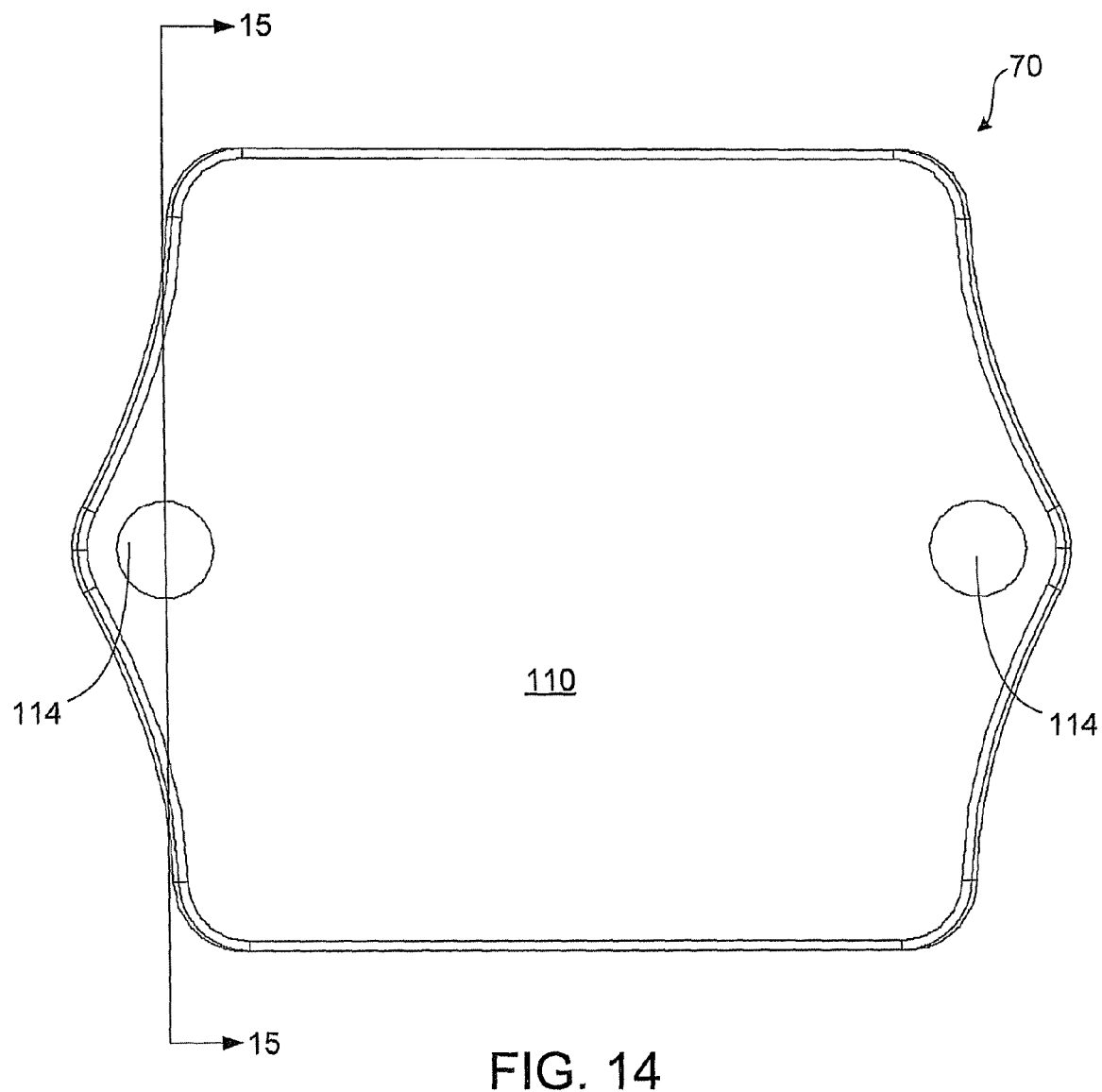
FIG. 14 is a top plan view of the spring mount illustrated in FIG. 12.
Figure 16:
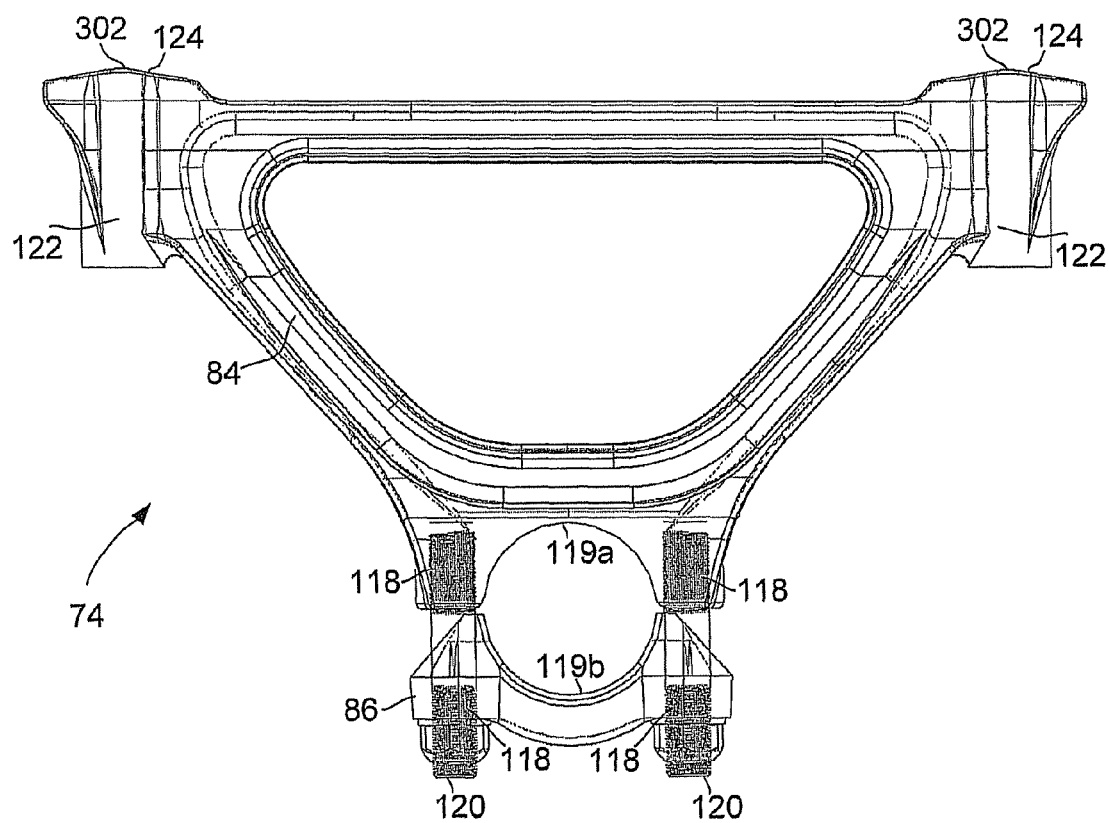
FIG. 16 is a side elevational view of the saddle assembly illustrated in FIG. 1.
Figure 17:
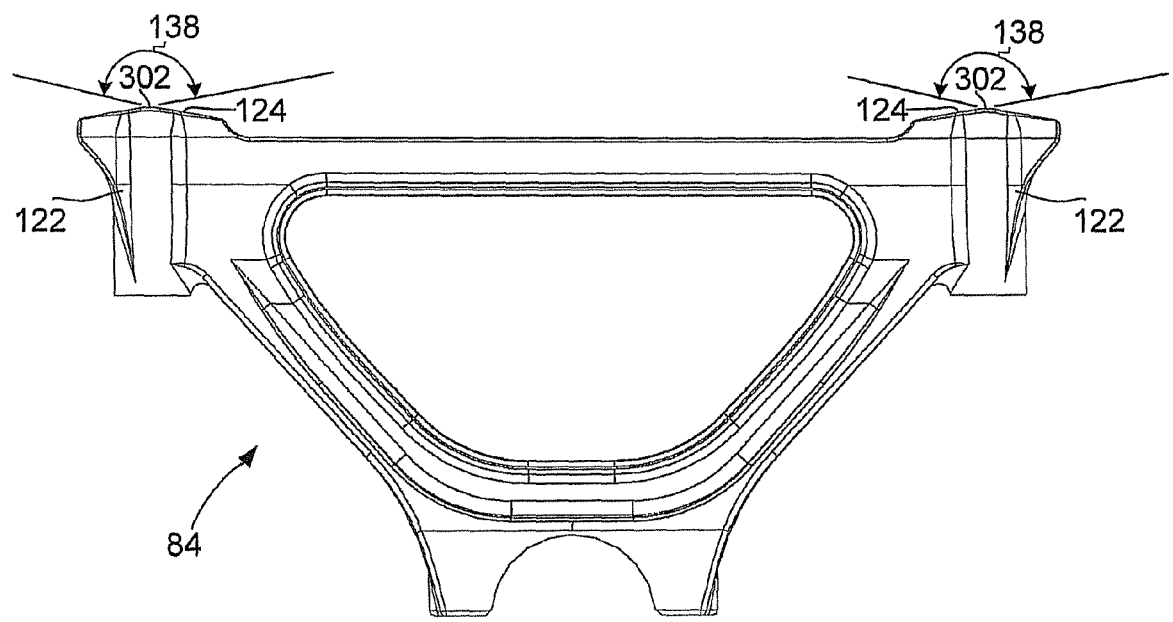
FIG. 17 is a side elevational view of the saddle portion of the saddle assembly illustrated in FIG. 16.
Figure 18:
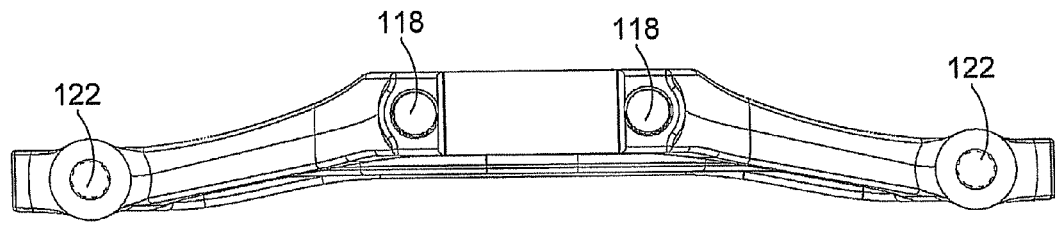
FIG. 18 is a bottom plan view of the saddle illustrated in FIG. 17.

FIG. 11 illustrates an embodiment of an elastomeric progressive spring rate load cushion 72 having its base plate 102 fully encapsulated in the elastomer 104 for greater corrosion resistance and to provide friction at the spring mount interface. In an alternative embodiment, a portion of the base plate 102 may be exposed (e.g., not covered by the elastomer 104). This exposed portion of the base plate 102 may be protected against corrosion by a means other than the elastomer 104. In yet another embodiment, all of the exposed portion of the base plate 102, except for the edges of the exposed portion of the base plate 102 may be protected against corrosion by a means other than the elastomer 104. By way of example, the base plate 102 may extend between 0.25 inches to 0.5 inches beyond all portions of the widest portion of the pyramidal portion of the elastomer 104.

As illustrated in FIG. 11, the load cushion 72 has ears 108 incorporated into the base plate 102. Each ear 108 includes a through-hole 109 through which a fastener may be inserted and fastened to the spring mount 70 and/or to the saddle assembly 74 so as to retain the load cushion 72 within the suspension 50. The through-hole 109 may be any of a variety of shapes. For example, the through-hole 109 may be rectangular. In this way, the inserted fastener may comprise a round head and square neck bolt, known in the art as a carriage bolt. As another example, the through-hole 109 may be circular. In this way, the inserted fastener may comprise a hex head bolt. Other suitable fasteners, and correspondingly shaped through-holes, may alternatively be used.

FIGS. 12-15 illustrate an embodiment of the spring mount 70 included within each spring module 56. The spring mount 70 includes a generally flat top surface 110 upon which progressive spring rate load cushion 72 is seated, a pair of pockets 112 positioned on opposite sides thereof for accommodating the shear springs 68, and a pair of saddle mounting bores 114 positioned on opposite sides thereof forming saddle interfaces and permitting attachment to the suspension saddles 84.

The oppositely positioned pockets 112 are preferably dimensioned for locating the shear springs 68 in assembly. The horizontal span separating the pockets 112, provided by the dimensions of the spring mount 70, is also optimized for desired compression of the shear springs 68 in assembly. In addition, the depth of the pockets 112 may be optimized for clearance of the shear springs in operation as the shear springs move through their full stroke. Pocket depth optimization also provides secondary vertical and horizontal retention of the shear springs in addition to the retention provided by the compression of the shear springs and by the coefficient of friction between the shear springs and the mating member, With the preferred dimensions, no fasteners are required to retain the shear springs 68 in assembly, although embodiments that do require fasteners to retain the shear springs 68 are also within the scope of the subject matter disclosed herein.

The saddle interface for spring mount 70 forms a female portion 116 of a spring mount-saddle mechanical joint having a desired angle for maintaining joint integrity in all operating conditions. For a saddle assembly in a suspension that is operable to handle a first maximum load, the desired angle is preferably about 160 degrees. In an alternative arrangement, such as a saddle assembly in a suspension that is operable to handle a second maximum load, where the second maximum load is greater than the first maximum load, the desired angle may be less than 160 degrees, such as 140 degrees. A person having ordinary skill in the art will understand that the desired angle of the female portion of the spring mount-saddle mechanical joint may be a number of degrees between 120 degrees and 180 degrees.

The spring mount-saddle interface mechanical joint eliminates direct shear loading of the fasteners 117 (see FIG. 2), since the shear loading is borne exclusively by the joint. The spring mount-saddle interface mechanical joint reduces the criticality of fastener preload and minimizes the number of fasteners required. The fasteners 117 may each comprise a carriage bolt, a standard hex head bolt or a hex flange bolt, or some other type of fastener.

A spring mount fillet 300 is preferably included at the apex of the saddle interface for the spring mount 70 to minimize stress concentrations. The spring mount fillet 300 may have a radius of twenty millimeters. The spring mount fillet 300 prevents intimate contact at the peak of the saddle interface for the spring mount 70 when the saddle 84 is fastened thereto. The fillet 300 also ensures that the only active surfaces for the mechanical joint are the inclined planes of the joint. In this way, required tolerances are eased and as-cast surfaces may be used to construct the joint.

The spring mount 70 may be made from any of a variety of materials. In a preferred embodiment, the spring mount 70 is made from D55 ductile iron. In another embodiment, the spring mount 70 may, for example, be made from another type iron, steel, aluminum, a composite material, such as carbon fiber, or some other material.

FIGS. 16-19 illustrate an embodiment of a saddle assembly 74 included within a suspension. The saddle assembly 74 includes a saddle portion (or more simply, a saddle) 84 and a saddle cap end portion 86. One half bore 119*a* is formed in the center hub interface of saddle portion 84 to form an upper half of a saddle cap arrangement, and another half bore 119*b* is formed in the saddle cap end portion 86 to form a lower half of the saddle cap arrangement. Due to relaxed tolerances for this saddle cap arrangement, the saddle assembly 74, including the saddle portion 84 and the saddle cap end portion 86, may be assembled as cast. This construction provides for a saddle cap interface with the attached equalizing beam or other vehicle component and is known in the art. Saddle cap bores 118 may be machined into the saddle portion 84 and the saddle cap end portion 86 so that fasteners 120 shown in the form of studs and nuts (see FIG. 16) may secure the saddle portion 84 and the saddle cap end portion 86 together when the saddle assembly 74 is attached to an equalizing beam 78 or other component.

Figure 45:
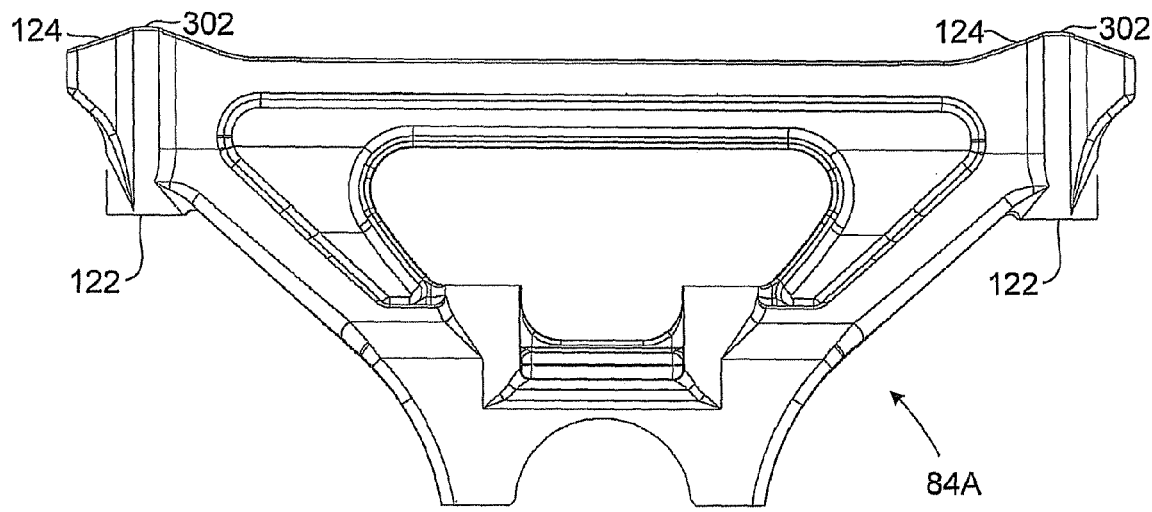
FIG. 45 is a side elevational view of a saddle in accordance with an exemplary embodiment.
Figure 46:
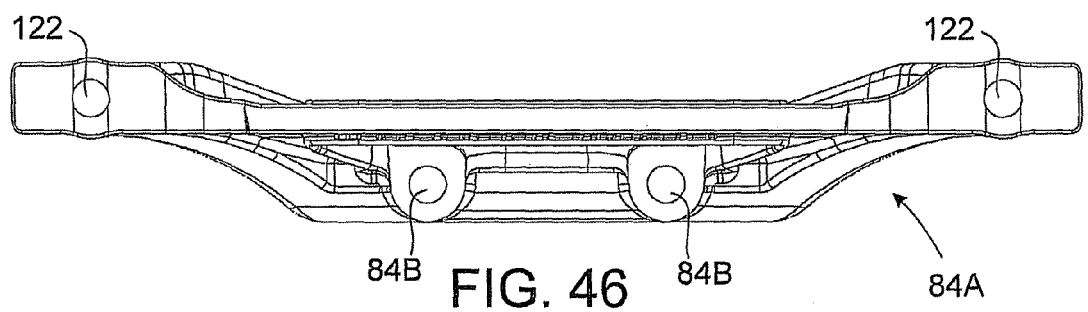
FIG. 46 is a bottom plan view of the saddle illustrated in FIG. 45.
Figure 47:
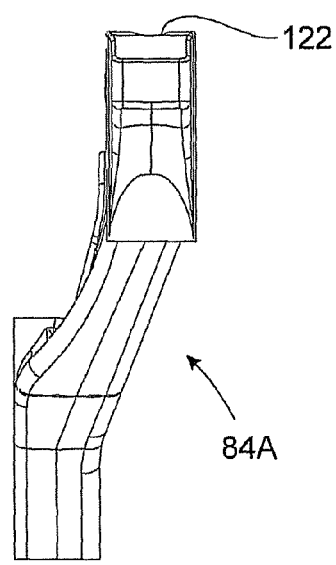
FIG. 47 is an end view of the saddle illustrated in FIG. 45.
Figure 48:
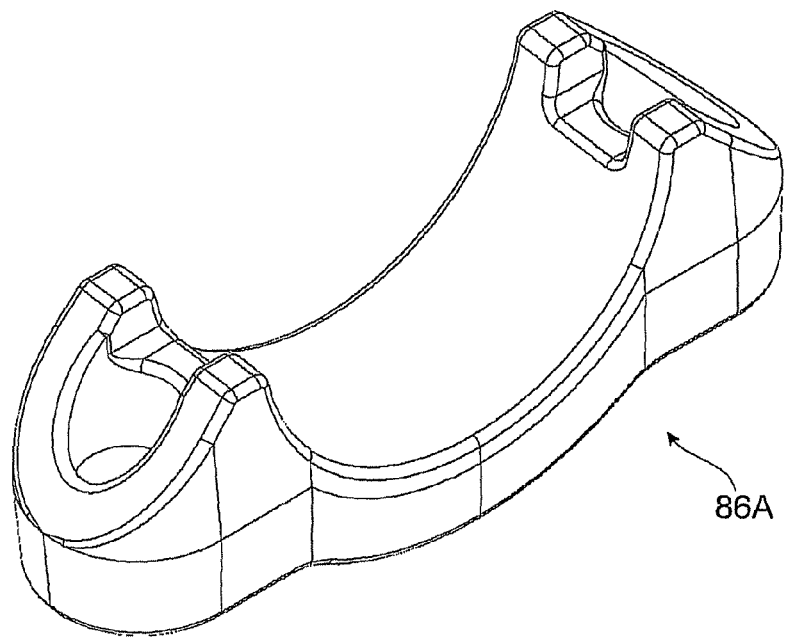
FIG. 48 is a perspective view of a saddle cap end portion in accordance with an exemplary embodiment.
Figure 49:
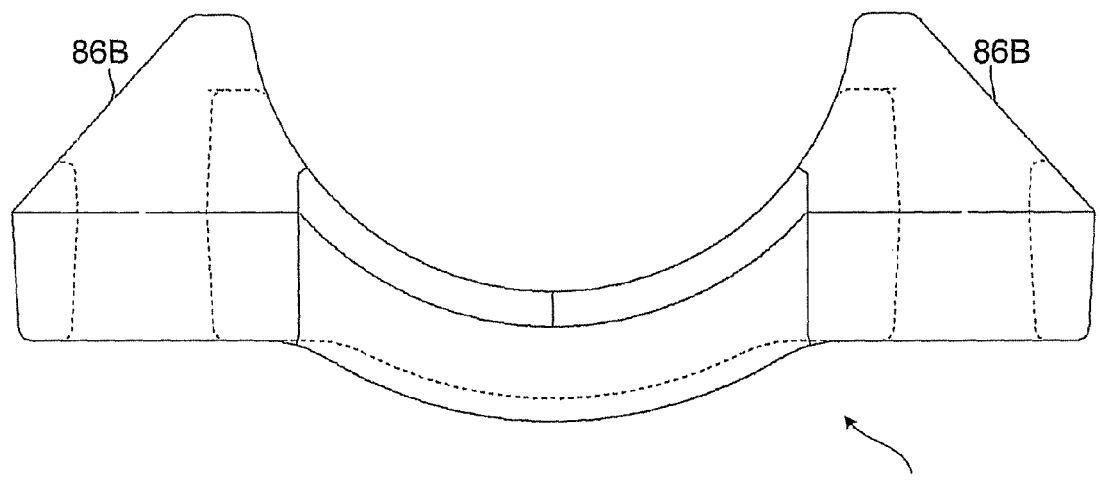
FIG. 49 is a side elevational view of the saddle cap end portion illustrated in FIG. 48.

FIGS. 45-49 illustrate another embodiment that may be used within the saddle assembly 74. In particular, FIGS. 45-47 illustrate a saddle 84A and FIGS. 48 and 49 illustrate a saddle cap end portion 86A. The saddle 84A and the saddle cap end portion 86A may be made of iron, steel, aluminum, a composite material, or some other material, and may each comprise a separate cast that is formed from a casting process known to those having ordinary skill in the art. In this way, the saddle 84A may include through-holes 84B that are formed when the saddle 84A is cast, and the saddle cap end portion 86A may include through-holes 86B that are formed when the saddle cap end portion 86A is cast. Fasteners, such as the fasteners 117, may be inserted into the through-holes 84B, 86B for subsequent fastening and attachment of the saddle cap end portion 86A to the saddle 84A. In an alternative embodiment, the through-holes 84B and/or the through-holes 86B may be formed by machining.

The saddles 84, 84A preferably have a space frame/truss-like geometry or construction, as illustrated, to minimize component stress during suspension operating conditions and to minimize component mass. The saddles 84, 84A further have spring mount mounting bores 122 for alignment with the saddle mounting bores 114 of the spring mount 70 or the spring mount 346 (see FIG. 26). The saddles 84, 84A include a male portion 124 for the preferred spring mount interface thereof, designed to be received within the counterpart female portion 116 of the spring mount-saddle interface mechanical joint. For a saddle assembly for use in a suspension to handle the first maximum load, a span 138 of the male portion 124 of the mechanical joint is also preferably 160 degrees. In an alternative arrangement, such as the saddle assembly in a suspension that is operable to handle the second maximum load, the span 138 of the male portion of the mechanical joint may be less than 160 degrees, such as 140 degrees. A person having ordinary skill in the art will understand that the span 138 may be a number of degrees between 120 degrees and 180 degrees.

A saddle round 302 is preferably included at the apex of the spring mount interface for the saddles 84, 84A to minimize stress concentrations. The saddle round 302 may be larger than the spring mount fillet 300. In a preferred case, the saddle round 302 has a radius that is ten millimeters larger then the radius of the spring mount fillet 300. In this way, if the spring mount fillet 300 has a radius of twenty millimeters, then the saddle round 302 has a radius of thirty millimeters. The saddle round 302 prevents intimate contact at the peak of the spring mount interface for the saddles 84, 84A when the spring mount 70 or the spring mount 346 is fastened thereto. The saddle round 302 also ensures that the only active surfaces for the mechanical joint are the inclined planes of the joint. In this way, required tolerances are eased and as-cast surfaces for the saddle and the spring mount may be used to construct the joint.

Figure 20:
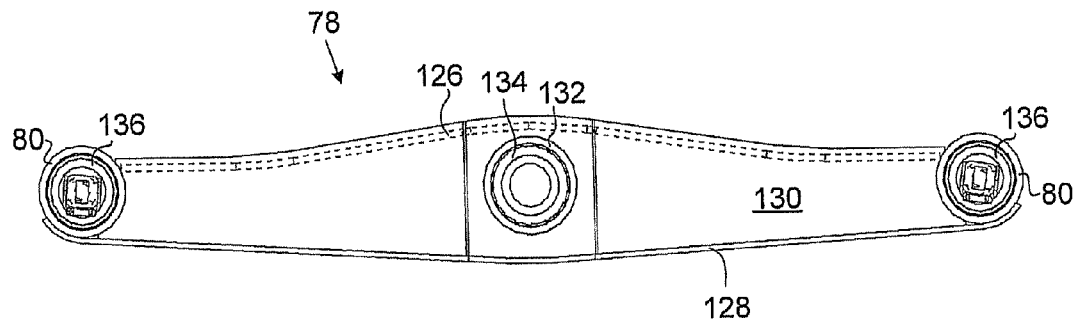
FIG. 20 is a side elevational view of a fabricated equalizing beam illustrated in FIG. 1.
Figure 21:
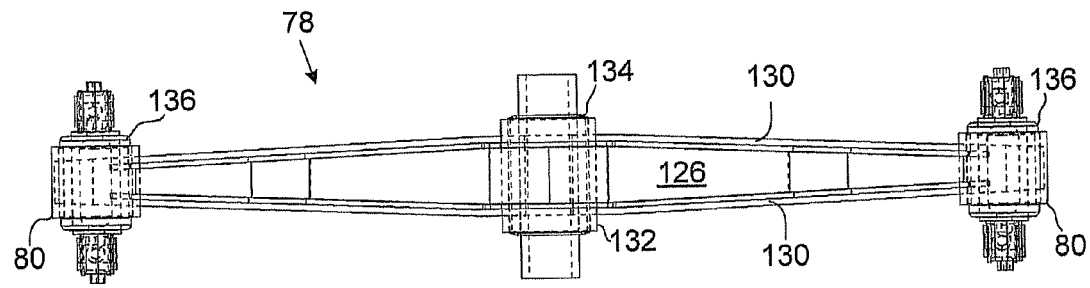
FIG. 21 is a top plan view of the fabricated equalizing beam illustrated in FIG. 20.
Figure 19:
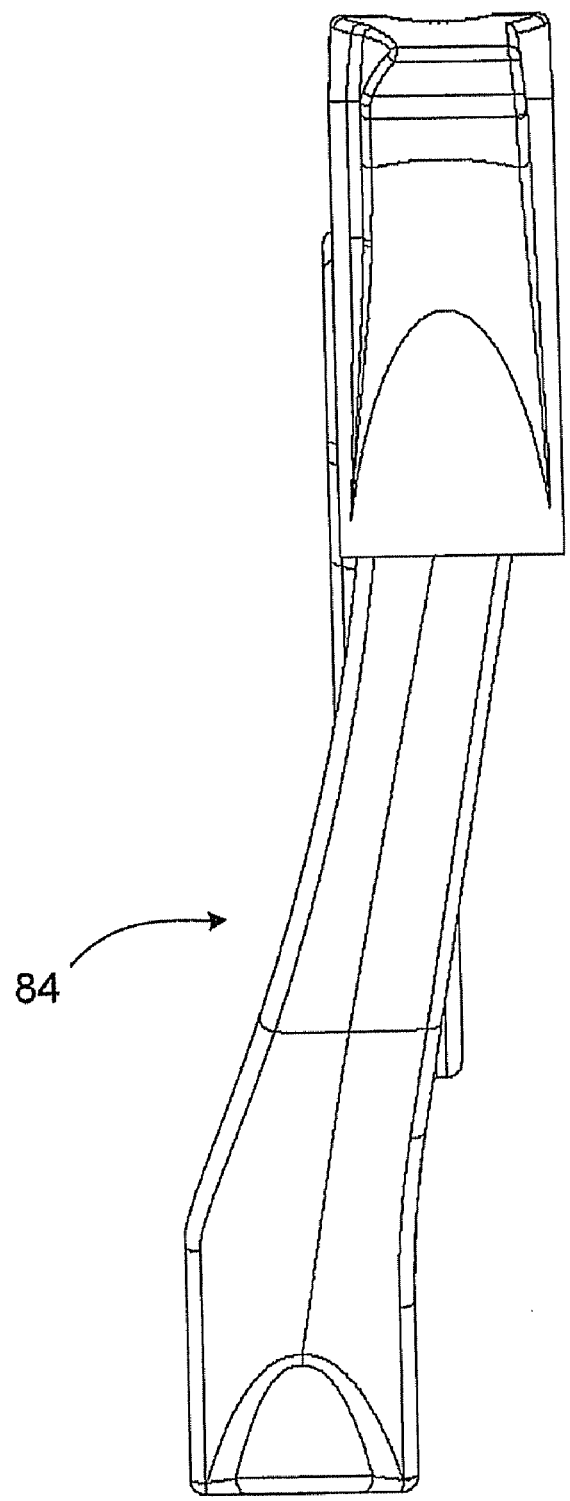
FIG. 19 is an end view of the saddle illustrated in FIG. 17.

FIGS. 20 and 21 illustrate an embodiment of an equalizing beam 78 (also referred to as a walking beam) that may be used in the suspension 50, as well as in the other suspensions described herein. The equalizing beam 78 is preferably a fabricated component having a top plate 126, a bottom plate 128, side plates 130, two end bushing hubs 80, and one center bushing hub 132. Center bushing hub 132 is included in a central portion of the side plates 130 to retain a center bushing 134 mounted therein for connection to the saddle assembly 74. Additional bushings 136 are retained in the end bushing hubs 80 for connection to the tandem axles (not shown) in a known manner.

The use of the equalizing beam 78 results in minimal interaxle brake load transfer due to a real pivot point created at the equalizing beam center bushing 134. The use of the equalizing beam 78 also improves articulation by virtue of this real pivot point.

The suspensions described herein are modular. As one example, the vehicle ride height may be set, as desired. In particular, the vehicle ride height may be changed by changing the frame hanger to another with a different dimension between the frame attachment holes and the shear spring pockets. The vehicle ride height may also be changed by changing the saddle to another with a different dimension between the center hub interface and the spring mount interfaces thereof. In addition, replacement of both the frame hanger and saddle with others having different dimensions may change the vehicle ride height.

The principles described herein may also be used in a variety of elastomeric spring suspensions for a variety of axle configurations. For example, while an elastomeric spring suspension for a tandem axle chassis having an equalizing beam has been described, the principles extend to single axle chassis, to tandem axle chassis without equalizing beams, and to tridem axle chassis (with or without equalizing beams), by exchanging the saddle for another with the appropriate axle interface.

It is to be noted that the load capacity for the suspension may be increased to match chassis size by the addition of spring modules or partial spring modules to the frame hanger assembly, or by replacement of the progressive spring rate load cushion with another, such as a load cushion having a flattened top surface (apex) with a larger surface area and/or a larger base. Alternatively, load capacity for the suspension may be reduced to match chassis size by removal of spring modules or partial spring modules from the frame hanger assembly, or by replacement of the progressive spring rate load cushion with another, such as a load cushion having a flattened top surface (apex) with a smaller surface area and/or a smaller base.

2. Additional Exemplary Suspensions

Figure 22:
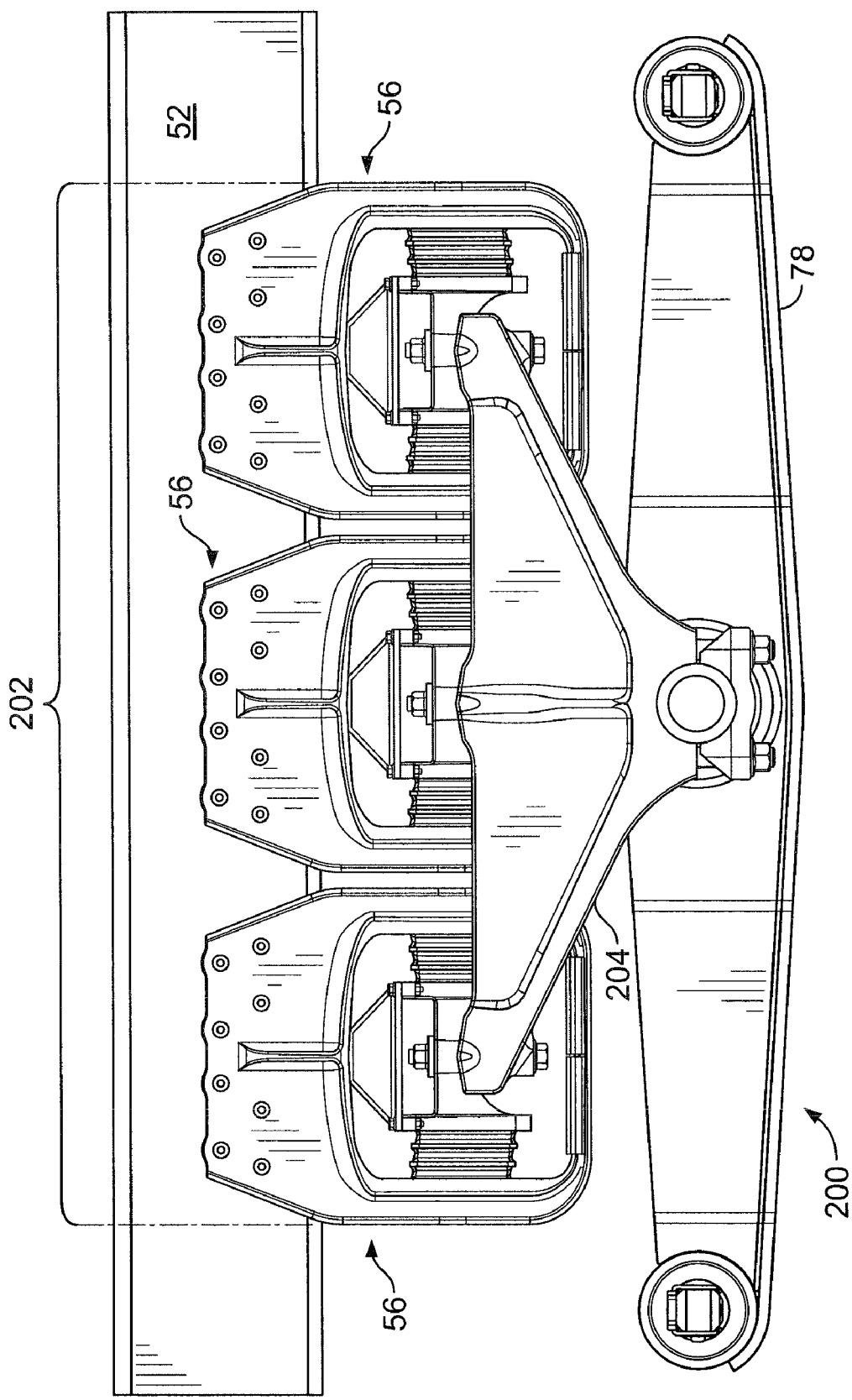
FIG. 22 is a side elevational view of another suspension constructed in accordance with principles disclosed herein.

FIG. 22 illustrates another spring suspension 200 embodiment designed preferably for use with a vocational or heavy haul truck having a tandem axle configuration. Three full spring modules 56 define the frame hanger assembly 202. In addition, the saddle assemblies 204 used in suspension 200 have three spring mount interfaces. Outside of the foregoing, the suspension 200 is similar to the suspension 50 illustrated in FIG. 1. The use of the additional spring module 56 generates greater load capacity for the suspension 200 than for the suspension 50 illustrated in FIG. 1, assuming everything else is identical.

The spring suspension 200, in accordance with a given embodiment, may have and/or provide, but is not limited to having and/or providing, one or more of the following characteristics: (i) a continuously increasing spring rate (curvilinear and with no discontinuities) as a function of an increasing load applied to the suspension 200, (ii) an almost linearly increasing spring rate as a function of increasing load applied to the suspension 200, (iii) minimal interaxle brake load transfer and/or improved articulation due to a pivot point created at a center bushing of the equalizing beam 78, (iv) minimal or no tensile loading to one or more springs of the suspension 200, (v) improved durability due to a reduced number of fasteners, mechanical joints that reduce the criticality of fastener preloads, and the elimination of tensile loading in one or more springs of the suspension 200, (vi) good ride quality on a lightly loaded chassis without sacrificing roll stability at rated chassis load, (vii) no restrictions with regards to the usage of tire chains, and (viii) no abrupt change in spring rate due to engagement or disengagement of an auxiliary spring as the vehicle employing the suspension 200 encounters moderate to large variations in roadway or operating conditions.

Figure 23:
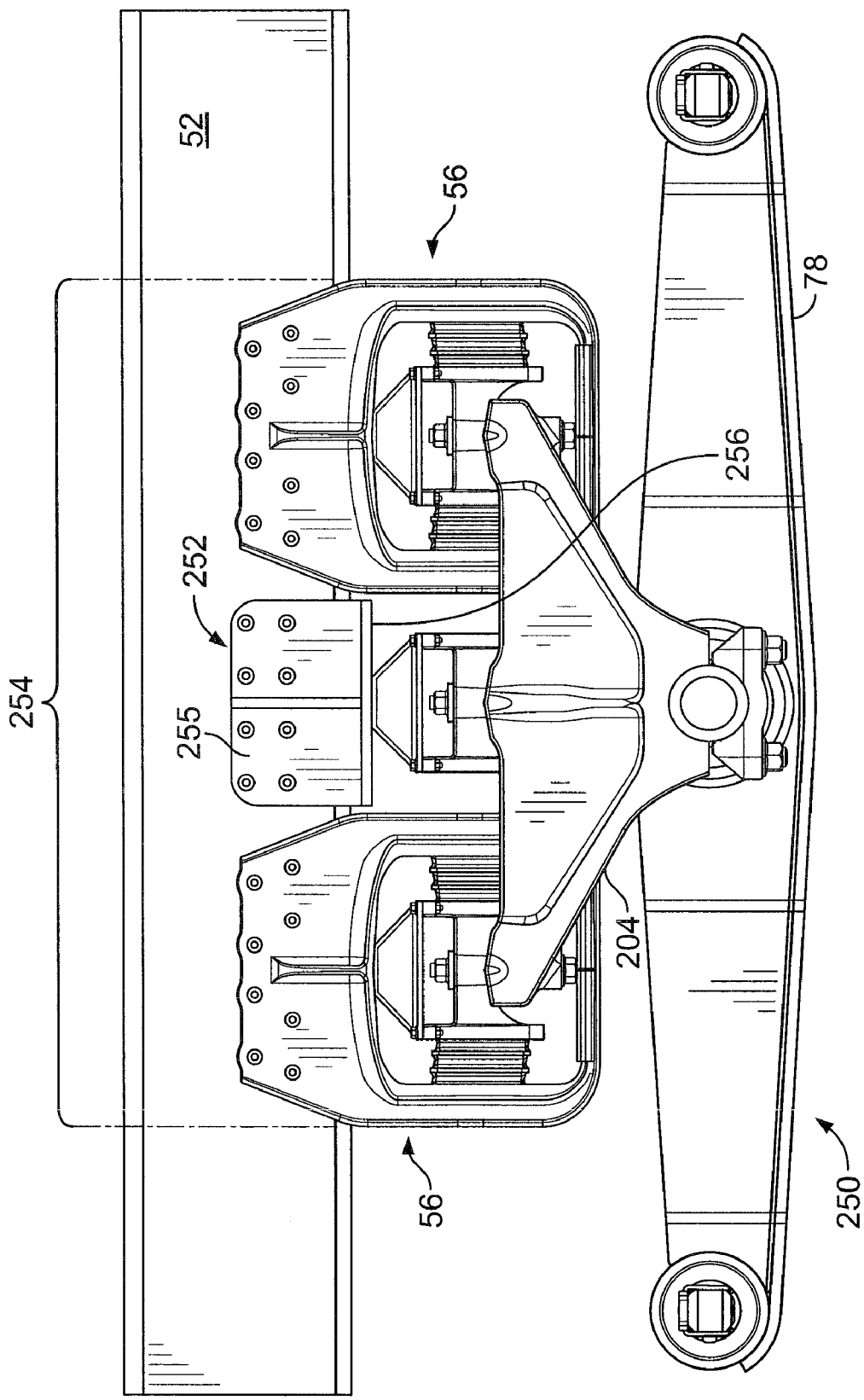
FIG. 23 is a side elevational view of still another suspension constructed in accordance with principles disclosed herein.

FIG. 23 illustrates yet another embodiment of a spring suspension 250 designed preferably for use with a vocational or heavy haul truck having a tandem axle configuration. The suspension 250 has two full spring modules 56 and one half/partial spring module 252 defining a frame hanger assembly 254. The two full spring modules 56 are constructed generally as described above for the embodiments of the suspensions 50 and 200, illustrated in FIGS. 1 and 22 respectively.

In the embodiment of FIG. 23, the partial spring module 252 includes a frame attachment portion 255 having a bottom wall 256. The progressive spring rate load cushion 72 is retained by fasteners and positioned between the bottom wall 256 and the spring mount 70 included as part of the partial spring module 252. The bottom wall 256 may include a dome-like configuration, such as the dome-like configuration 94 described above. The saddle assemblies 204 used in the suspension 250 may be similar to those used in the suspension 200 illustrated in FIG. 22. The use of a partial spring module 252, in addition to the two full spring modules 56, generates greater load capacity for the suspension 250 than the suspension 50 illustrated in FIG. 1, assuming everything else is identical.

The spring suspension 250, in accordance with a given embodiment, may have and/or provide, but is not limited to having and/or providing, one or more of the following characteristics: (i) a continuously increasing spring rate (curvilinear and with no discontinuities) as a function of an increasing load applied to the suspension 250, (ii) an almost linearly increasing spring rate as a function of increasing load applied to the suspension 250, (iii) minimal interaxle brake load transfer and/or improved articulation due to a pivot point created at a center bushing of the equalizing beam 78, (iv) minimal or no tensile loading to one or more springs of the suspension 250, (v) improved durability due to a reduced number of fasteners, mechanical joints that reduce the criticality of fastener preloads, and the elimination of tensile loading in one or more springs of the suspension 250, (vi) good ride quality on a lightly loaded chassis without sacrificing roll stability at rated chassis load, (vii) no restrictions with regards to the usage of tire chains, and (viii) no abrupt change in spring rate due to engagement or disengagement of an auxiliary spring as the vehicle employing the suspension 250 encounters moderate to large variations in roadway or operating conditions.

Figure 25:
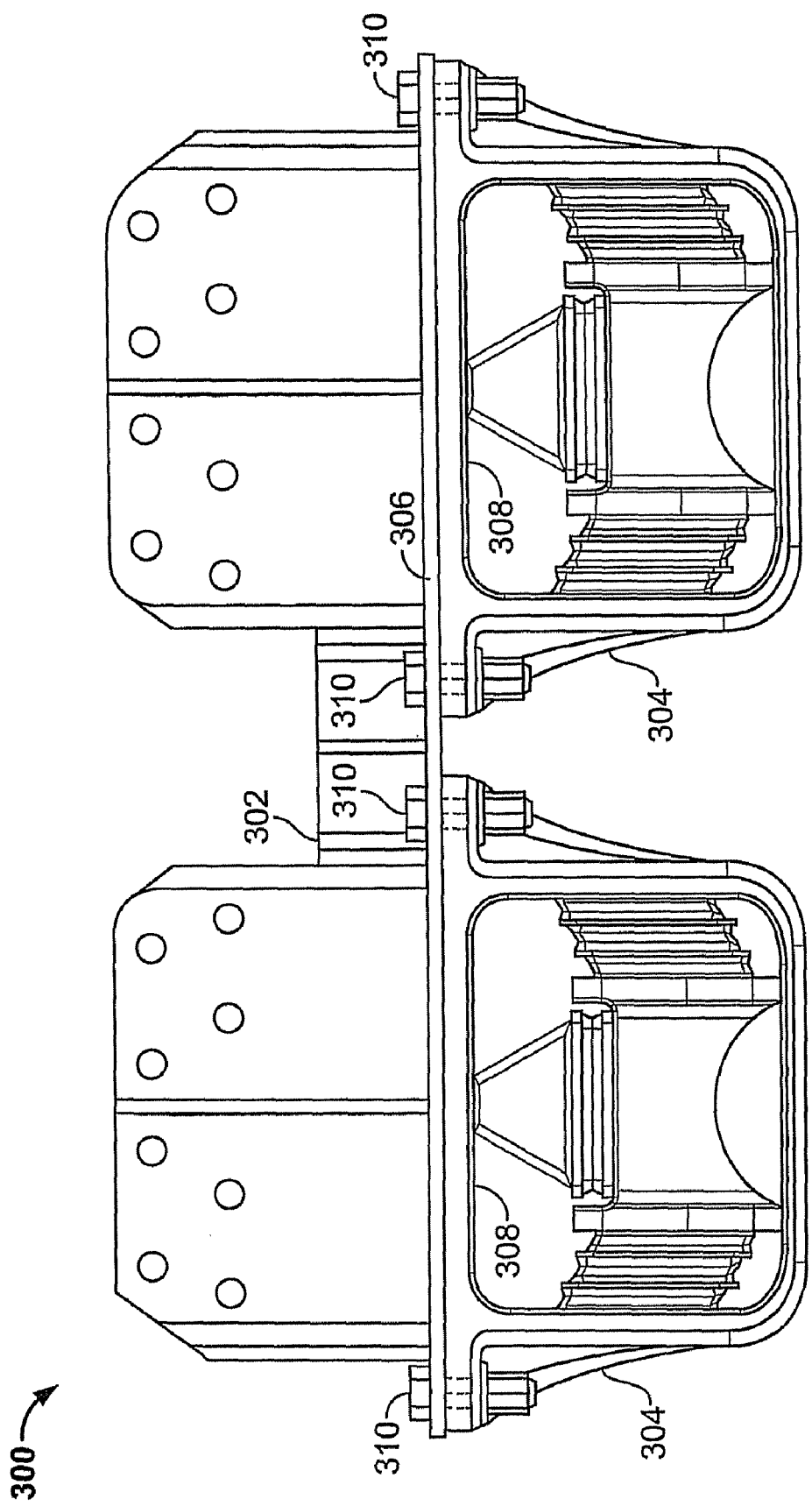
FIG. 25 is a side elevational view of an alternative frame hanger assembly for use in suspensions constructed in accordance with principles disclosed herein.

FIG. 25 illustrates an embodiment of a frame hanger assembly 300 including a frame interface (for example, attachment brackets) 302 and removably attachable spring modules (for example, suspension attachment) 304. The frame interface 302 includes a lower wall 306 permitting attachment to an upper wall 308 of each spring module 304 through the use of fasteners 310. The fasteners 310 may be configured as the fasteners 117 (described above). The spring modules 304 may include the shear springs 68, the spring mount 70, and the progressive spring rate load cushion 72, such as those described above.

For this embodiment, the use of frame hanger assembly 300 enhances the modularity of the exemplary suspension systems. For example, the replacement of spring modules 304 with other spring modules 304 having springs with a different vertical spring rate for the suspension is facilitated. In addition, multiple vehicle frame configurations (i.e., ride heights and frame widths) can be absorbed through modifications to the hole/bore positions machined through the frame interface 302, permitting production of a uniform, universal spring module 304. This results in reduced inventories of parts. This also permits compatibility to any industry standard frame configuration worldwide, while also simplifying assembly.

The modular frame hanger assembly 300 may also be universal in the sense that it can be sized and adapted for all vehicle frame configurations. As a result, a single spring module 304 can be used for all vehicle frame configurations. Various frame interfaces 302 may be used for each particularly different vehicle frame configuration.

Next, FIGS. 26-28 illustrate various views of a frame hanger assembly 330 in accordance with another exemplary embodiment. The frame hanger assembly 330 may support longitudinally extending frame rails (for example, the frame rails 52) above laterally extending vehicle axles of a tandem axle configuration for the vehicle. As illustrated in FIG. 26, the frame hanger assembly 330 includes a frame hanger 332, spring modules 334, 335, and a saddle assembly 337 that is attached to an outboard-side of the spring modules 334, 335. FIG. 27 is a top view of the frame hanger assembly 330. FIG. 28 illustrates the saddle assembly 337, as well as a saddle assembly 339 that is attached to an inboard-side of the spring modules 334, 335. The frame hanger 332 may be attached to the spring modules 334, 335 through the use of fasteners 309. The saddle assemblies 337, 339 may be attached to the spring modules 334, 335 through the use of fasteners 351. The fasteners 309, 351 may be configured as the fasteners 117 (described above).

The frame hanger 332 may be arranged in various configurations for attachment to a variety of vehicles. The various vehicles may each have a respective frame configuration (for example, ride height, frame rail width, and/or frame rail hole-pattern). In a first configuration, the frame hanger 332 may, for example, comprise a vertical wall 338 having (i) a first wall height, and (ii) a first frame hanger hole-pattern. In a second configuration, the frame hanger 332 may, for example, comprise a vertical wall 338 having (i) a second wall height, and (ii) the first frame hanger hole-pattern or another frame hanger hole-pattern. For purposes of this description, the second wall height is greater than the first wall height. In this way, a ride height of a vehicle may be increased by replacing the frame hanger 332 having a vertical wall 338 that has the first wall height with the frame hanger 332 having a vertical wall 338 that has the second wall height and/or by replacing saddle assemblies 337, 339 with saddle assemblies having dimensions different from those of saddle assemblies 337, 339. Other configurations of the frame hanger 332, such as configurations that are arranged with a wall height and frame hanger hole-pattern that differ from the wall height and frame hanger hole-pattern combination of each other frame hanger configuration, are also possible.

The various frame hanger hole-patterns may match up to a respective frame rail hole-pattern in an outboard vertical wall of a frame rail. Fasteners, such as the fasteners 117, may be inserted through the holes of the vertical wall 338 and through the outboard vertical wall of the frame rail for subsequent fastening of the frame hanger 332 to the frame rail.

The frame hanger 332 may be made of iron, steel, aluminum, a composite material, or some other material. As illustrated in FIG. 26, the frame hanger 332 includes a lower wall 336 having a first lower wall end 340 and a second lower wall end 342. As illustrated in FIG. 27, the lower wall 336 includes two sets of through-holes 311. Each set of through-holes 311 is arranged in a given spring module attachment hole-pattern that matches holes in the spring modules 334, 335. The frame hanger 332 also includes a vertical wall 338 that extends from the wall end 340 to the wall end 342.

The spring modules 334, 335 each comprise a spring housing 344, a spring mount 346, a progressive spring rate load cushion 348, and shear springs 350, 352. The spring modules 334, 335 may be interchangeable, and may be symmetrical such that the spring modules 334, 335 may be positioned on either the left side or the right side of a vehicle and on either a front or rear of the frame hanger 330. The saddle assemblies 337, 339 may be attached to the spring mounts 346 and to a center bushing of a longitudinally extending fabricated equalizing beam (i.e., a walking beam) (not shown). Thereafter, the saddle assemblies 337, 339 may be unattached from the spring mounts 346 and/or the equalizing beam for any of a variety of reasons (for example, servicing and/or replacement of the saddle assemblies 337, 339).

Figure 55:
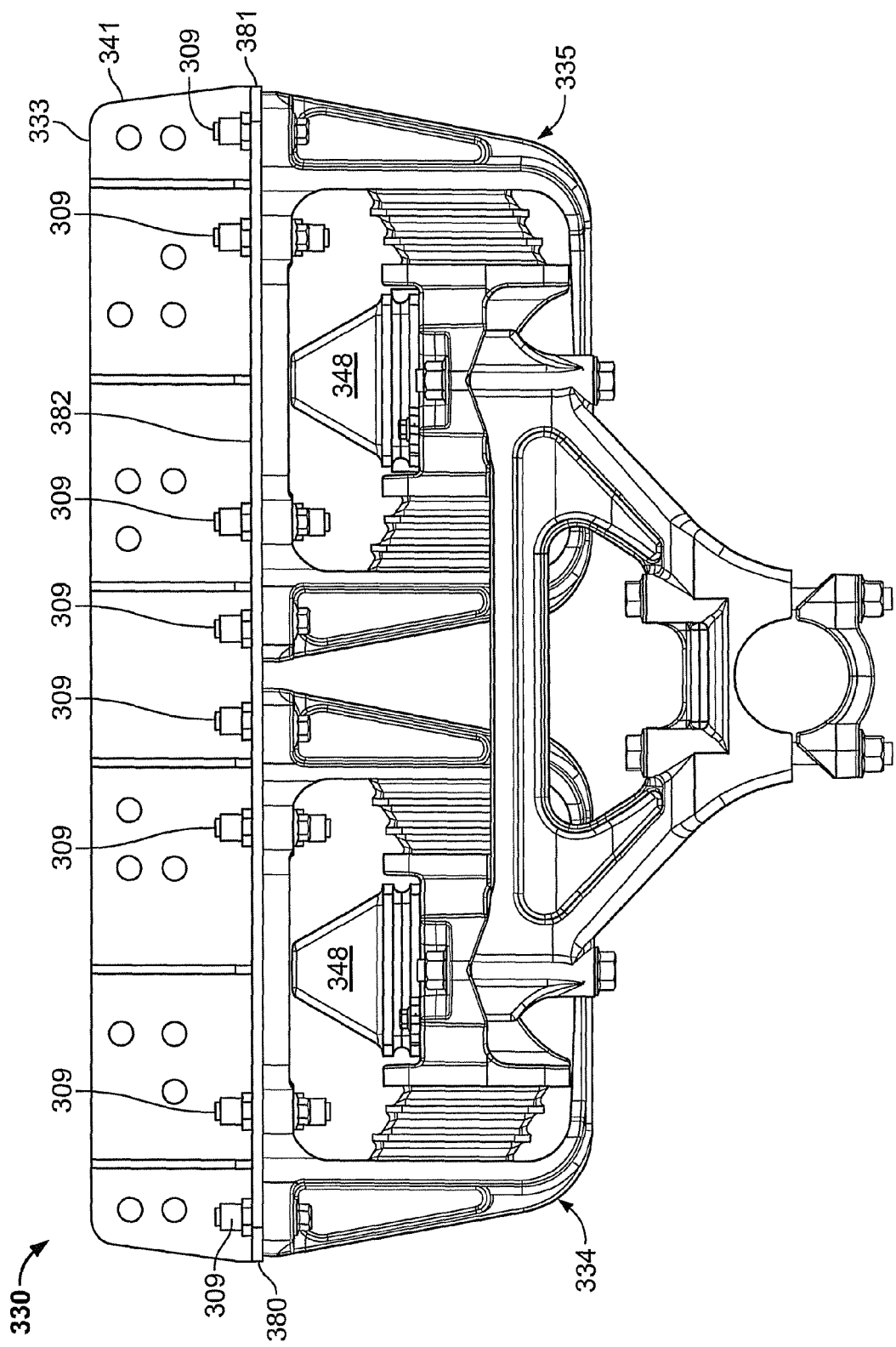
FIG. 55 is a side-elevational view of a frame hanger assembly in accordance with an exemplary embodiment.
Figure 56:
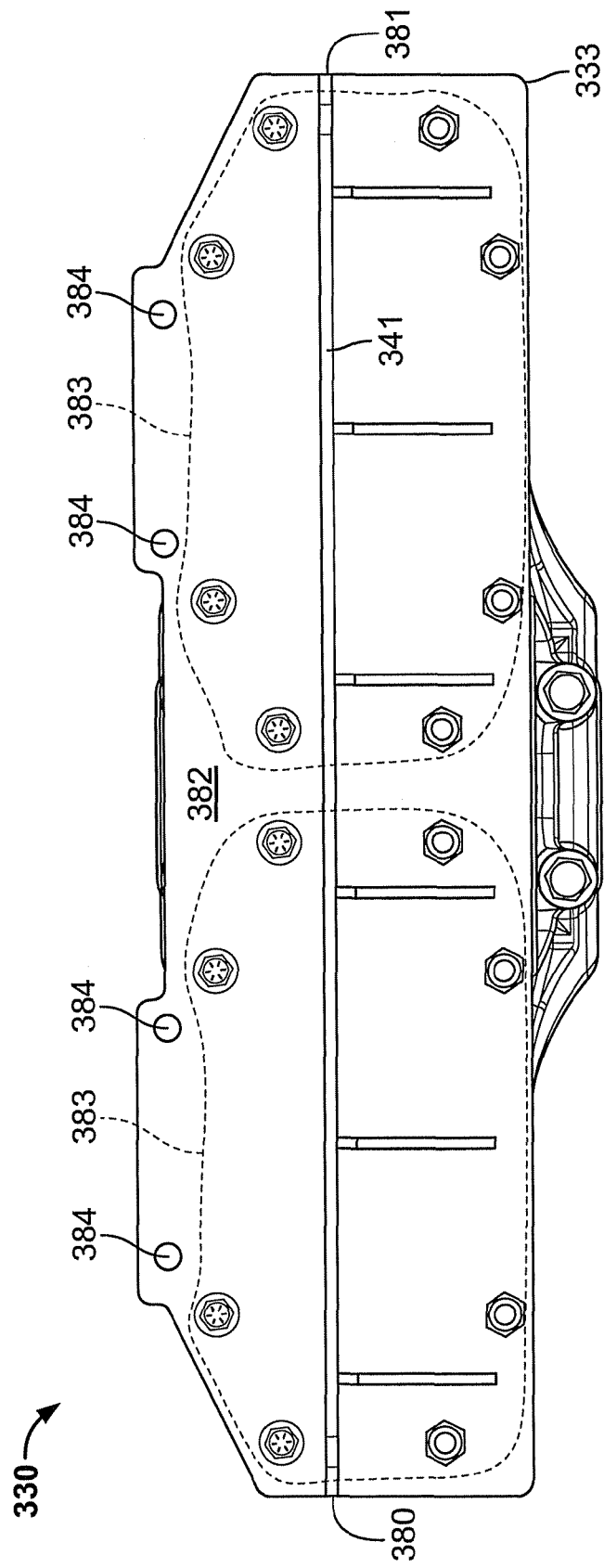
FIG. 56 is a top plan view of the frame hanger assembly illustrated in FIG. 55.
Figure 57:
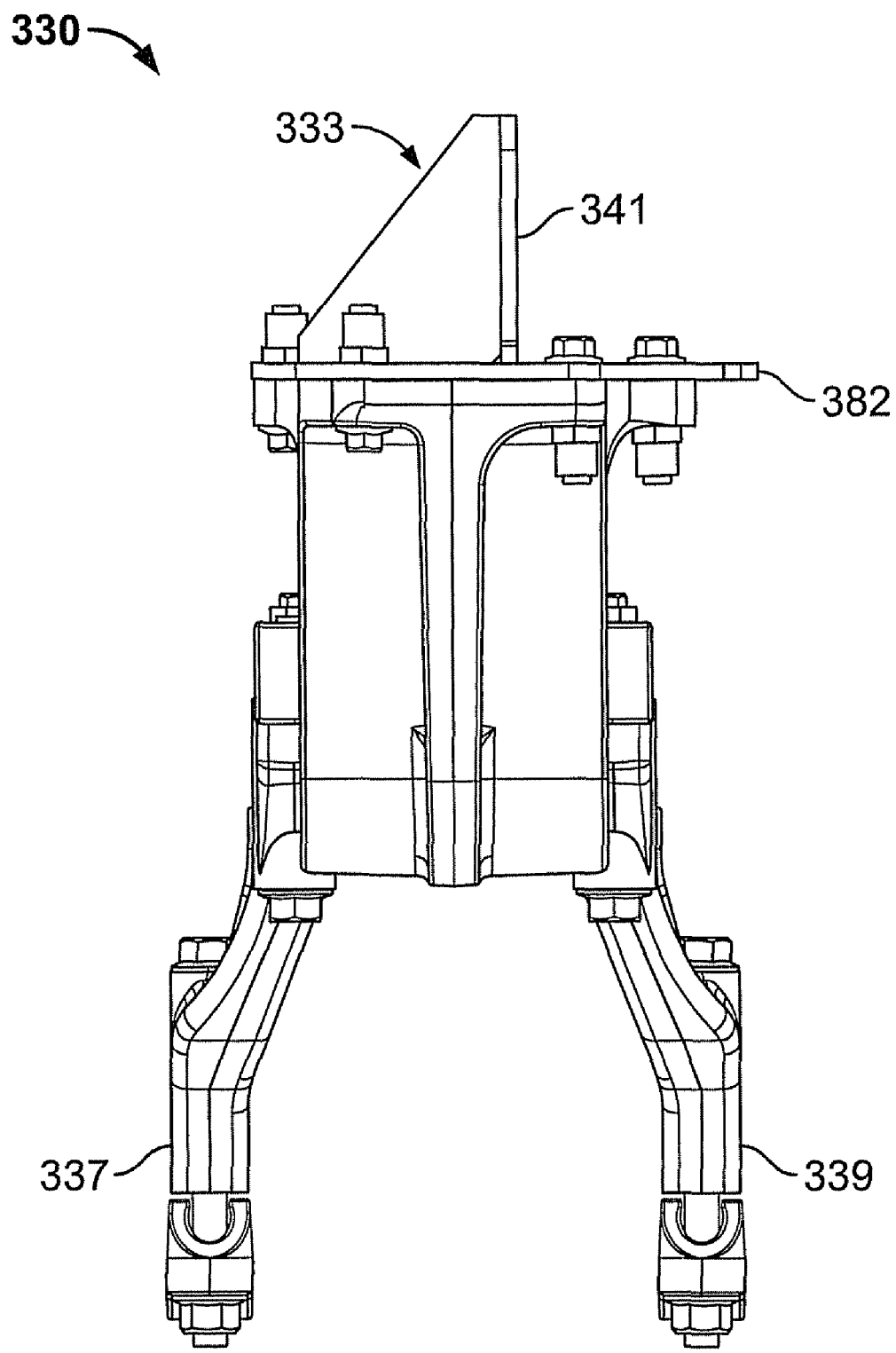
FIG. 57 is an end view of the frame hanger assembly illustrated in FIG. 55.

FIGS. 55-57 illustrate additional views of the frame hanger assembly 330 in accordance with an embodiment in which the frame hanger 332 (see FIGS. 26-28) is replaced with frame hanger 333. The frame hanger 333 may be attached to the spring modules 334, 335 through the use of the fasteners 309.

The frame hanger 333 may be arranged in various configurations for attachment to a variety of vehicles. The various vehicles may each have a respective frame configuration (for example, ride height, frame rail width, and/or frame rail hole-pattern). In a first configuration, the frame hanger 333 may, for example, comprise a vertical wall 341 having (i) a first wall height, and (ii) a first frame hanger hole-pattern. In a second configuration, the frame hanger 333 may, for example, comprise a vertical wall 341 having (i) a second wall height, and (ii) the first frame hanger hole-pattern or another frame hanger hole-pattern. For purposes of this description, the second wall height is greater than the first wall height. In this way, a ride height of a vehicle may be increased by replacing the frame hanger 333 having a vertical wall 341 that has the first wall height with the frame hanger 333 having a vertical wall 341 that has the second wall height. Other configurations of the frame hanger 333, such as configurations that are arranged with a wall height and frame hanger hole-pattern that differ from the wall height and frame hanger hole-pattern combination of each other frame hanger configuration, are also possible.

The various frame hanger hole-patterns may match up to a respective frame rail hole-pattern in an outboard vertical wall of a frame rail. Fasteners, such as the fasteners 117, may be inserted through the holes of the vertical wall 341 and through the outboard vertical wall of the frame rail for subsequent fastening of the frame hanger 333 to the frame rail.

The frame hanger 333 may be made of iron, steel, aluminum, a composite material, or some other material. As illustrated in FIG. 55, the frame hanger 333 includes a lower wall 382 having a first lower wall end 380 and a second lower wall end 381. As illustrated in FIG. 27, the lower wall 382 includes two sets of through-holes 383. Each set of through-holes 383 is arranged in a given spring module attachment hole-pattern. The lower wall 382 may also include holes 384 for attaching the frame hanger 333 to an underside of a vehicle frame rail (for example, frame rail 52). The vertical wall 341 extends from the wall end 380 to the wall end 381.

Next, FIGS. 29-31 illustrate various views of an embodiment of the spring housing 344. The spring housing 344 may be made of iron, steel, aluminum, a composite material, or some other material. In a preferred embodiment, the spring housing 344 is preferably a casting made via a casting process known to those of ordinary skill in the art. In an alternative embodiment, the spring housing 344 may be a fabrication of multiple castings and/or forgings. As illustrated in FIGS. 30 and 33, the spring housing 344 includes depressions 357, which are metal savers to reduce the weight of the spring housing 344.

The spring housing 344 includes an interior portion 345 in which the spring mount 346, the load cushion 348, and the shear springs 350, 352 may be installed. The interior portion 345 may be defined, at least in part, by a bottom wall 354, a top wall 356, and side walls 358, 360. The top wall 356 preferably has through-holes 370 arranged in the same hole-pattern as the pattern of the through-holes in the frame hanger 332 or 333, (for example, through-holes 311 or 383). The top wall 356 may also have through-holes 371 that match up to through-holes on the bottom side of a frame rail and/or a frame rail lower gusset. The fasteners 309 may be inserted through the through-holes 311 or 383 and the through-holes 370 so as to allow fastening and attaching of the spring modules 334, 335 to the frame hanger. In an alternative arrangement, instead of the through-holes 370, the spring housing 344 may use threaded holes that do not extend all the way through the top wall 356.

FIGS. 32 and 33 are sectional views of the spring housing 344. As illustrated in these figures, the spring housing 344 includes the spring housing pockets 364, 366, and a dome-like configuration 368 in the top wall 356. The dome-like configuration 368 may control bulging of the load cushion 348 when the load cushion 348 is under a load, so as to increase the useful life of the load cushion 348. The dome-like configuration 368 also eliminates sharp edges that could damage the load cushion 348 when the load cushion 348 contacts the top wall 356.

The pocket 364 has height, width, and depth dimensions preferably optimized for locating the shear spring 350, and the pocket 366 has height, width, and depth dimensions preferably optimized for locating the shear spring 352. A span 372 between the pockets 364, 366 is preferably optimized for compression of the shear springs 350, 352 in assembly. The compression of the shear springs 350, 352 may, for example, be on the order of 13,000 to 20,000 pounds of load. Further, the depth of the pockets 364, 366 is preferably optimized for clearance of the shear springs 350, 352 in operation as the springs move through their full stroke. Pocket depth optimization also provides secondary vertical and horizontal retention of the shear springs 350, 352 in addition to the retention provided by compression of the shear springs 350, 352 and by the coefficient of friction between the shear springs 350, 352 and the mating member (for example, the pockets 364, 366 and the spring mount 346). Using the preferred dimensions, no fasteners are required to retain the shear springs 350, 352 in assembly, although alternative embodiments that require and/or use fasteners to retain the shear springs 350, 352 are also within the scope of the subject matter disclosed herein.

In FIGS. 26 and 29, the spring housing 344 is illustrated without a snubber. However, in alternative embodiment, the spring housing 344 may include a snubber above the bottom wall 354. Such a snubber may be arranged as the snubber 90 described above.

Figure 37:
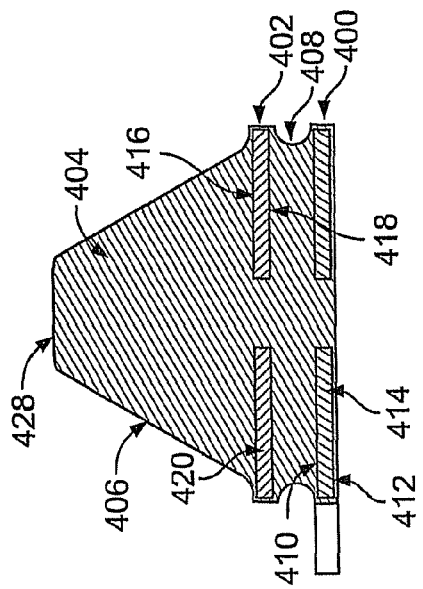
FIG. 37 is a vertical cross section view of the load cushion illustrated in FIG. 34, taken along lines A-A thereof.

Next, FIGS. 34-38 illustrate various views of an embodiment of the progressive spring rate load cushion 348. As illustrated in FIG. 37, the load cushion 348 includes a base plate 400, a rate plate 402, and cushion material 404 including a first cushion portion 406 and a second cushion portion 408. The base plate 400 includes a top side 410, a bottom side 412, and multiple edges 414 between the top side 410 and the bottom side 412. Similarly, the rate plate 402 includes a top side 416, a bottom side 418, and multiple edges 420 between the top side 416 and the bottom side 418.

Figure 50:
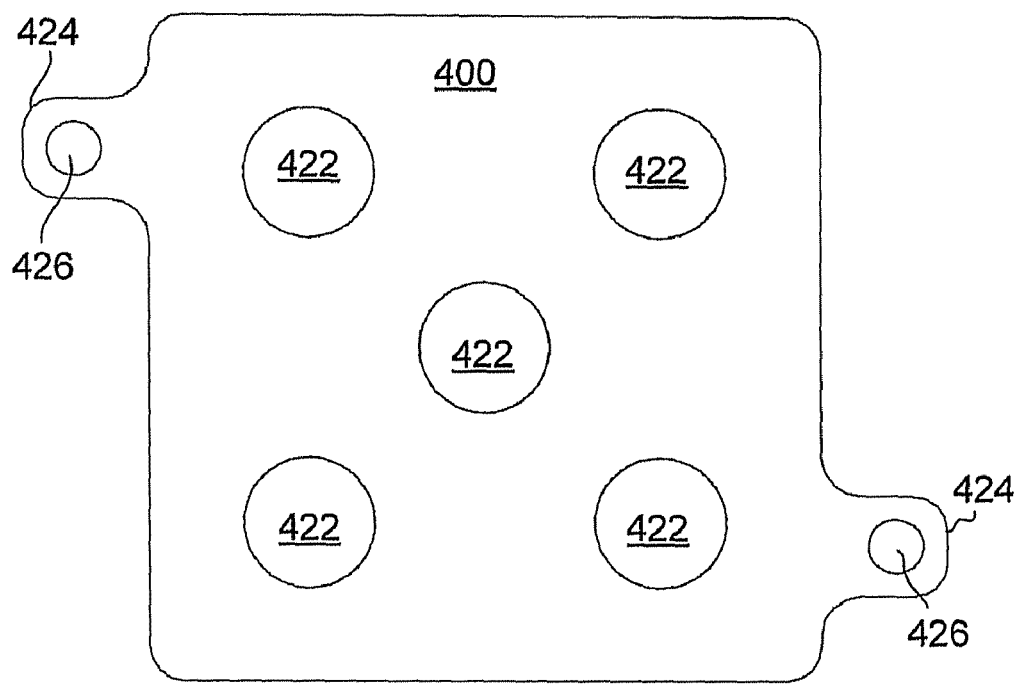
FIG. 50 illustrates an exemplary base plate of the load cushion illustrated in FIG. 34.
Figure 51:
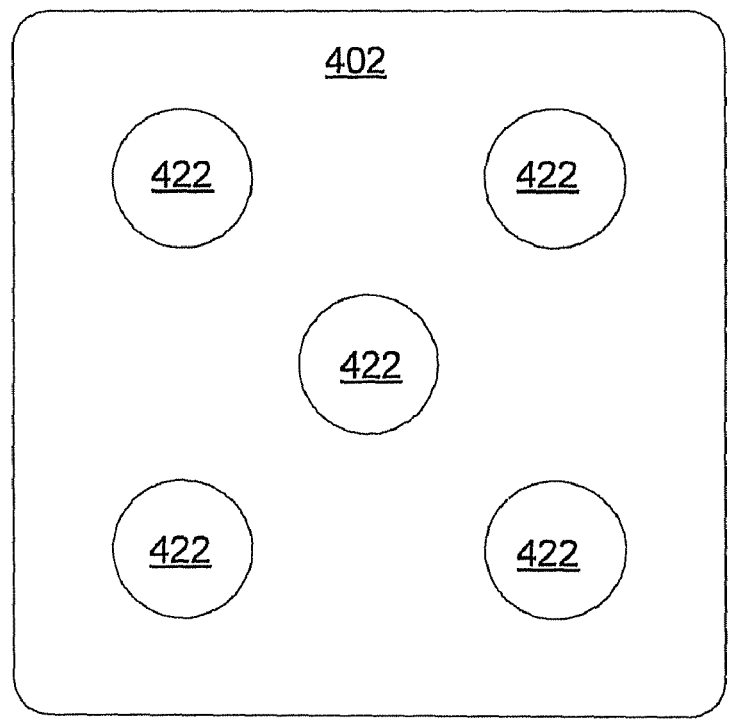
FIG. 51 illustrates an exemplary rate plate of the load cushion illustrated in FIG. 34.

FIGS. 50 and 51 illustrate a plan view of embodiments of the base plate 400 and the rate plate 402, respectively. As illustrated in FIGS. 50 and 51, the base plate 400 and the rate plate 402 each have through-holes 422 to allow the cushion material 404 to pass through the plates 400, 402 during manufacture of the load cushion 348. The base plate 400 includes ears 424 having through-holes 426 for mounting the load cushion 348 to the spring mount 346. In a preferred embodiment, the ears 424 are offset on opposite sides of a center line of the base plate 400. In alternative embodiment, a center line of the ears 424 may be the same as a center line of the base plate 400. Fasteners 362 may be inserted through the ears 424 and fastened to the spring mount 346 and/or the saddle assemblies 337, 339 so as to retain the load cushion 348 within the spring housing 344.

The base plate 400 and the rate plate 402 may be made of any of a variety of materials, such as steel, aluminum, iron, plastic, a composite material, or some other material. In accordance with an exemplary embodiment, the edges 414, 420 each have a height of 6.35 mm (approximately 0.25 inches), the base plate 400 has a length of 152.4 mm (6.0 inches) and a width of 152.4 mm, and the rate plate 402 has a length of 152.4 mm and width of 152.4 mm. The exemplary length and width dimensions of the base plate 400 do not account for the dimensions of the ears 424. A person having ordinary skill in the art will understand that the plates 400, 402 may have dimensions other than those listed above.

Figure 38:
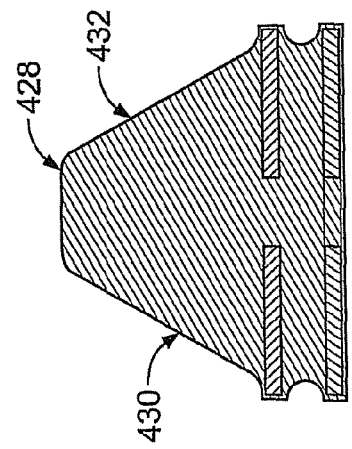
FIG. 38 is a vertical cross section view of the load cushion illustrated in FIG. 36, taken along lines B-B thereof.
Figure 36:
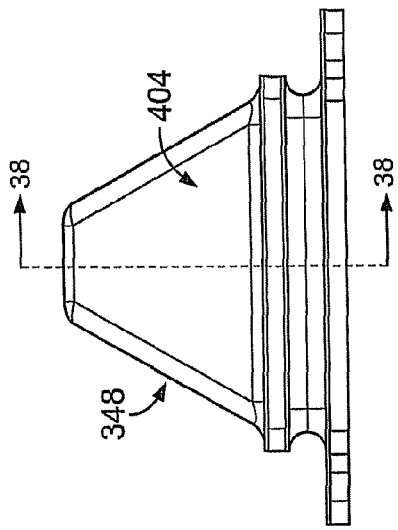
FIG. 36 is an end view of the load cushion illustrated in FIG. 34.
Figure 35:
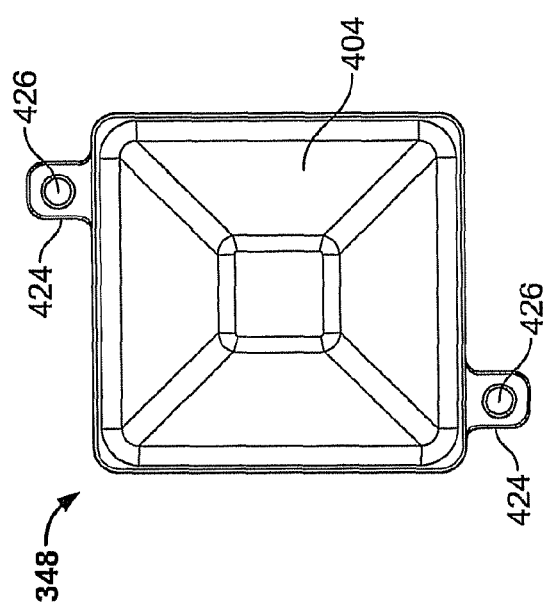
FIG. 35 is a top plan view of the load cushion illustrated in FIG. 34.
Figure 34:
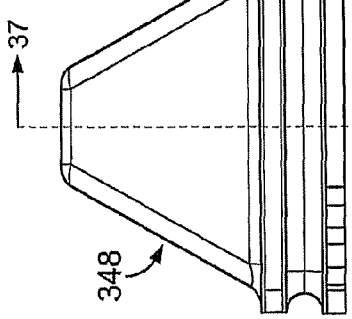
FIG. 34 is a side elevational view of a load cushion in accordance with an exemplary embodiment.
Figure 52:
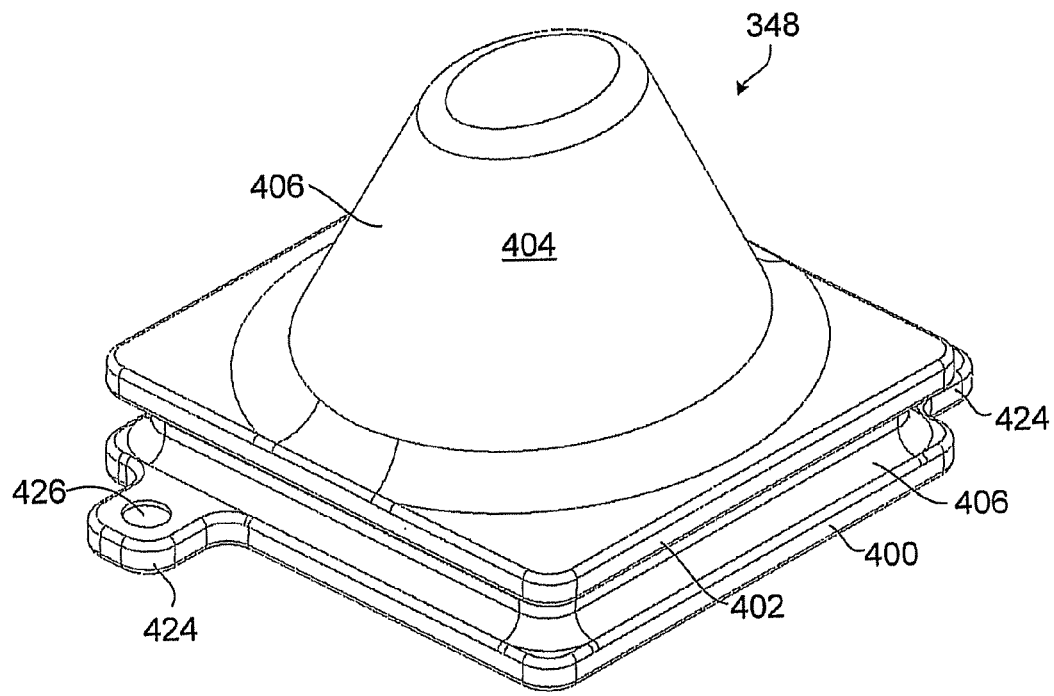
FIG. 52 illustrates a perspective view of another load cushion in accordance with an exemplary embodiment.
Figure 53:
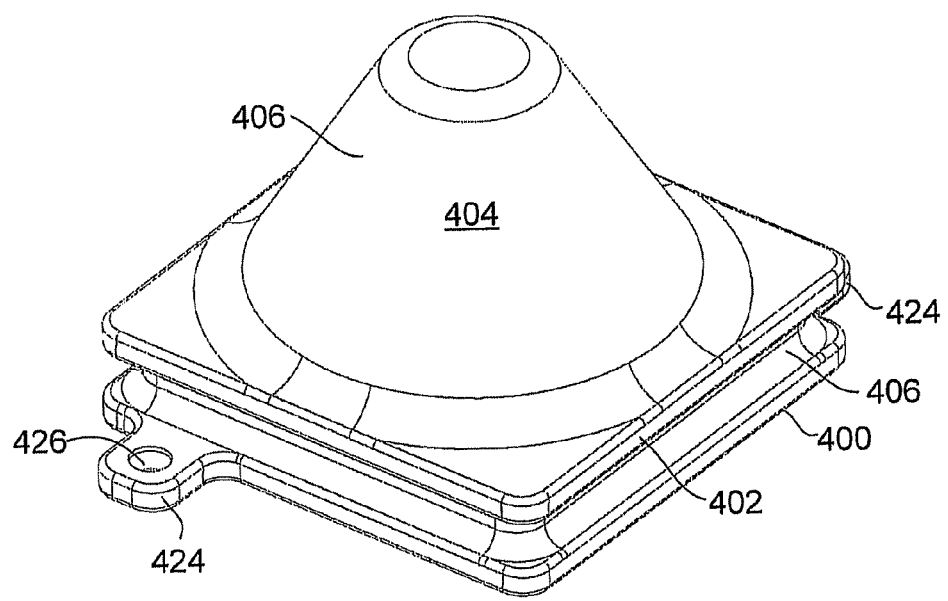
FIG. 53 illustrates a perspective view of another load cushion in accordance with an exemplary embodiment.

FIG. 38 is a vertical cross section view of the load cushion illustrated in FIG. 36, taken along lines B-B thereof. As illustrated in FIG. 38, the cushion portion 406 has a top surface 428 that is flat. In accordance with an exemplary embodiment, each vertical cross section of the cushion portion 406 has two tapering edges, such as tapering edges 430, 432 illustrated in FIG. 38. Additionally, the cushion portion 406 has similarly shaped horizontal cross sections of different sizes throughout. In particular, each horizontal cross section has a generally similar shape as other horizontal cross sections, but it does not have the same size or sectional area as the other horizontal cross sections. The size change factor (for example, a ratio of similitude) for the horizontal cross section is a function of taper. The largest horizontal cross section of the cushion portion 406 is preferably bonded to the top side 416 of the rate plate 402, whereas the smallest cross section of the cushion portion 406 is preferably the top surface 428. The horizontal cross sections of the cushion portion 406 can be any geometric shape (for example, circular, rectangular, or triangular) desired for packaging, weight, or aesthetics. FIGS. 52 and 53 illustrate alternative embodiments of a load cushion having a base plate 400, a rate plate 402, and cushion material 404 including the cushion portions 406, 408.

The size and dimensions of the cushion portion 406 may be based on the shape factor described above. In accordance with an embodiment in which the cushion portion 406 has a pyramidal shape and by way of example, the largest horizontal cross section of the cushion portion 406 has a length of 155.4 mm (approximately 6.1 inches) and width of 155.4 mm, the smallest cross section of the cushion portion 406 has a length of 45.7 mm (approximately 1.8 inches), and the height of the cushion portion 406 is 83 mm (approximately 3.3 inches). A person having ordinary skill in the art will understand that the cushion portion 406 may alternatively have other dimensions.

The cushion portion 408 preferably has horizontal cross sections having a shape similar to the shape of horizontal cross section shape of the rate plate 402. These horizontal cross sections of the cushion portion 408 may have dimensions that are substantially similar to the dimensions of the rate plate 402. In this case, substantially similar is plus or minus 15 percent. In accordance with an exemplary embodiment in which the rate plate 402 has a rectangular shape (with or without rounded corners), the largest horizontal cross section(s) of the cushion portion 408 may have a length of 155.4 mm and a width of 155.4 mm, whereas the smallest horizontal cross section(s) of the cushion portion 408 may have a length of 145.4 mm (approximately 5.7 inches) and a width of 145.4 mm.

In this embodiment, the cushion material 404 may comprise any of a variety of materials. In one respect, the cushion material 404 may comprise an elastomer such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer. In this regard and in particular, the cushion material 404 may comprise an elastomer defined as ASTM D2000 M4AA 621 A13 B13 C12 F17 K11 Z1, wherein Z1 represents a durometer selected to achieve a desired compressive rate curve. The selected durometer may be based on a given predefined scale, such as the Shore A scale, the ASTM D2240 type A scale, or the ASTM D2240 type D scale. In a preferred embodiment, in accordance with the Shore A scale, Z1, for example, is preferably 70±5. In another embodiment, in accordance with the Shore A scale, Z1 is, for example, within the range of 50 to 80. Other examples of Z1 are also possible.

In another respect, the cushion material 404 may comprise a viscoelastomeric material that has elastomeric characteristics when the load cushion 348 is under a load within a range of no load to a maximum expected load to be applied to the load cushion plus a given threshold. The given threshold accounts for possible overloading of the load cushion 348. As an example, the viscoelastomeric material may comprise amorphous polymers, semi-crystalline polymers, and biopolymers.

The load cushion 348 may be formed by inserting the base plate 400 and the rate plate 402 into a mold (not shown). The base plate 400 and the rate plate 402 may be coated with a coating material (an example, of which is described above). A bonding agent may be applied to the coated plates for bonding the plates to the cushion material 404. Applying the coating material and/or applying the bonding agent may occur prior to, during, and/or after insertion of the plates 400, 402 into the mold. After application of the coating material and the bonding agent, the cushion material 404 may be inserted into the mold. The cushion material 404 preferably covers the edges 414, 420 or at least a substantial portion of the edges 414, 420. As an example, the substantial portion of the edges 414, 420 may include all portions of the edges 414, 420 except for chaplet portions which are used to position the plates 400, 402 within the mold. The cushion material 404 at the edges 414, 420 may be 1.5 mm (approximately 0.06 inches) thick.

Those having ordinary skill in the art will understand that the load cushions used in the suspensions 50, 200, 250, 300 may be arranged as the load cushion 348. Those having ordinary skill in the art will also understand that the load cushion 348 could be arranged with one or more additional rate plates similar to the rate plate 402 and, for each additional rate plate, a respective cushion portion similar to the cushion portion 408. In such alternative arrangements, each additional rate plate is inserted into the mold prior to the cushion material 404.

Next, FIGS. 39-44 illustrate various views of an embodiment of the spring mount 346. The spring mount 346 includes sides 452, 454. The spring mount 346 may be symmetrical such that the sides 452, 454 may be used on either the inboard or the outboard-side of a vehicle. The spring mounts 70 used in the suspensions 50, 200, 250, 300 may be arranged as the spring mount 346.

The spring mount 346 includes a generally flat top surface 464 upon which a load cushion (for example, the load cushion 348) is seated, and wall portions 466, 468. Having the flat top surface 464 at a level lower than a top portion of the wall portions 466, 468 allows for use of a taller load cushion. In an alternative arrangement, the top surface 464 may be at the same level as the wall portions 466, 468.

Figure 43:
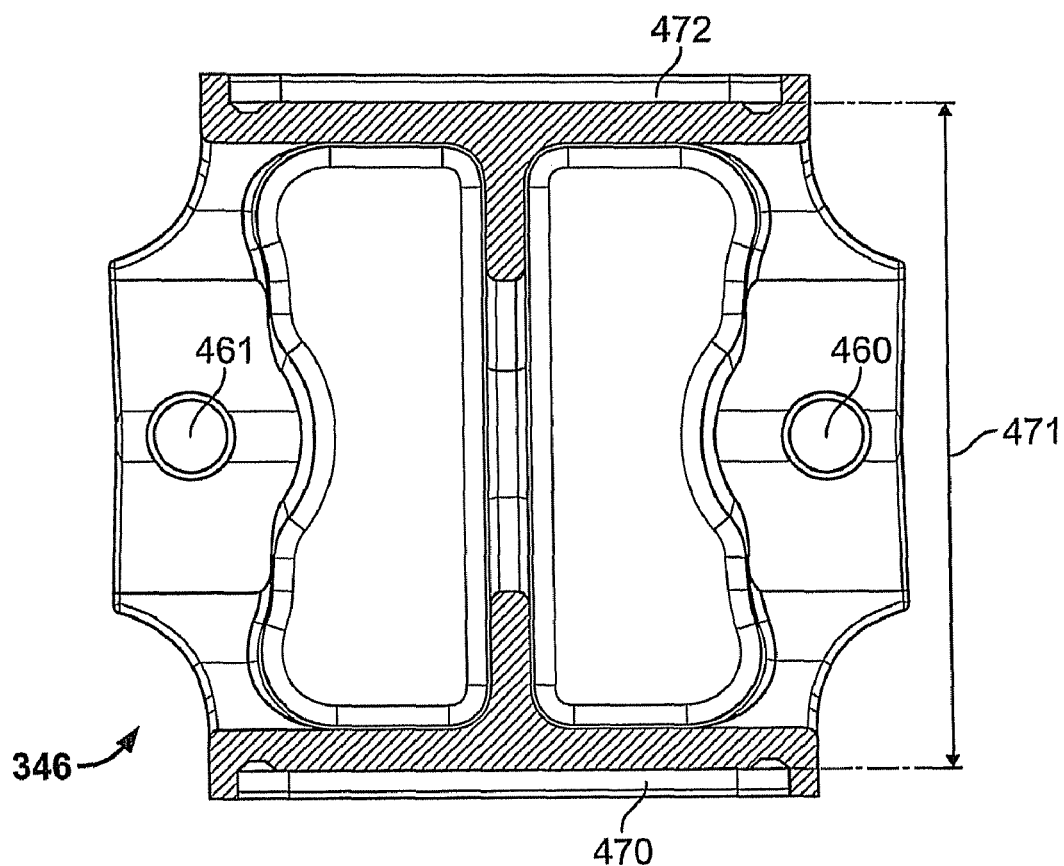
FIG. 43 is a sectional view of the spring mount illustrated in FIG. 42, taken along lines A-A thereof.

As illustrated in FIG. 43, the spring mount 346 includes a pair of pockets 470, 472 positioned on opposite sides of the spring mount 346. The pockets 470, 472 are preferably dimensioned for locating the shear springs 350, 352 in assembly. A horizontal span 471 that separates the pockets 470, 472 is optimized for desired compression of the shear springs 350, 352 in assembly. A depth of the pockets 470, 472 may be optimized for clearance of the shear springs 350, 352 in operation as the shear springs 350, 352 move through their full stroke. Pocket depth optimization also provides secondary vertical and horizontal retention of the shear springs 350, 352 in addition to the retention provided by the compression of the shear springs 350, 352 and by the coefficient of friction between the shear spring 350 and the mating members (for example, the pockets 364, 470) and the coefficient of friction between the shear spring 352 and the mating members (for example, the pockets 366, 472). With the preferred dimensions of span 471, the depth of pockets 470, 472, the span 372, the depths of pockets 364, 366 and a length of the shear springs 350, 352, no fasteners are required to retain the shear springs 350, 352 in assembly, although embodiments that do require fasteners to retain shear springs 350, 352 are also within the scope of the subject matter disclosed herein.

Figure 39:
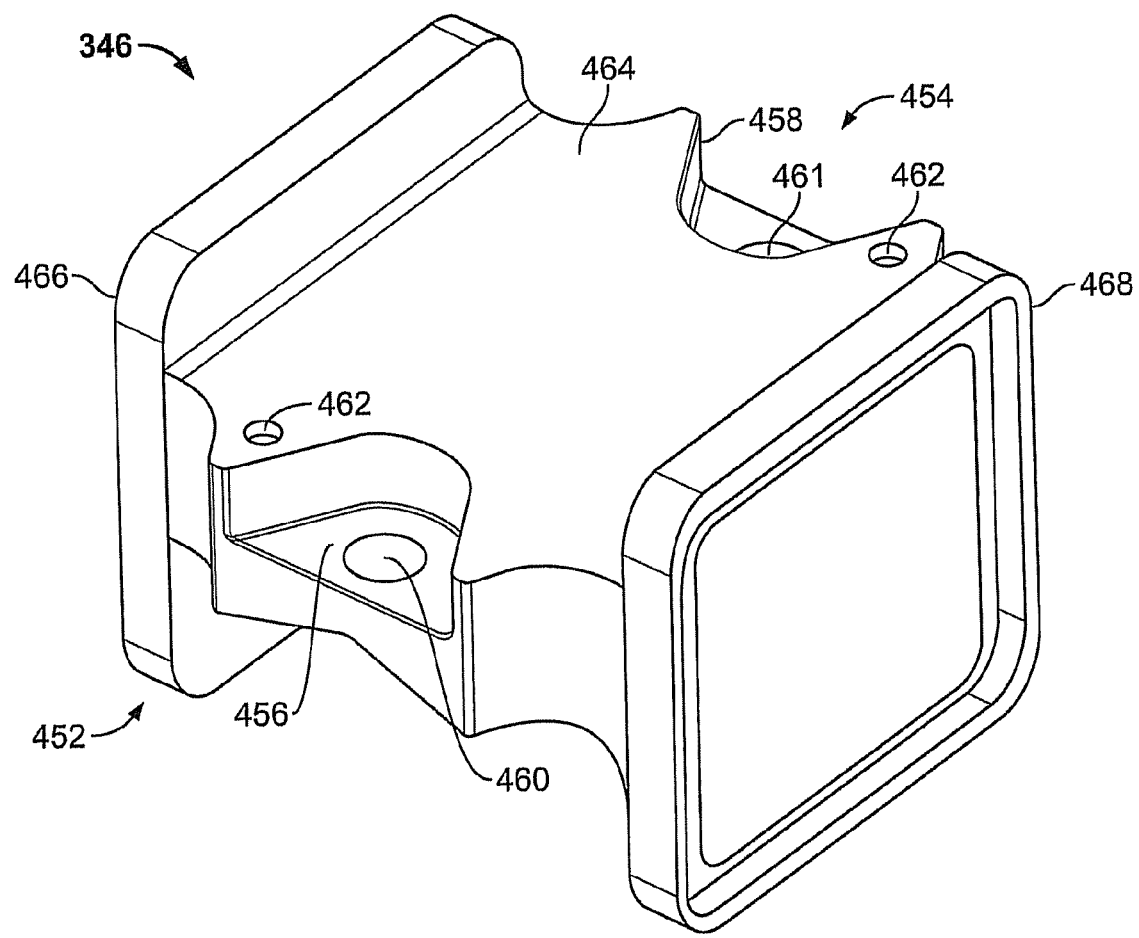
FIG. 39 is a perspective view of a spring mount in accordance with an exemplary embodiment.
Figure 40:
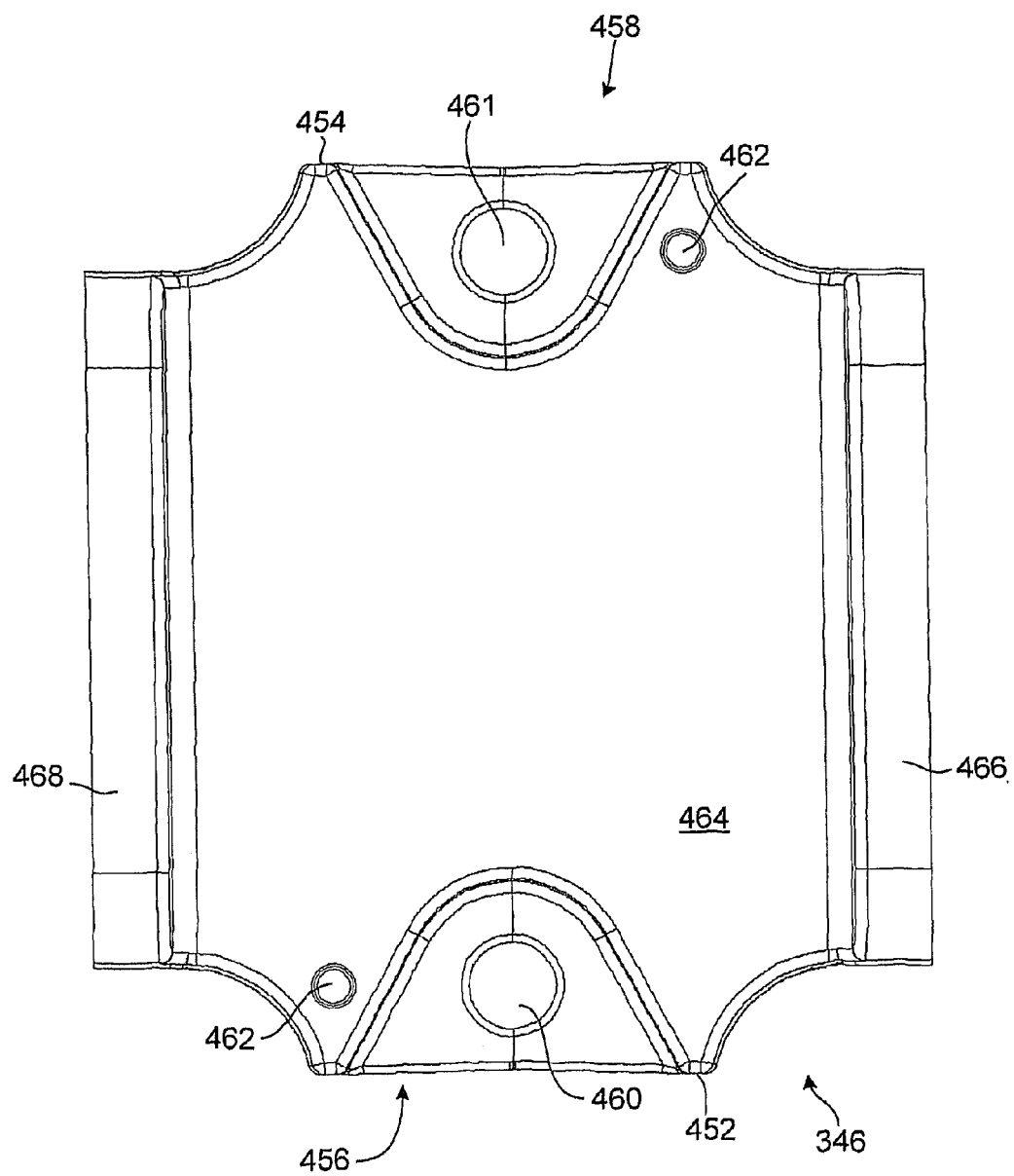
FIG. 40 is a top plan view of the spring mount illustrated in FIG. 39.
Figure 41:
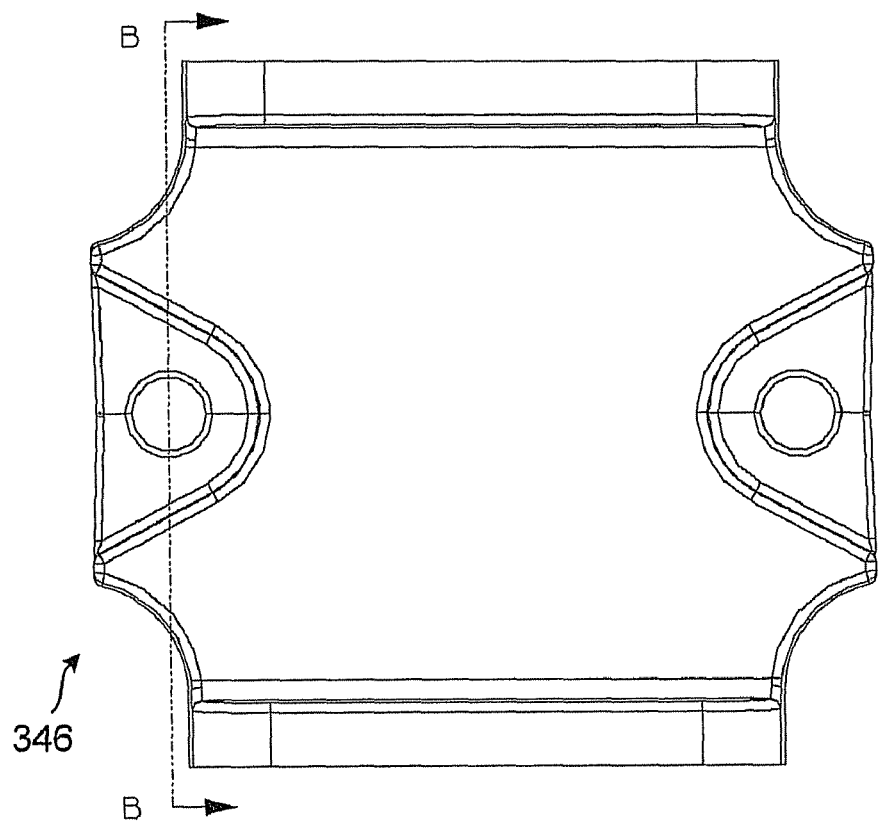
FIG. 41 is a bottom plan view of the spring mount illustrated in FIG. 39.
Figure 42:
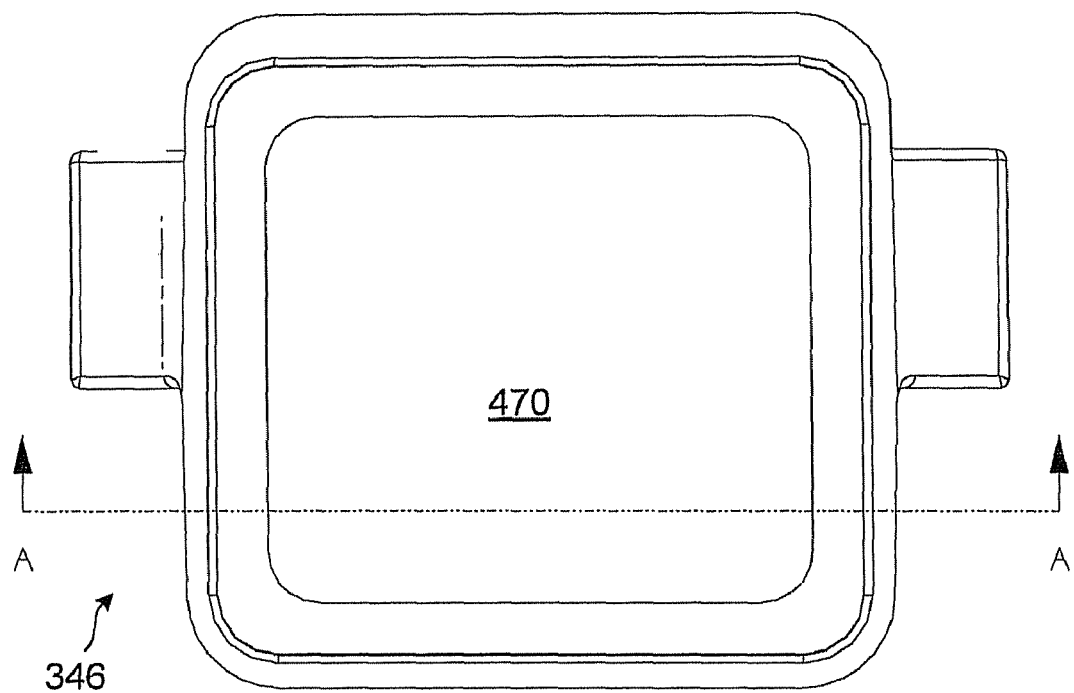
FIG. 42 is an end view of the spring mount illustrated in FIG. 39.

As illustrated in FIGS. 39 and 40, the spring mount 346 includes: (i) an outboard saddle interface 456 that forms a female portion of a mechanical joint having a given angle, (ii) an inboard saddle interface 458 that forms a female portion of another mechanical joint having the given angle, (iii) an outboard saddle mounting bore 460, (iv) an inboard saddle mounting bore 461, and (iv) load cushion mounting bores 462. The saddle mounting bores 460, 461 are part of the saddle interfaces 456, 458, respectively. Fasteners inserted into mounting bores of the saddles 337, 339 and the saddle mounting bores 460, 461 allow for attachment of the saddles 337, 339 to the spring mount 346.

Figure 44:
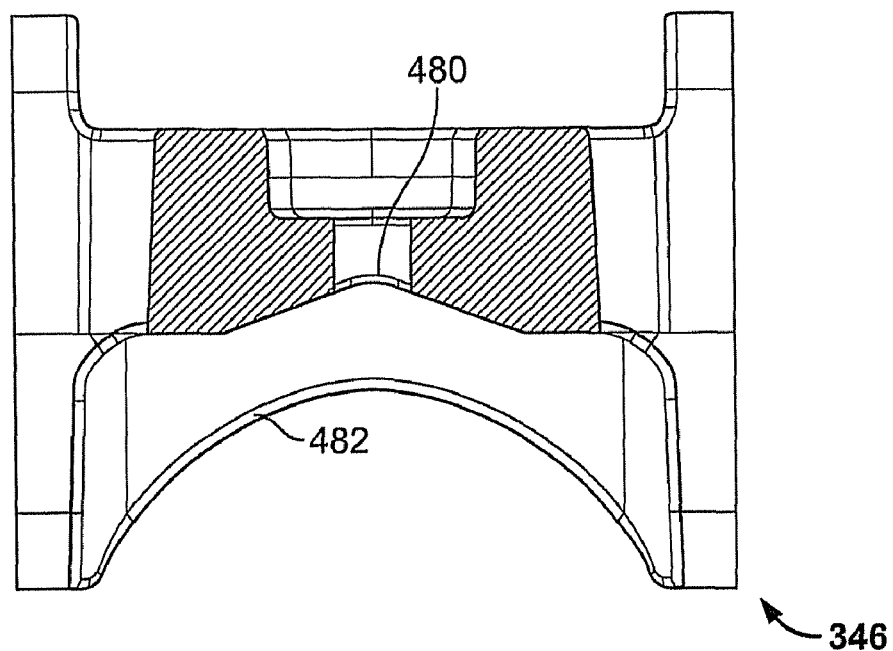
FIG. 44 is a sectional view of the spring mount illustrated in FIG. 41, taken along lines B-B thereof.

FIG. 44 illustrates a female portion 482 of a spring mount-saddle mechanical joint having a desired angle for maintaining joint integrity in all operating conditions. As an example, for a saddle assembly in a suspension that is operable to handle a first maximum load, the desired angle is preferably about 160 degrees. As another example, for a saddle assembly in a suspension that is operable to handle a second maximum load, the second maximum load being greater than the first maximum load, the desired angle may be less than 160 degrees (for example, 140 degrees). The spring mount-saddle interface mechanical joints eliminate direct shear loading of the fasteners 351 (see FIG. 26), since the shear loading is borne exclusively by the joints. The spring mount-saddle interface mechanical joints reduce the criticality of fastener preload and minimize the number of fasteners required. A person having ordinary skill in the art will understand that desired angle may be a number of degrees between 120 degrees and 180 degrees.

An apex of the saddle interfaces 456, 458 may include a spring mount fillet 480 so as to minimize stress concentrations. In accordance with an exemplary embodiment, the fillet 480 has a radius of twenty millimeters. The fillet 480 prevents intimate contact at the peak of the saddle interfaces 456, 458 when the saddles 337, 339, respectively, are fastened thereto. The fillets 480 ensure that the only active surfaces for the mechanical joints are the inclined planes of the joints. In this way, the required tolerances are eased and as-cast surfaces may be used to construct the joint.

Next, in an alternative arrangement, the spring modules 334, 335 may be attached to a frame rail of a vehicle through the use of u-bolts, such as u-bolts having two threaded ends. The frame hanger 332 or 333 is not needed for the alternative arrangement. As an example, two u-bolts, with their threaded ends extending in a downward direction, may be placed over the top side of a frame rail, and then inserted through the mounting holes 370 at both ends of the spring housing 344. Nuts may be installed on the threaded ends of the u-bolts to keep the spring housing 344 in contact with the frame rail. The spring housing 335 may be attached to the frame rail in a similar manner.

Furthermore, in an alternative arrangement especially for use with a vocational or heavy haul truck having a tandem axle configuration, the frame hangers 332 and/or 333 may be made to allow for attaching three spring modules (for example, three spring modules configured as the spring module 334, or two spring modules configured as spring module 334 and one spring module configured as partial spring module 252). For this alternative arrangement, saddle assemblies that are removably attachable to a respective spring mount in each of the three spring modules may be provided. For example, the use of three spring modules provides a way to generate greater load capacity for a vehicle suspension as compared to the suspension 330 (see FIG. 26), assuming everything else is identical.

Figure 58:
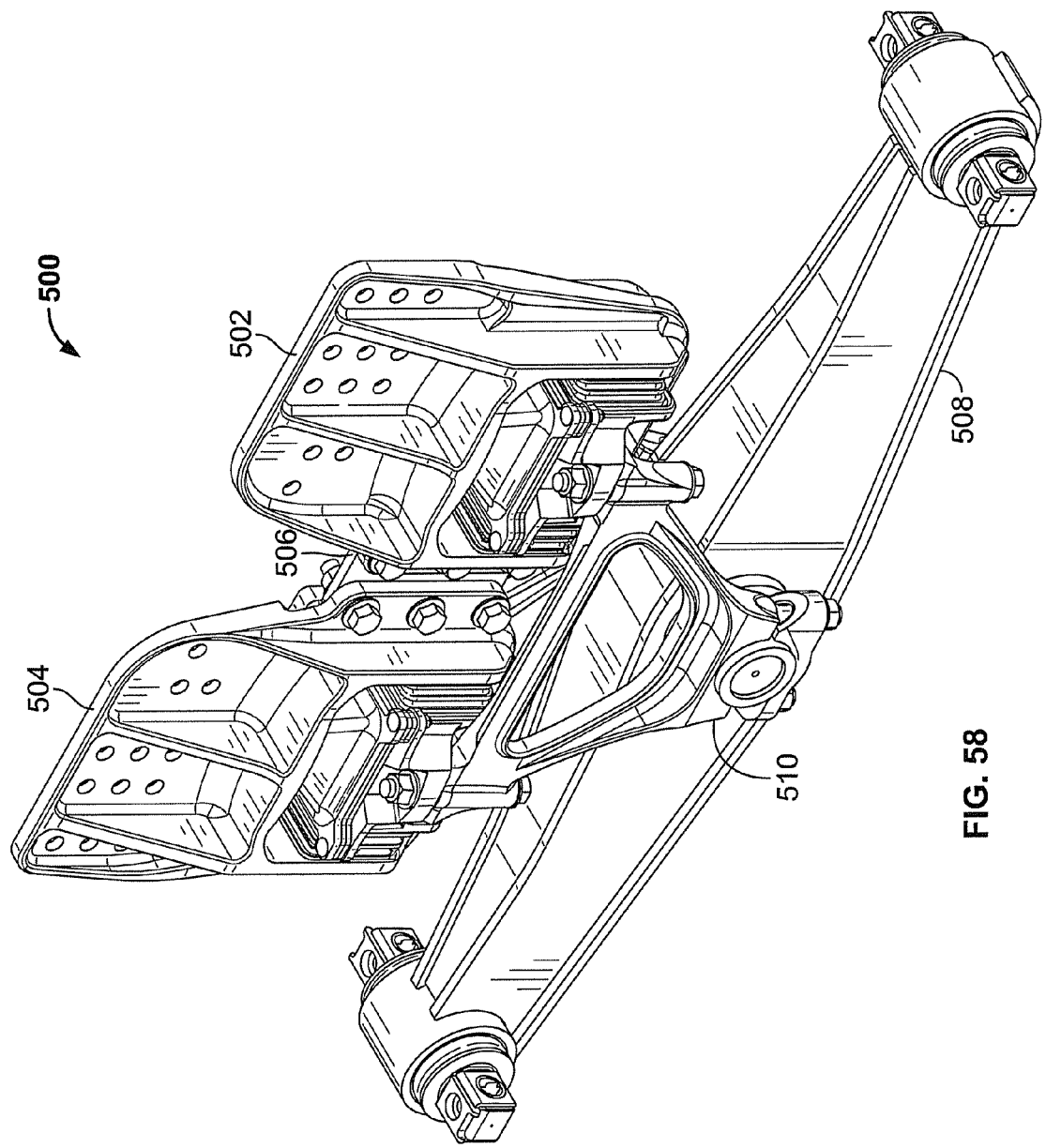
FIGS. 58, 59, 60, and 61 show various views of an exemplary suspension assembly.
Figure 59:
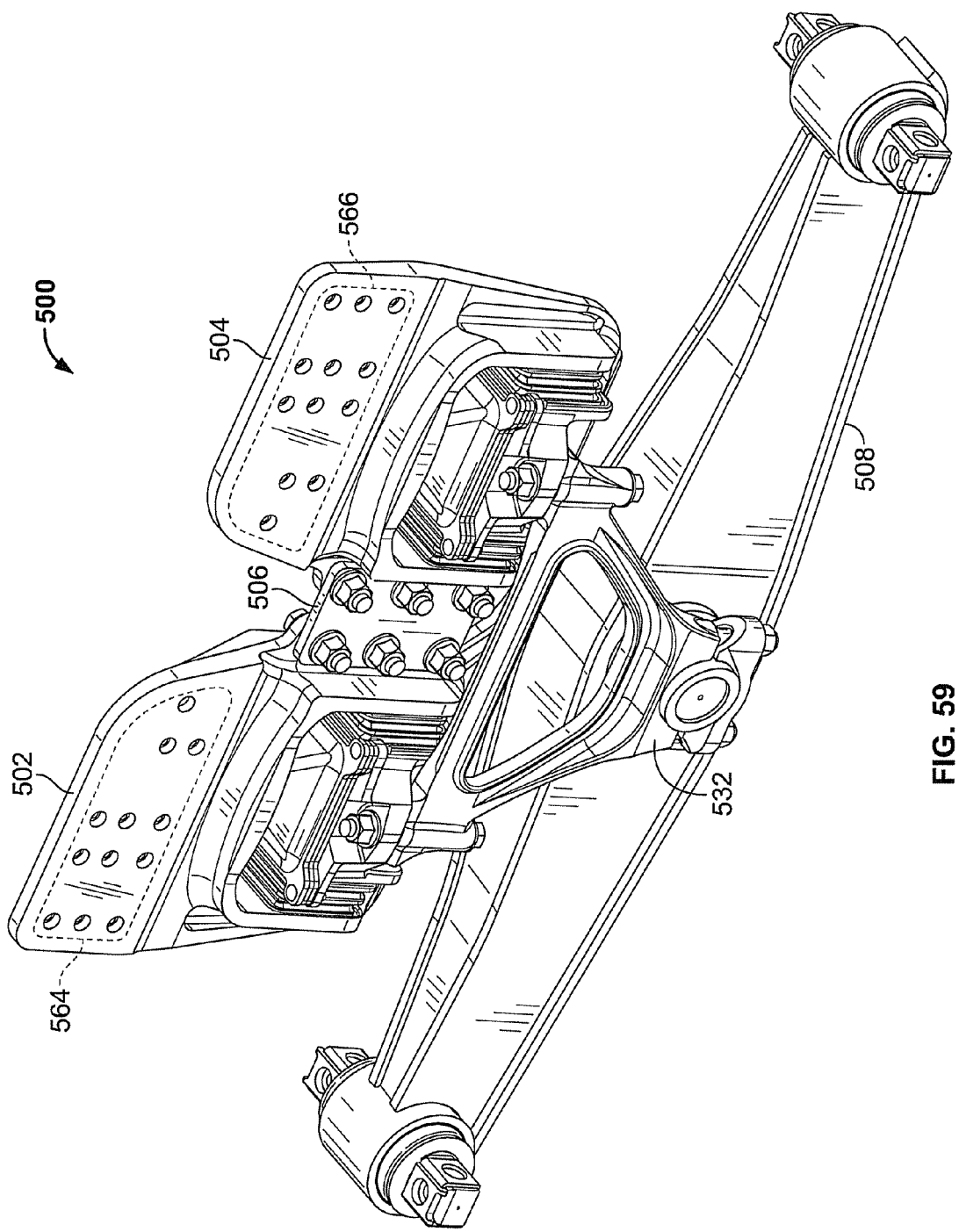

Next, FIGS. 58 and 59 are perspective views of an exemplary suspension assembly 500. In particular, FIG. 58 illustrates an outboard-side of suspension assembly 500 and FIG. 59 illustrates an inboard-side of suspension assembly 500. As shown in FIG. 58, suspension assembly 500 includes frame hangers 502, 504, a tie-plate 506, a walking beam 508, and a saddle assembly 510. As shown in FIG. 59, suspension assembly 500 includes frame hangers 502, 504, a tie-plate 506, a walking beam 508, and a saddle assembly 532. FIG. 59 also illustrates frame hanger 502 includes a set of attachment holes 564, and frame hanger 504 includes a set of attachment holes 566. The outboard side of sets of attachment holes 564, 566 is shown in FIG. 58.

Tie-plate 506 may be attached to frame hangers 502, 504 via a set of fasteners. Tie-plate 506 may be removed from one or more of frame hangers 502, 504 for servicing (e.g., repairing or replacing) of (i) frame hanger 502 or some portion thereof, (ii) frame hanger 504 or some portion thereof, (iii) tie-plate 506. In this regard, tie-plate 506 is removably attachable to frame hangers 502, 504. Attachment of tie-plate 506 to frame hangers 502, 504 permits the sets of attachment holes 564, 566 to function as a single and larger set of attachment holes. A benefit of the single and larger set of attachment holes is that that sets of attachment holes 564, 566 may be arranged with fewer attachment holes for use with fewer fasteners and/or smaller size holes for use with smaller fasteners.

Figure 60:
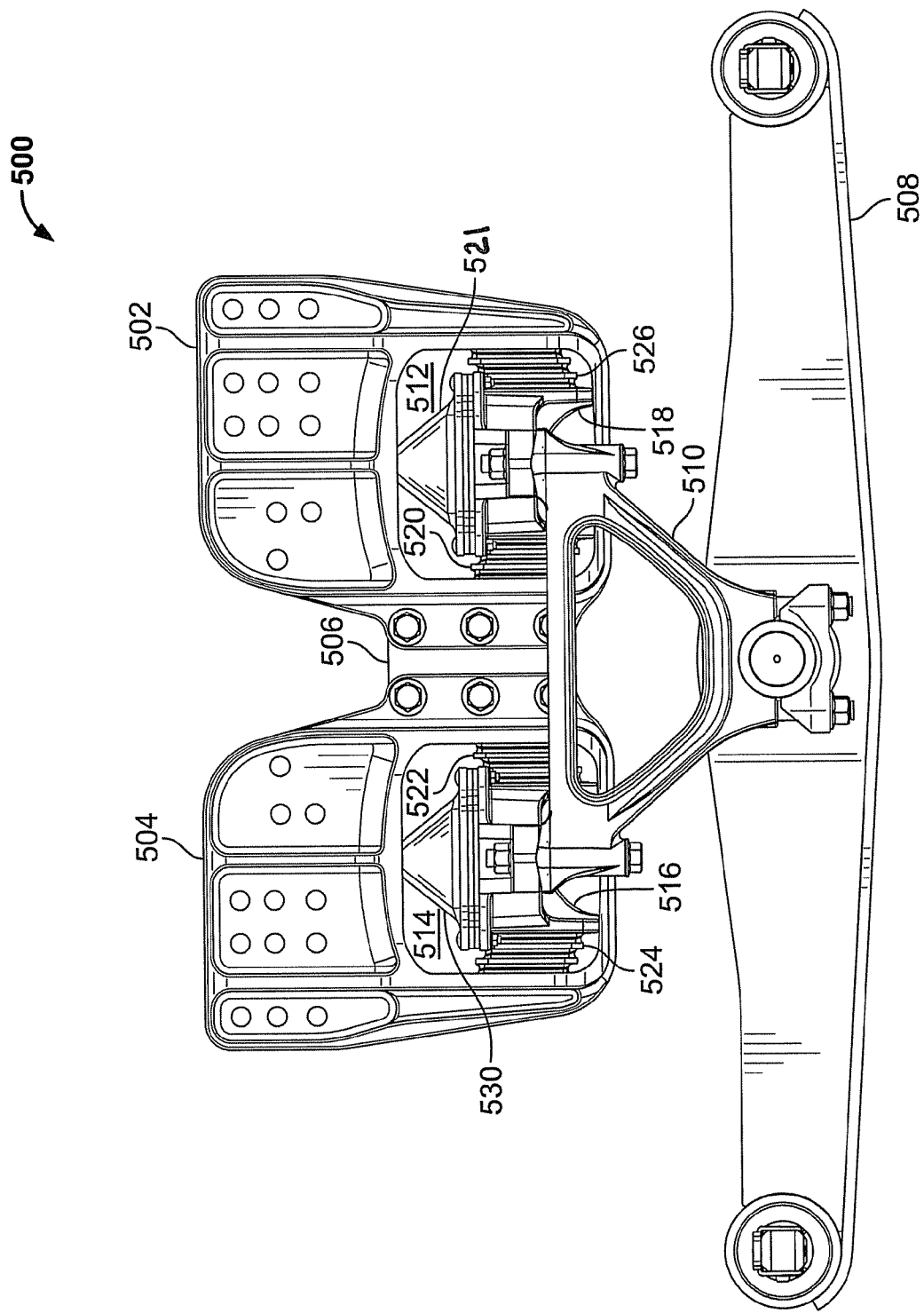
Figure 61:
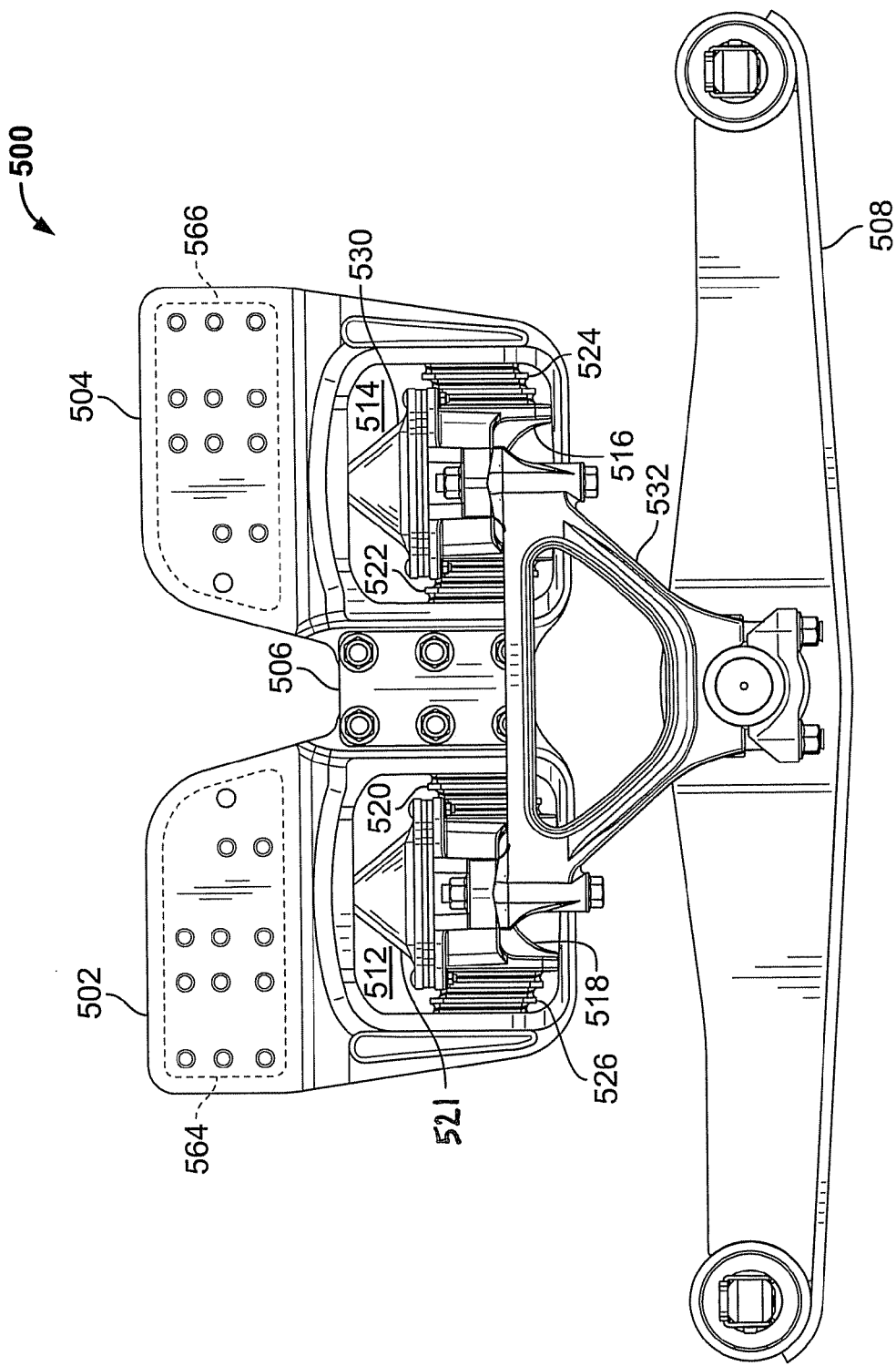

Next, FIG. 60 is an elevational view showing the outboard-side of suspension assembly 500, and FIG. 61 is an elevational view showing the inboard-side of suspension assembly 500. As shown in FIGS. 60 and 61, frame hanger 502 includes a window-like opening 512, and within this opening, frame hanger 502 includes a spring mount 518, shear springs 520, 526, and a progressive spring rate load cushion 521. Similarly, frame hanger 504 includes a window-like opening 514, and within this opening, frame hanger 504 includes a spring mount 516, shear springs 522, 524, and a progressive spring rate load cushion 530. The spring mount, load cushion, and shear springs of frame hangers 502, 504 may be arranged like any spring mount, load cushion, and shear springs described for another frame hanger within this description. Saddle assemblies 510, 532 may be attached to spring mounts 516, 518. Saddle assemblies 510, 532 may be arranged and function like saddle assemblies 74 or 204.

Figure 62:
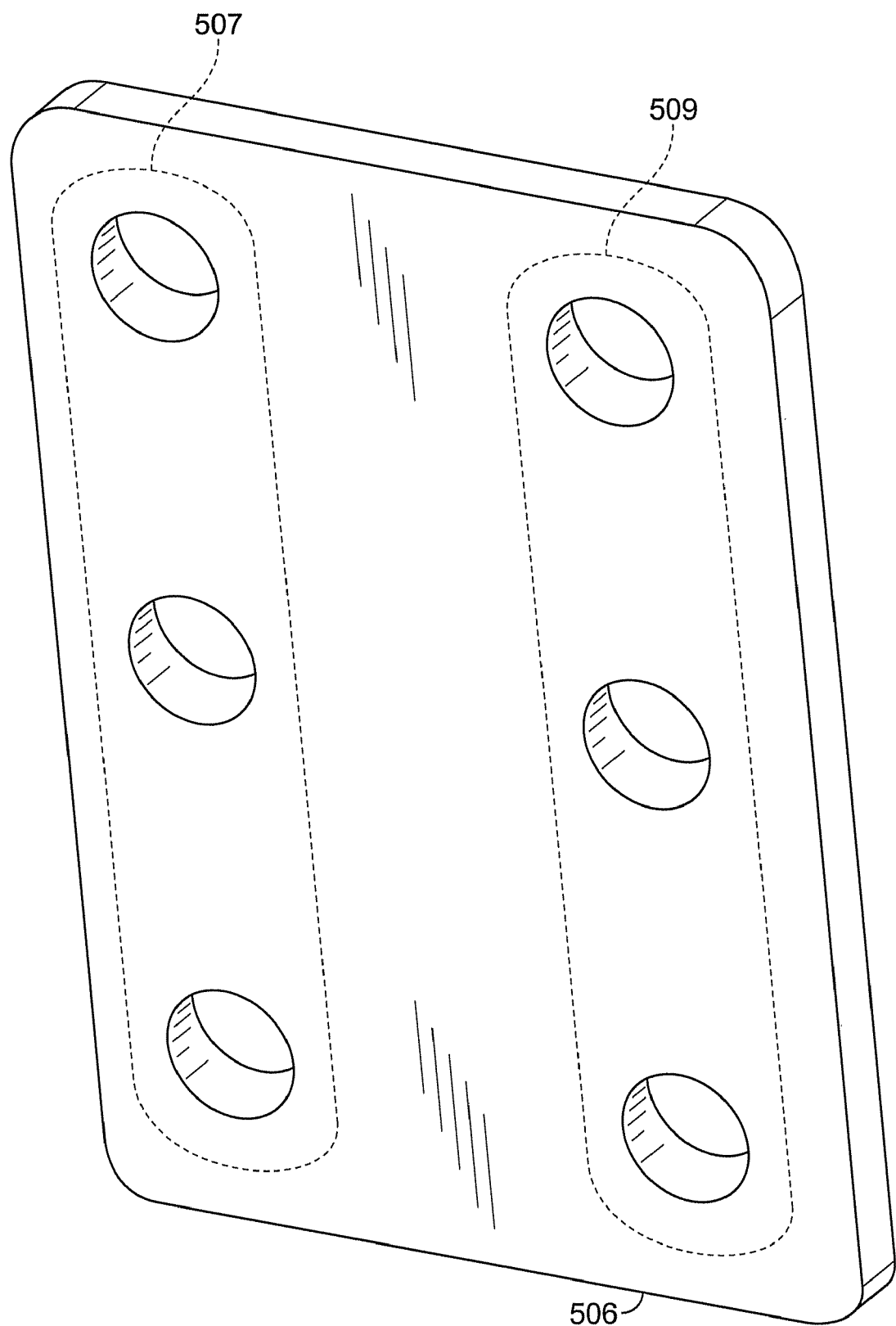
FIG. 62 illustrates an exemplary tie-plate.

Next, FIG. 62 illustrates tie-plate 506. As shown in FIG. 62, tie-plate 506 includes sets of attachment holes 507, 509. Sets of attachment holes 507, 509 may comprise through-holes that pass from a first side to the second side of tie-plate 506. Alternatively, sets of attachment holes 507, 509 may extend only a portion of the way through tie-plate 506. Sets of attachment holes 507, 509 may be threaded or un-threaded.

Tie-plate 506 may be symmetrical with respect to horizontal and vertical center lines passing through tie-plate 506. As shown in FIG. 62, the sets of attachment holes 507, 509 each include three holes. In an alternative embodiment, the sets of attachment holes 507, 509 may each include a number of holes less than three (e.g., one or two holes) or a number of holes greater than three. A tie-plate of any of the suspensions described in this description as using a tie-plate may include a plurality of separate plates, and each of the separate plates may be arranged like tie-plate 506 and stacked upon one another such that holes of the various sets of attachment holes are aligned to allow fasteners to pass through the holes.

Tie-plate 506 may be made from any of a variety of materials. For example, tie-plate 506 may be made from steel, such as a high-strength and low-alloy steel. As another example, tie-plate 506 may be made from iron, aluminum, carbon fiber, or some other material or combinations of material.

Figure 63:
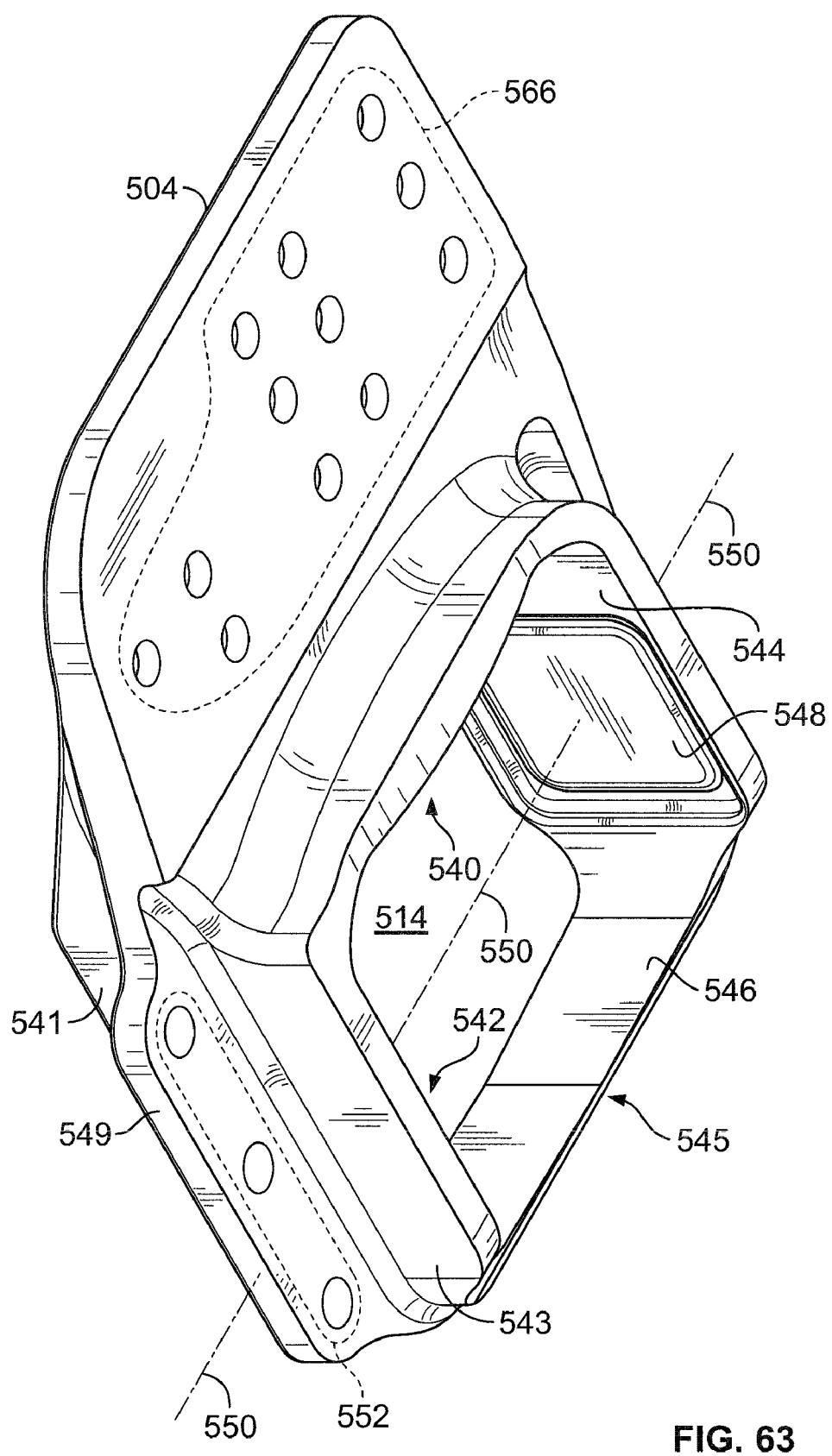
FIGS. 63, 64, 65, 66, and 67 illustrate exemplary frame hangers that may be used within the exemplary suspensions.

Next, FIG. 63 illustrates details of frame hanger 504. As shown in FIG. 63, frame hanger 504 includes, opening 514 a frame-hanger bottom 545, a flange 549, and exterior side walls 541, 543 on an outboard side and inboard side of flange 549, respectively. The inboard-side of flange 549 is shown in FIG. 63. Flange 549 includes a set of attachment holes 552. The set of attachment holes 552 may correspond to a set of attachment holes in tie-plate 506. In this regard, a set of fasteners may be inserted through the set of attachment holes 552 and its corresponding set of attachment holes in tie-plate 506 for attaching tie-plate 506 to frame hanger 504.

Opening 514 is defined, at least in part, by a top wall 540, side walls 542, 544, and a bottom wall 546. Side wall 544 includes a pocket 548. Side wall 542 may include a pocket (not shown). The pockets of side walls 542, 544 may be arranged and function like pockets 92.

A center line passes through a given center of pocket 548 and another center line passes through a given center of the pocket of side wall 542. Preferably, these 2 center lines coincide (i.e., occupy the same relative position or the same area in space) such that the two center lines may be represented as a single center line 550. Alternatively, the center line passing through the given center of pocket 548 substantially coincides with the center line passing through the given center of the pocket of side wall 542. For purposes of this description, when two center lines are referred to as substantially coinciding, the two center lines are parallel and within 38.1 mm (approximately 1.5 inches) of each other.

Figure 73:
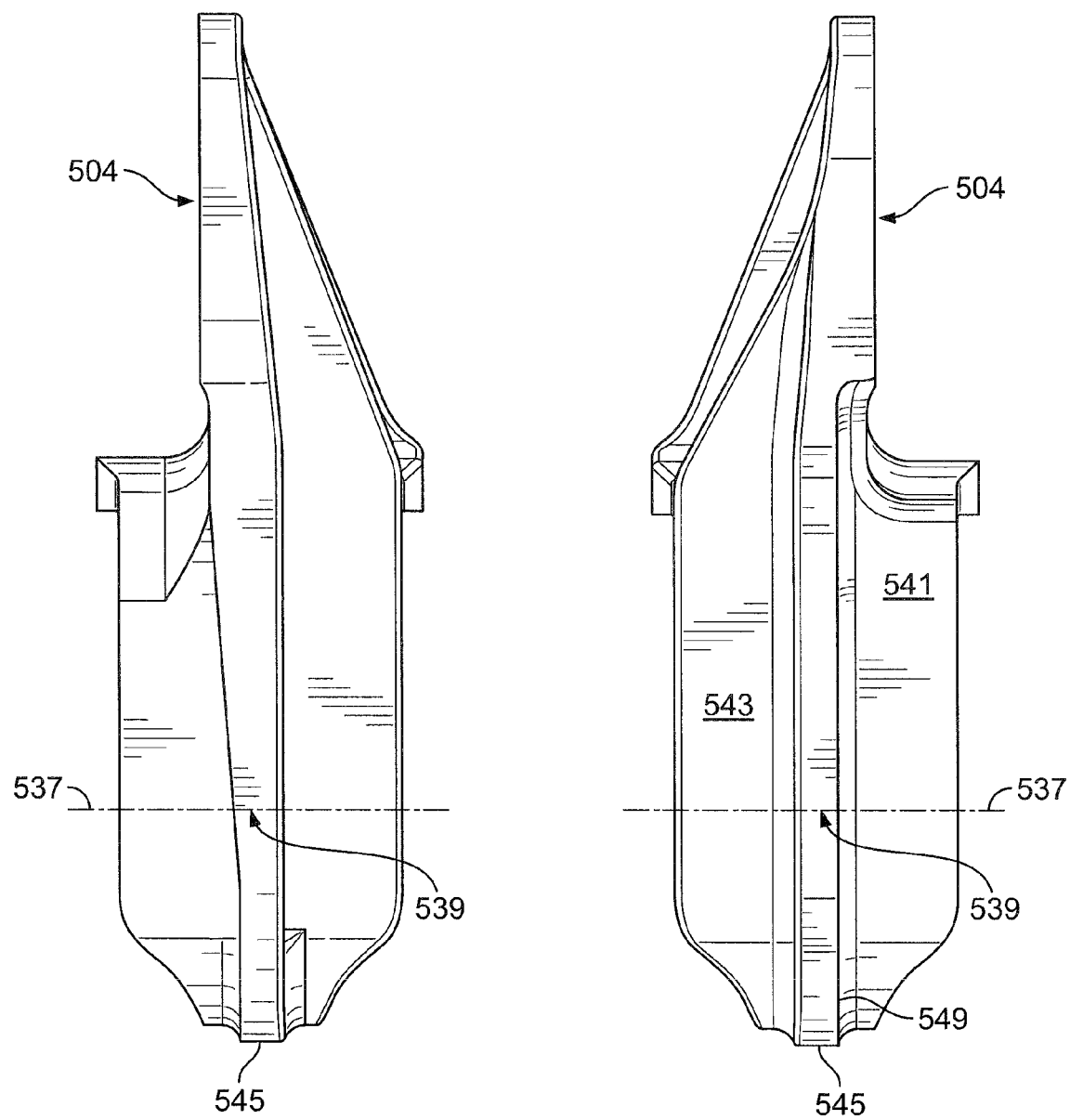
FIG. 73 illustrates left and right side elevational views of the frame hanger shown in FIG. 63.

Next, in FIG. 73, a plane (represented by dashed lines 537) that includes center line 550 (represented by dots 539) or the substantially coinciding centers lines passing through the given center of pocket 548 and the given center of the pocket of side wall 542 is parallel or substantially parallel to frame-hanger bottom 545. This plane passes through the given center of pocket 548, the given center of the pocket of side wall 542, and flange 549. This plane also passes through tie-plate 506 when tie-plate 506 is attached to frame hanger 504. In an embodiment in which a plane is substantially parallel to a frame hanger bottom, a line parallel to the frame hanger bottom intersects the plane such that an acute angle formed by the intersection does not exceed 5 degrees (i.e., 300 minutes).

Figure 64:
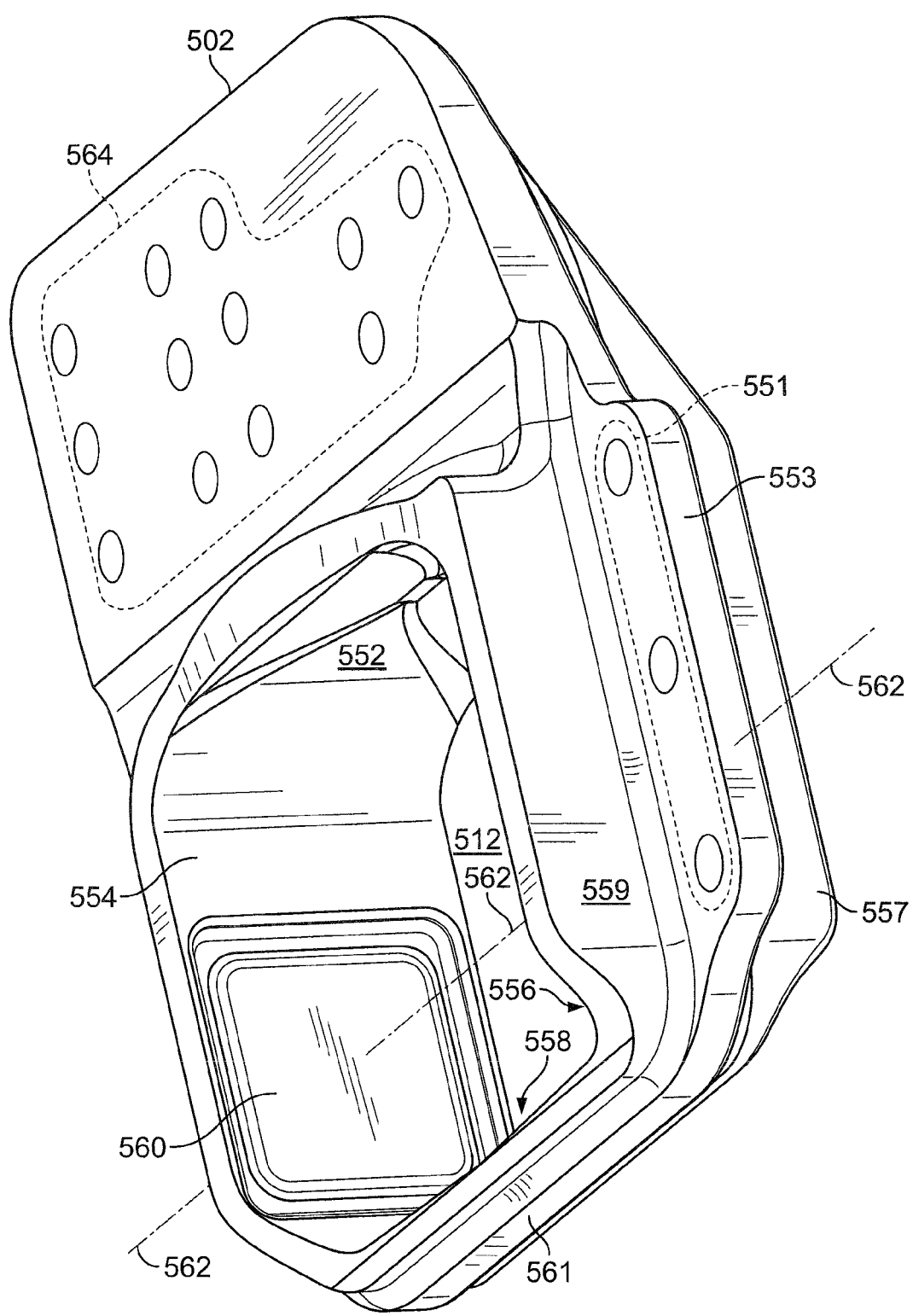

Next, FIG. 64 illustrates details of frame hanger 502. As shown in FIG. 64, frame hanger 502 includes, opening 512 a frame-hanger bottom 561, a flange 553, and exterior side walls 557, 559 on an outboard side and inboard side of flange 553, respectively. The inboard-side of flange 553 is shown in FIG. 64. Flange 553 includes a set of attachment holes 551. The set of attachment holes 551 may correspond to a set of attachment holes in tie-plate 506. In this regard, a set of fasteners may be inserted through the set of attachment holes 551 and its corresponding set of attachment holes in tie-plate 506 for attaching tie-plate 506 to frame hanger 502.

Opening 512 is defined, at least in part, by a top wall 552, side walls 554, 556, and a bottom wall 558. Side wall 554 includes a pocket 560. Side wall 556 may include a pocket (not shown). The pockets of side walls 554, 556 may be arranged and function like pockets 92.

A center line passes through a given center of pocket 560 and another center line passes through a given center of the pocket of side wall 556. Preferably, these 2 center lines coincide (i.e., occupy the same relative position or the same area in space) such that the two center lines may be represented as a single center line 562. Alternatively, the center line passing through the given center of pocket 560 substantially coincides with the center line passing through the given center of the pocket of side wall 556.

A plane that includes center line 562 or the substantially coinciding centers lines passing through the given center of pocket 560 and the given center of the pocket of side wall 556 is parallel or substantially parallel to frame-hanger bottom 561. This plane passes through the given center of pocket 560, the given center of the pocket of side wall 556, and flange 553. This plane also passes through tie-plate 506 when tie-plate 506 is attached to frame hanger 502.

Sets of attachment holes 551, 552 may comprise through-holes that pass from the inboard-side to the outboard-side of flanges 549, 553, respectively. Alternatively, sets of attachment holes 551, 552 may extend only a portion of the way through flanges 549, 553, respectively. In these alternative sets of attachment holes, the holes may be accessible from either the inboard-side or the outboard-side. Sets of attachment holes 551, 552 may be threaded or un-threaded.

FIGS. 63 and 64 illustrate that frame hanger 502 includes a set of attachment holes 564, and frame hanger 504 includes a set of attachment holes 566. The sets of attachment holes 564, 566 may correspond to respective sets of attachment holes in a frame rail (e.g., frame rail 52). Any of a variety of fasteners may be inserted through the sets of attachment holes 564, 566 and the sets of attachment holes in the frame rail so as to attach the suspension assembly 500 to the frame rail. Removal of the fasteners from the frame rail and sets of attachment holes 564, 566 allows frame hangers 502, 504 to be unattached from the frame rail. In this regard, frames hangers 502, 504 are removably attachable to the frame rail.

Figure 65:
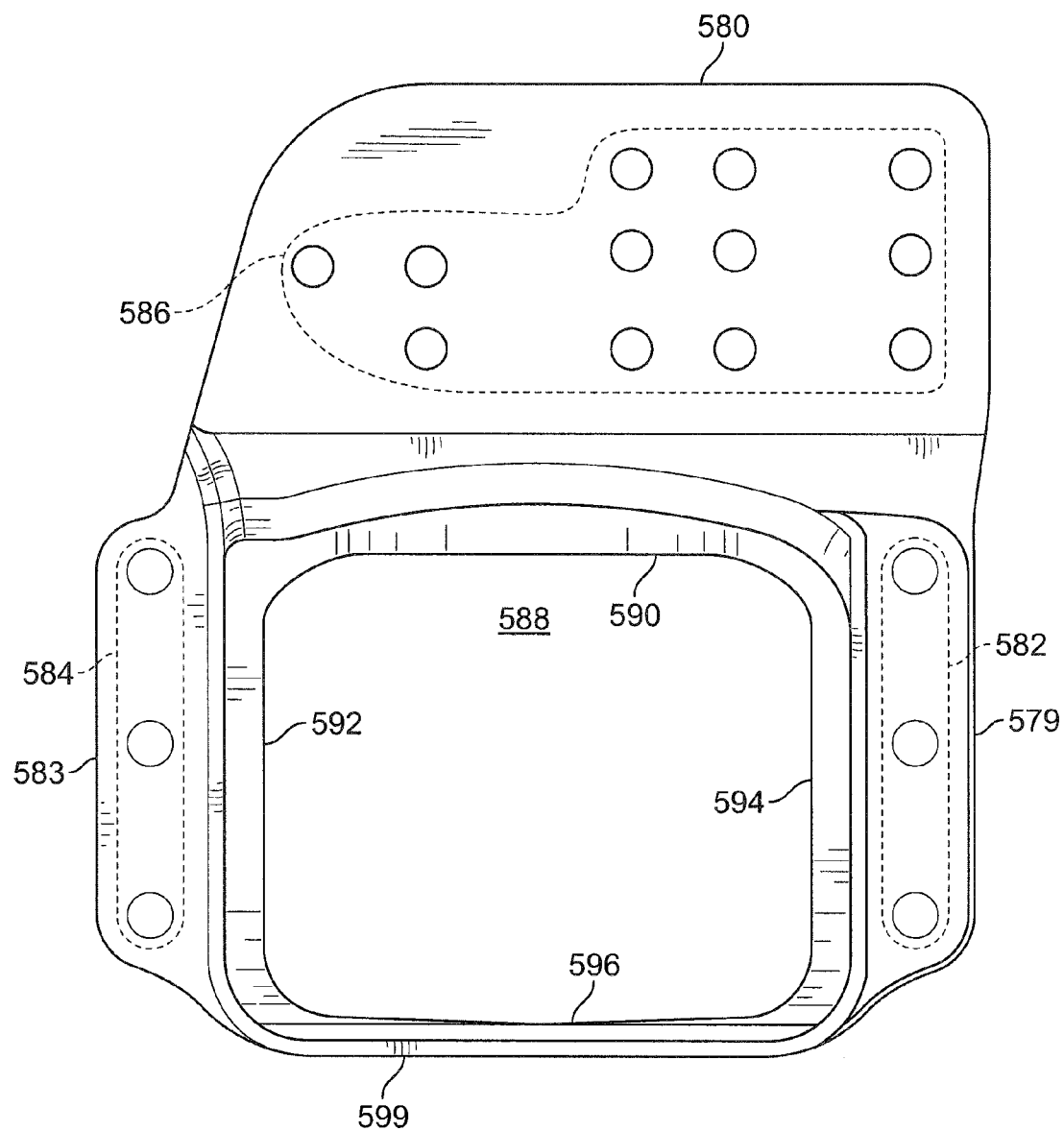

Next, FIG. 65 illustrates another exemplary frame hanger 580. Frame hanger 580 includes flanges 579, 583, a frame hanger bottom 599, sets of attachment holes 582, 584, 586, and a window-like opening 588 defined, at least in part, by a top wall 590, side walls, 592, 594, and a bottom wall 596. Top wall 590 may be arranged like top wall 540, side walls 592, 594 may be arranged like side walls 542, 544, respectively, and bottom wall 596 may be arranged like bottom wall 546. The sets of attachment holes 582, 584 may correspond to a respective set of attachment holes of a respective tie-plate. Flanges 579, 583 each include a respective inboard-side (shown in FIG. 65) and a respective outboard side.

One or more frame hangers similar to frame hanger 580 may be used in a suspension assembly comprising two or more frame hangers (e.g., the spring suspension assembly 200 shown in FIG. 22). As an example, the centrally-located spring module 56 of suspension assembly 200 could be replaced with frame hanger 580, the left-most spring module 56 of suspension assembly 200 could be replaced with frame hanger 502 (shown in FIG. 64), and the right-most spring module 56 of suspension assembly 200 could be replaced with frame hanger 504 (shown in FIG. 63). In accordance with this example, the frame hangers 502, 504, 580 may each contain a spring mount, a progressive spring rate load cushion, and a pair of shear springs similar to those shown within the spring modules 56 of suspension assembly 200 of FIG. 22.

A tie-plate (e.g., a tie-plate arranged like tie-plate 506) may be attached to frame hangers 502, 580 by placing a set of fasteners through sets of attachment holes 509, 584, and another set of fasteners through sets of attachment holes 507, 551. Similarly, another tie-plate (e.g., a tie-plate arranged like tie-plate 506) may be attached to frame hangers 504, 580 by placing a set of fasteners through sets of attachment holes 509, 552, and another set of fasteners through sets of attachment holes 507, 582. One or more of the tie-plates attached to frame hangers 502, 504, 580 may be unattached from the frame hangers for any of a variety of reasons, such as to repair and/or replace one of the frame hangers. In other words, the one or more tie-plates are removably attachable to frame hanger 502, 504, 580.

In an alternative arrangement, all three spring modules of suspension assembly 200 could be replaced with a respective frame hanger arranged like frame hanger 580, and a respective tie-plate could be removably attached to each adjacent pair of frame hangers.

Figure 66:
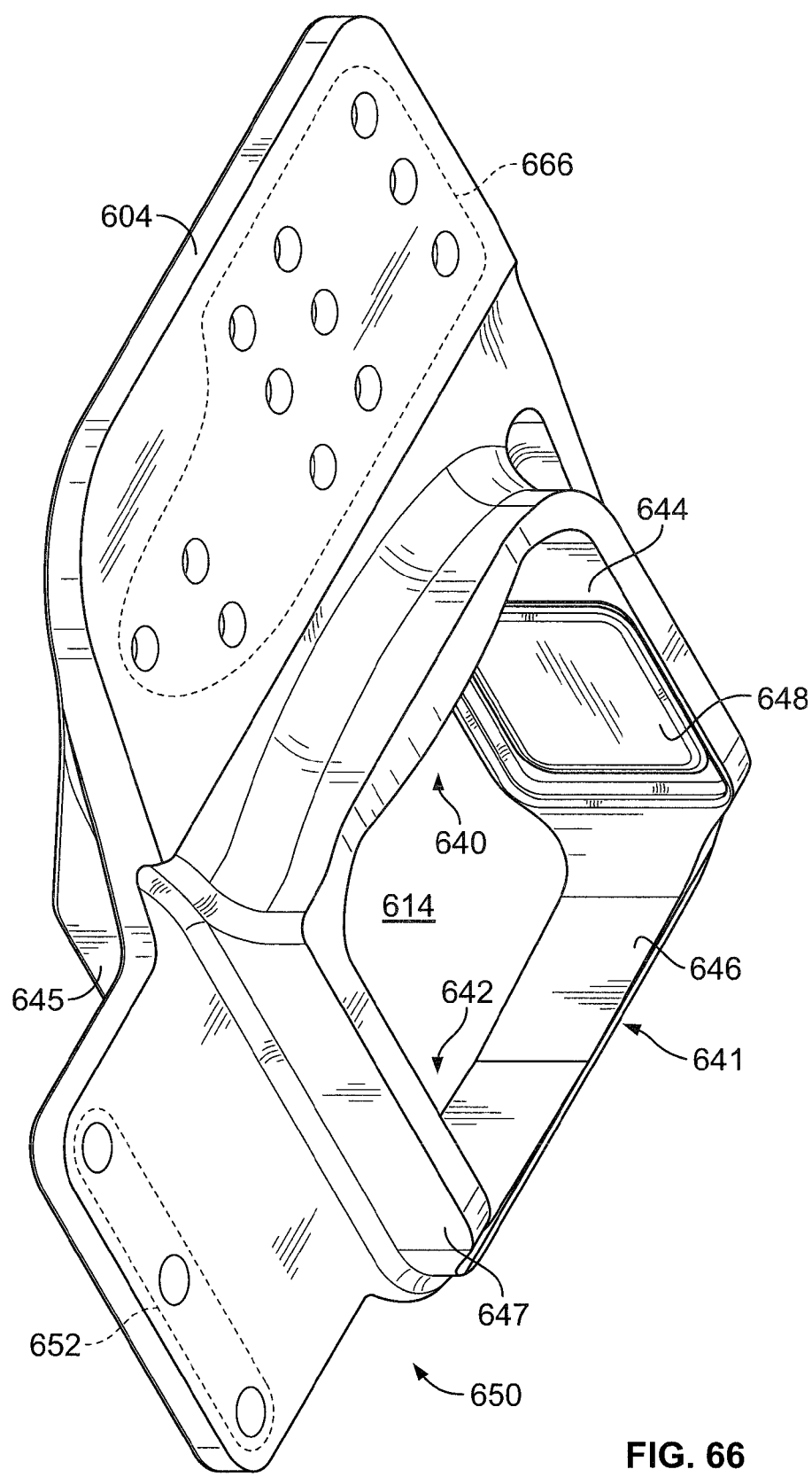

Next, FIG. 66 illustrates another exemplary frame hanger 604. Frame hanger 604 includes a window-like opening 614, defined, at least in part, by a top wall 640, side walls, 642, 644, and a bottom wall 646. Side wall 644 may include a pocket 648, and side wall 642 may include another pocket (not shown). The pockets of side walls 642, 644 may be arranged and function like pockets 92. Frame hanger 604 includes exterior side wall portions 645, 647, a tie-plate portion (e.g., a flange) 650 extending away from the exterior side wall portions 645, 647, and a frame-hanger bottom 641. Tie-plate portion 650 includes a set of attachment holes 652, an inboard-side (shown in FIG. 66), and an outboard-side. Frame hanger 604 further includes a set of attachment holes 666. The sets of attachment holes 666 may correspond to a set of attachment holes in a frame rail (e.g., frame rail 52). Any of a variety of fasteners may be inserted through the sets of attachment holes 666 and the set of attachment holes in the frame rail so as to attach frame hanger 604 to the frame rail.

Figure 67:
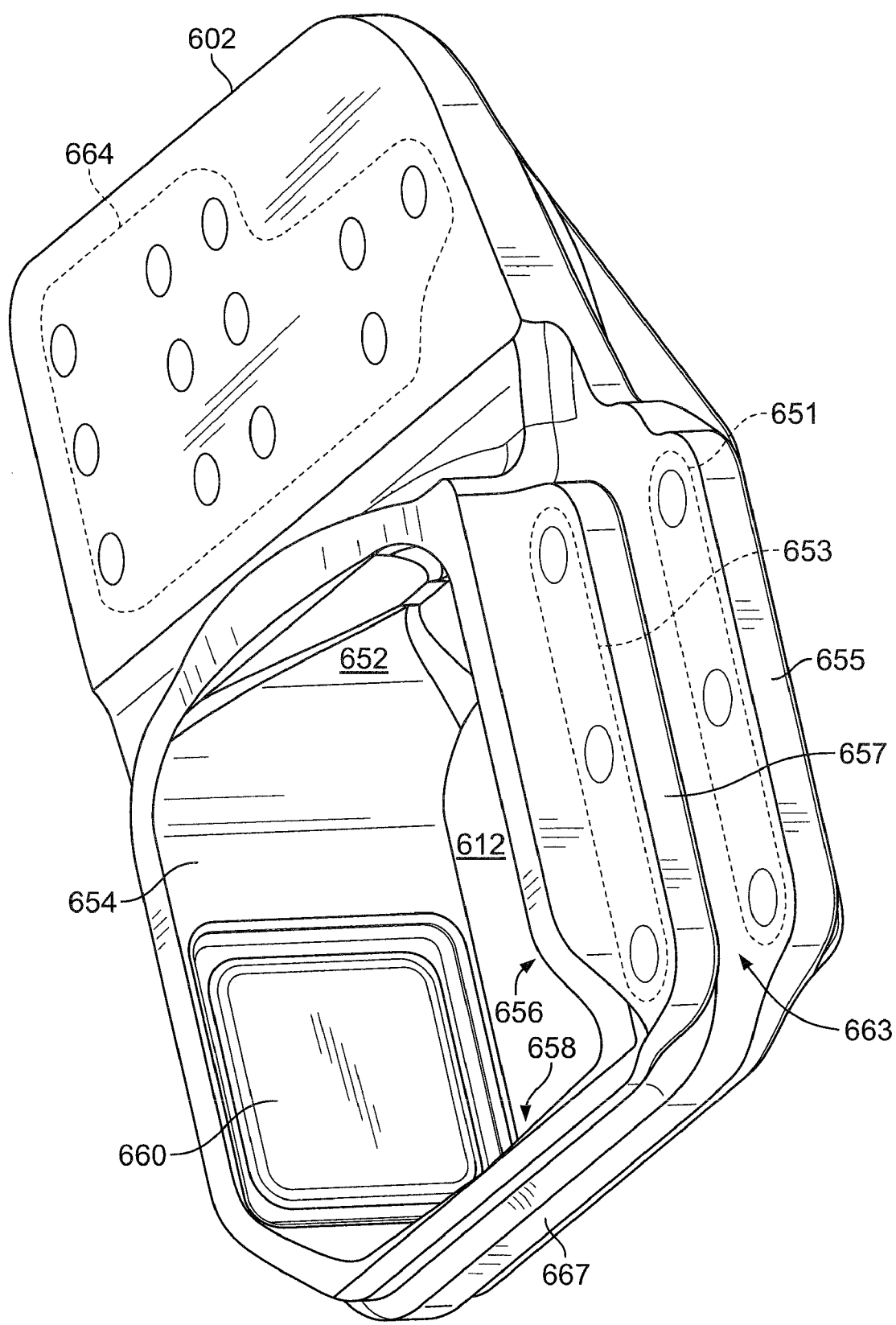

Next, FIG. 67 illustrates yet another exemplary frame hanger 602. Frame hanger 602 includes a window-like opening 612, defined, at least in part, by a top wall 652, side walls, 654, 656, and a bottom wall 658. Side wall 654 may include a pocket 660, and side wall 656 may include another pocket (not shown). The pockets of side walls 654, 656 may be arranged and function like pockets 92. Frame hanger 602 includes flanges 655, 657 that are positioned on either side of a tie-plate channel 663. Flange 655 includes a set of attachment holes 651, and flange 657 includes a set of attachment holes 653. Frame hanger 602 further includes a set of attachment holes 664. The set of attachment holes 664 may correspond to a set of attachment holes in a frame rail (e.g., frame rail 52). Any of a variety of fasteners may be inserted through the sets of attachment holes 664 and the set of attachment holes in the frame rail so as to attach frame hanger 602 to the frame rail. These fasteners may be removed to un-attach (e.g., remove) frame hangers 602, 604 from the frame rail.

A suspension assembly (e.g., suspension assembly 50, shown in FIG. 1) may be arranged in a configuration that includes frame hangers 602, 604. For example, the left-most frame hanger assembly 54 may be substituted with frame hanger 602, and the right-most frame hanger assembly 54 may be substituted with frame hanger 604. In such an arrangement, the end of tie-plate portion 650 may be inserted into tie-plate channel 663 such that a set of fasteners may be inserted through sets of attachment holes 651, 652, 653 to attach frame hangers 602, 604 to each other. In a suspension assembly comprising frame hangers 602, 604, frame hangers 602, 604 may each include a spring mount (e.g., spring mount 70), a progressive spring rate load cushion (e.g., load cushion 72), and a pair of shear springs (e.g., shear springs 68).

In another arrangement, a suspension assembly (e.g., suspension assembly 50) may be arranged in a configuration that includes frame hangers 502, 604. For example, the left-most frame hanger assembly 54 may be substituted with frame hanger 502, and the right-most frame hanger assembly 54 may be substituted with frame hanger 604. In such an arrangement, the end of tie-plate portion 650 may be positioned next to flange 553 such that a set of fasteners may be inserted through sets of attachment holes 551, 652 to attach frame hangers 502, 604 to each other. In a suspension assembly comprising frame hangers 502, 604, frame hangers 502, 604 may each include a spring mount (e.g., spring mount 70), a progressive spring rate load cushion (e.g., load cushion 72), and a pair of shear springs (e.g., shear springs 68).

In yet another arrangement, a suspension assembly (e.g. suspension assembly 50) may be arranged in a configuration that includes frame hanger 602, a frame hanger that is a mirror image of frame hanger 602, and a tie-plate (e.g., tie-plate 506) that may be inserted into the tie-plate channels 663 of these frame hangers and attached to the frame hangers via a set of fasteners. The frame hangers of this exemplary arrangement may each include a spring mount (e.g., spring mount 70), a progressive spring rate load cushion (e.g., load cushion 72), and a pair of shear springs (e.g., shear springs 68).

Returning to FIG. 66, if tie-plate portion 650 is considered to be on the left-hand side of frame hanger 604, frame hanger 604 may be arranged to include exterior side wall portions on the right-hand side of frame hanger 604 and another tie-plate portion (not shown) that extends away from the right-hand side exterior side wall portions. In this regard, the right-hand side of frame hanger 604 may be the mirror image of the left-hand side of frame hanger 604. This arrangement of frame hanger 604 may be used within a suspension assembly including three frame hangers (e.g., suspension assembly 200 shown in FIG. 22). For example, a frame hanger with the two tie-plate portions may be a center frame hanger that attaches to (i) a left-side frame hanger arranged like frame hanger 502 or 602, and (ii) a right-side frame hanger arranged like frame hanger 504 or a mirror image of frame hanger 602. Alternatively, the frame hanger with the two tie-plate portions may attach to two frame hangers arranged like frame hanger 580.

In accordance with yet another exemplary embodiment, a suspension assembly may comprise a single-casting including (i) a first frame hanger portion to house a spring mount, a progressive spring rate load cushion, and a pair of shear springs, (ii) a second frame hanger portion to house another spring mount, another progressive spring rate load cushion, and another pair of shear springs, and (iii) a portion of the casting that extends from the first frame hanger portion to the second frame hanger portion. For purposes of this description, this suspension assembly is referred to as a single-casting suspension assembly.

One benefit of using the single-casting suspension assembly as compared to a suspension assembly without a tie-plate or tie-plate portion is that fewer fasteners and/or smaller fasteners may be used to attach the single-casting suspension assembly to a frame rail. This same benefit may also result from using the suspension assembly 500, using the frame hangers 502, 580 and tie-plate 506 in a suspension assembly, or using the frame hangers 602, 604 in a suspension assembly.

The suspension assembly 500 may have one or more benefits that do not arise from using the single-casting suspension assembly. As an example, suspension assembly 500 permits removal and replacement of one of the frame hangers 502, 504 without having to remove and replace the other frame hanger, whereas if the first or second frame hanger portions of the single-casting needs to be replaced, then the entire single-casting suspension assembly may need to be replaced. As another example, a smaller tool may be used to manufacture frame hangers 502, 504 as compared to a larger tool that may be required to manufacture the single-casting suspension assembly. The cost of the smaller tool may be less than the cost of the larger tool. Other benefits of using suspension assembly 500 as compared to the single-casting suspension assembly are also possible.

While the frame hangers illustrated in FIGS. 64 through 67 depict that the sets of attachment holes for attaching the frame hangers to a tie-plate or to a tie-plate portion of another frame hanger have three holes, a person having ordinary skill in the art will understand that since the sets of attachment holes of tie-plate 506 may include greater or less than three holes, then the sets of attachment holes of these frame hangers may also include greater or less than three holes.

Figure 68:
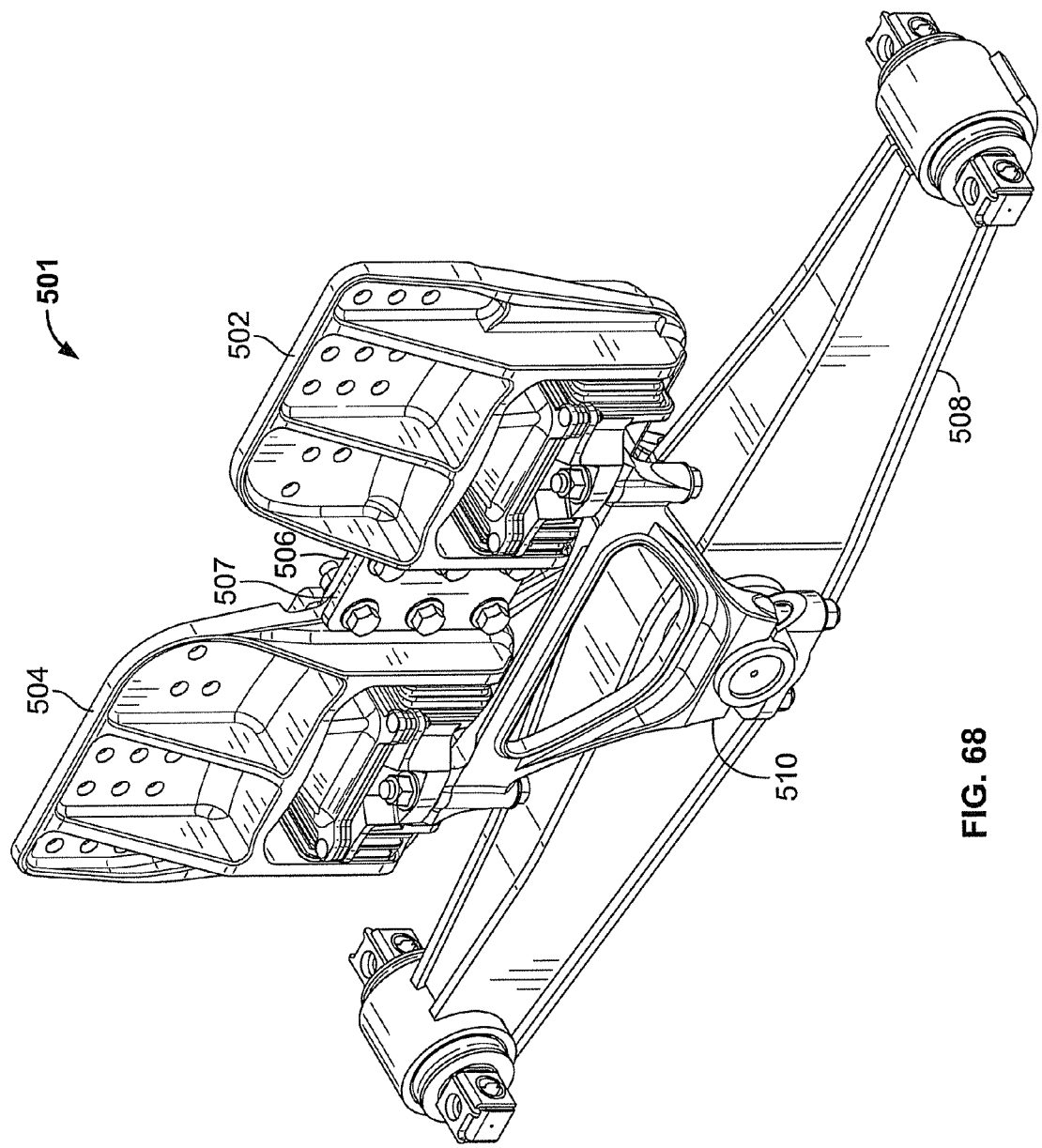
FIG. 68 illustrates an exemplary suspension assembly.

Next, FIG. 68 illustrates an exemplary suspension assembly 501. Similar to suspension assembly 500 that is shown in FIG. 61, suspension assembly 501 includes frame hangers 502, 504, tie-plate 506, walking beam 508, and a saddle assembly 510. Additionally, suspension assembly 501 includes a tie-plate 507 on the outboard-side of frame hangers 502, 504. In an alternative embodiment, tie-plates 506, 507 may be stacked next to each other and attached to either the inboard-side or the outboard-side of the flanges of frame hangers 502, 504. In this regard, tie-plate 506 may abut either the inboard or outboard flanges of frame hangers 502, 504, and tie-plate 507 may abut tie-plate 506.

Figure 69:
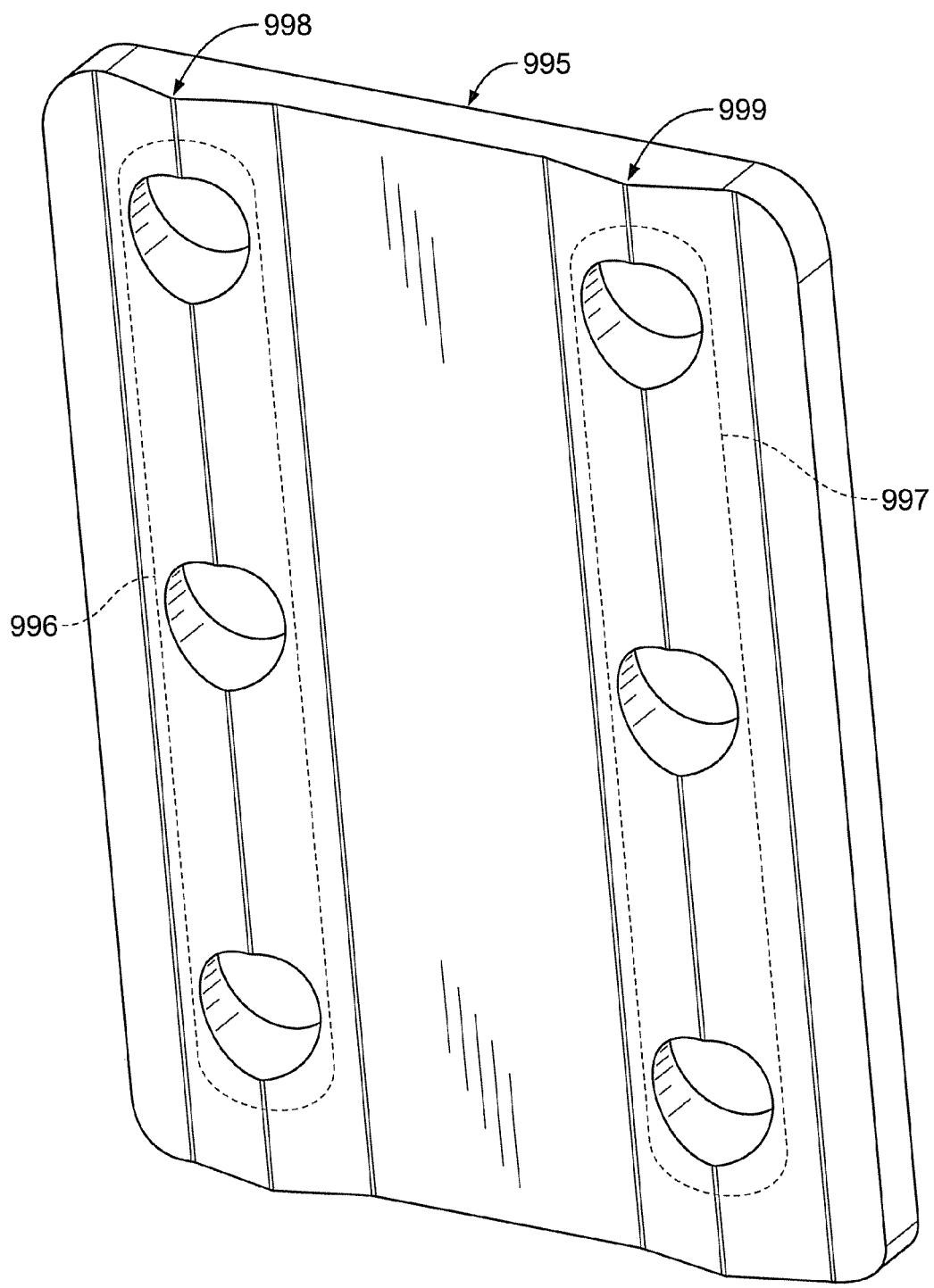
FIG. 69 illustrates an exemplary tie-plate having male-portions.
Figure 70:
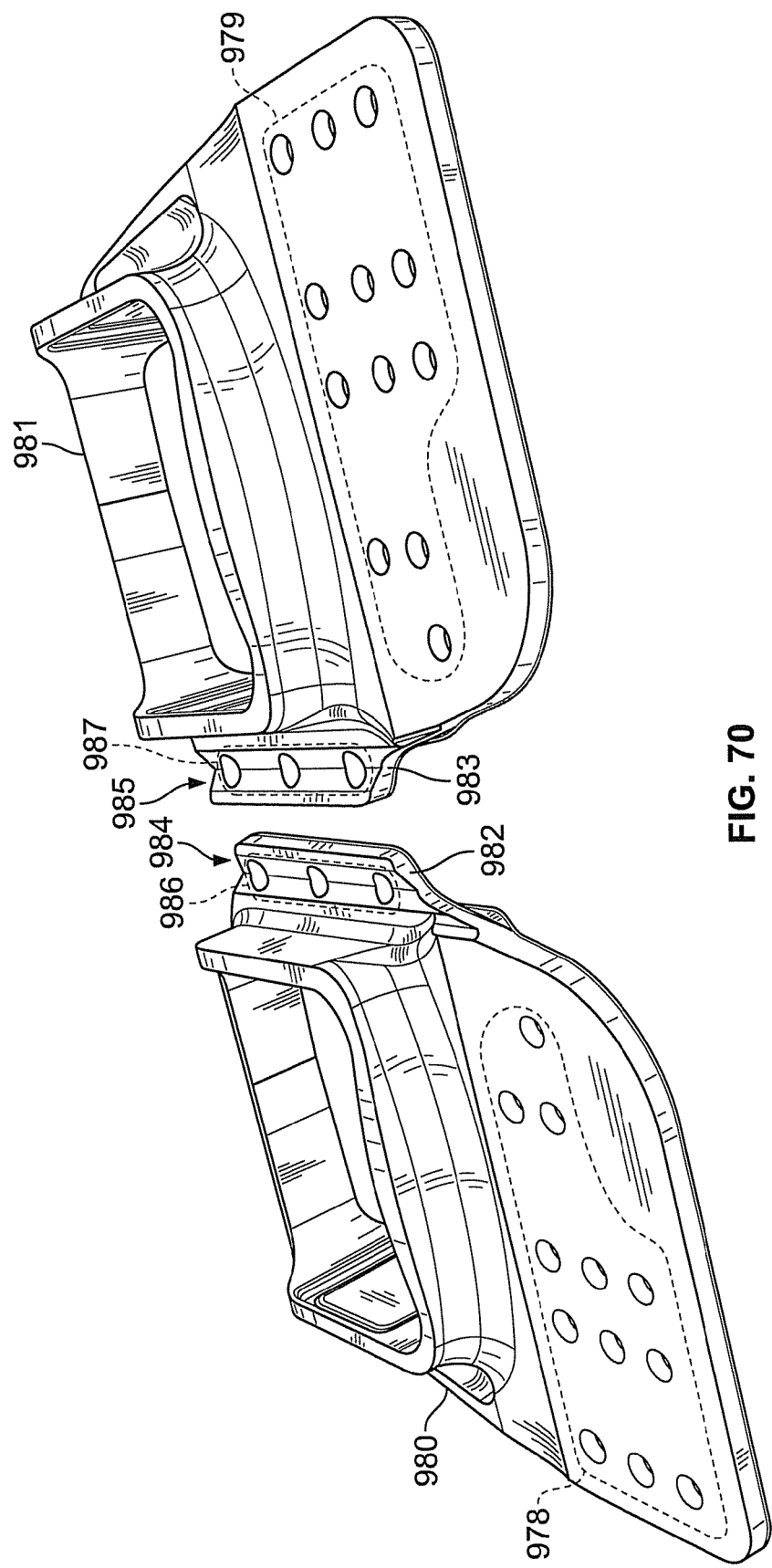
FIG. 70 illustrates a pair of exemplary frame hangers.

Next, FIG. 69 illustrates another exemplary tie-plate 995. Tie-plate 995 includes a front side having male-portions 998, 999 that may be used to form mechanical joints when tie-plate 995 is attached to two frame hangers that include corresponding female-portions of the mechanical joints. An example of these two frame hangers is shown in FIG. 70. Tie-plate 995 also includes a rear side that may be flat, such as a flat side of tie-plate 506 shown in FIG. 62. A set of attachment holes 996 is located at male portion 998, and another set of attachment holes 997 is located at male-portion 999. Sets of attachment holes 996, 997 may comprise through-holes that pass from the first side to the second side of tie-plate 995. Alternatively, sets of attachment holes 996, 997 may extend only a portion of the way through tie-plate 995. Sets of attachment holes 996, 997 may be threaded or un-threaded.

Tie-plate 995 may be symmetrical with respect to horizontal and vertical center lines passing through tie-plate 995. As shown in FIG. 69, the sets of attachment holes 996, 997 each include three holes. In an alternative embodiment, the sets of attachment holes 996, 997 may each include a number of holes less than three (e.g., one or two holes) or a number of holes greater than three.

Tie-plate 995 may be made from any of a variety of materials. For example, tie-plate 995 may be made from steel, such as a high-strength and low-alloy steel. As another example, tie-plate 995 may be made from iron, aluminum, carbon fiber, or some other material or combinations of material.

Next, FIG. 70 illustrates exemplary frame hangers 980, 981. As illustrated in FIG. 70, frame hanger 980 includes (i) a flange 982, (ii) a female-portion 984 that may be used to form a mechanical joint when tie-plate 995 is inserted and/or attached to frame hanger 980, and (iii) a set of attachment holes 986 located at female-portion 984. Similarly, frame hanger 981 includes (i) a flange 983, (ii) a female-portion 985 that may be used to form a mechanical joint when tie-plate 995 is attached to frame hanger 981, and (iii) a set of attachment holes 987 located at female-portion 985. In particular, the mechanical joints may be formed when the male-portions 998, 999 are inserted into the female-portions 984, 985.

Flanges 982, 983 each include a respective inboard-side and outboard-side. FIG. 70 illustrates the inboard-sides of flanges 982, 983. In an alternative embodiment, a female-portion similar to female-portion 984 may be located on the outboard-side of flange 982, and another female-portion similar to female-portion 985 may be located on the outboard-side of flange 983. In yet another alternative embodiment, the inboard and outboard sides of flanges 982, 983, may each include a respective female-portion of a mechanical joint that may be used to form multiple mechanical joints when a tie-plate, such as tie-plate 995, is attached to the inboard sides of frame hangers 980, 981, and another tie-plate, such as tie-plate 995, is attached to the outboard sides of frame hangers 980, 981.

Similar to other frame hangers described in this description, frame hangers 980, 981 may each include a window-like opening in which a spring mount, a progressive spring rate load cushion, and a pair of shear springs may be installed. The window-like opening in frame hangers 980, 981 may be defined by four walls that are similar to any of the other frame hangers described in this description. Similar to other frame hangers described in this description, frame hangers 980, 981 may be removably attached to a frame rail and a saddle assembly, which in turn is removably attached to a walking beam. Frame hangers 980, 981 may include sets of attachment holes 978, 979, respectively, to provide holes through which fasteners may be inserted for attaching frame hangers 980, 981 to a frame rail.

Tie-plate 995 is removably attachable to frame hangers 980, 981. Any of a variety of fasteners may be used to attach tie-plate 995 to frame hangers 980, 981. The first side of tie-plate 995 may be symmetrical such that either of male-portions 998, 999 may abut either of female portions 984, 985. While tie-plate 995 is attached to frame hangers 980, 981, if one of the frame hangers 980, 981 (e.g., frame hanger 980) needs to be removed for any reason, the fasteners used to attach tie-plate 995 to frame hanger 980 may be removed from frame hanger 980 and tie-plate 995 so as to allow frame hanger 980 to be removed from a suspension assembly that includes frame hangers 980, 981.

Figure 72:
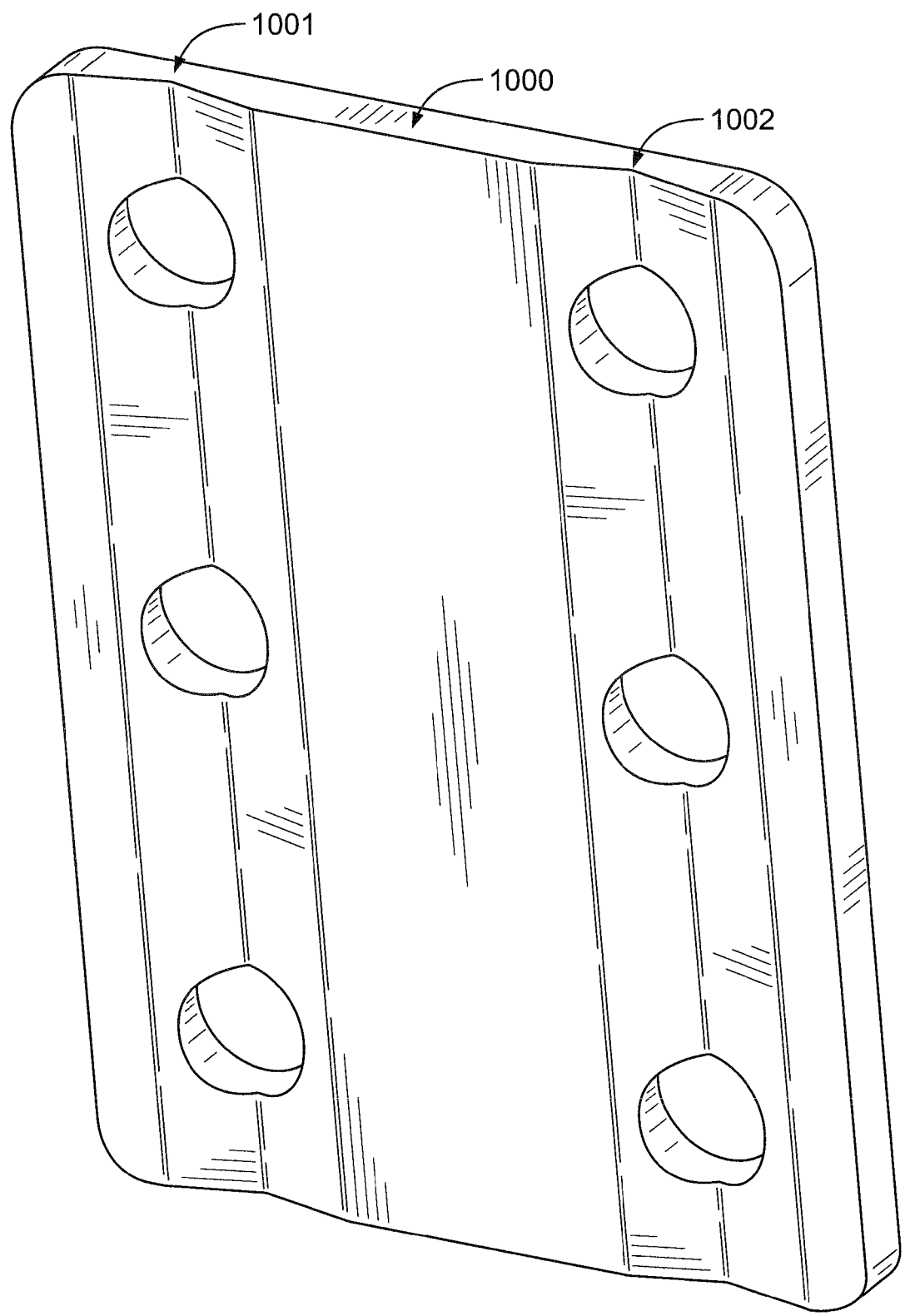
FIG. 72 illustrates an exemplary tie-plate having female-portions.

The mechanical joints that may be formed by abutting female-portions 984, 985 against male-portions 998, 999 may reduce the amount of shear force that is applied to fasteners that are inserted into sets of attachment holes 986, 987, 996, 997. A person having ordinary skill in the art will understand the other arrangements of mechanical joints formed by a tie-plate and a frame hanger are also possible. For example, another mechanical joint arrangement may be carried out by using (i) a tie-plate that includes female-portions of the mechanical joints in the locations where tie-plate 995 includes male-portions 998, 999, and (ii) frame hangers that include male-portions of the mechanical joint in the locations where frame hangers 980, 981 include female-portions 984, 985. FIG. 72 illustrates a tie-plate 1000 that comprises female-portions 1001, 1002 that may receive the male-portions of two frame hangers so as to form two mechanical joints.

As another example, a female-portion used for a mechanical joint may not extend to the ends of a tie-plate or to the ends of a frame hanger flange. In accordance with this example, the ends of the tie-plate or the ends of the frame hanger flange may be flat with respect to other portions of the tie-plate or frame hanger flange. In this way, the male-portions may be inserted into the female-portions and held in place while fasteners are inserted into sets of attachment holes within the male and female portions. This arrangement of the female-portions and male-portions may provide for easier attachment of the tie-plate to the frame hangers.

Figure 71:
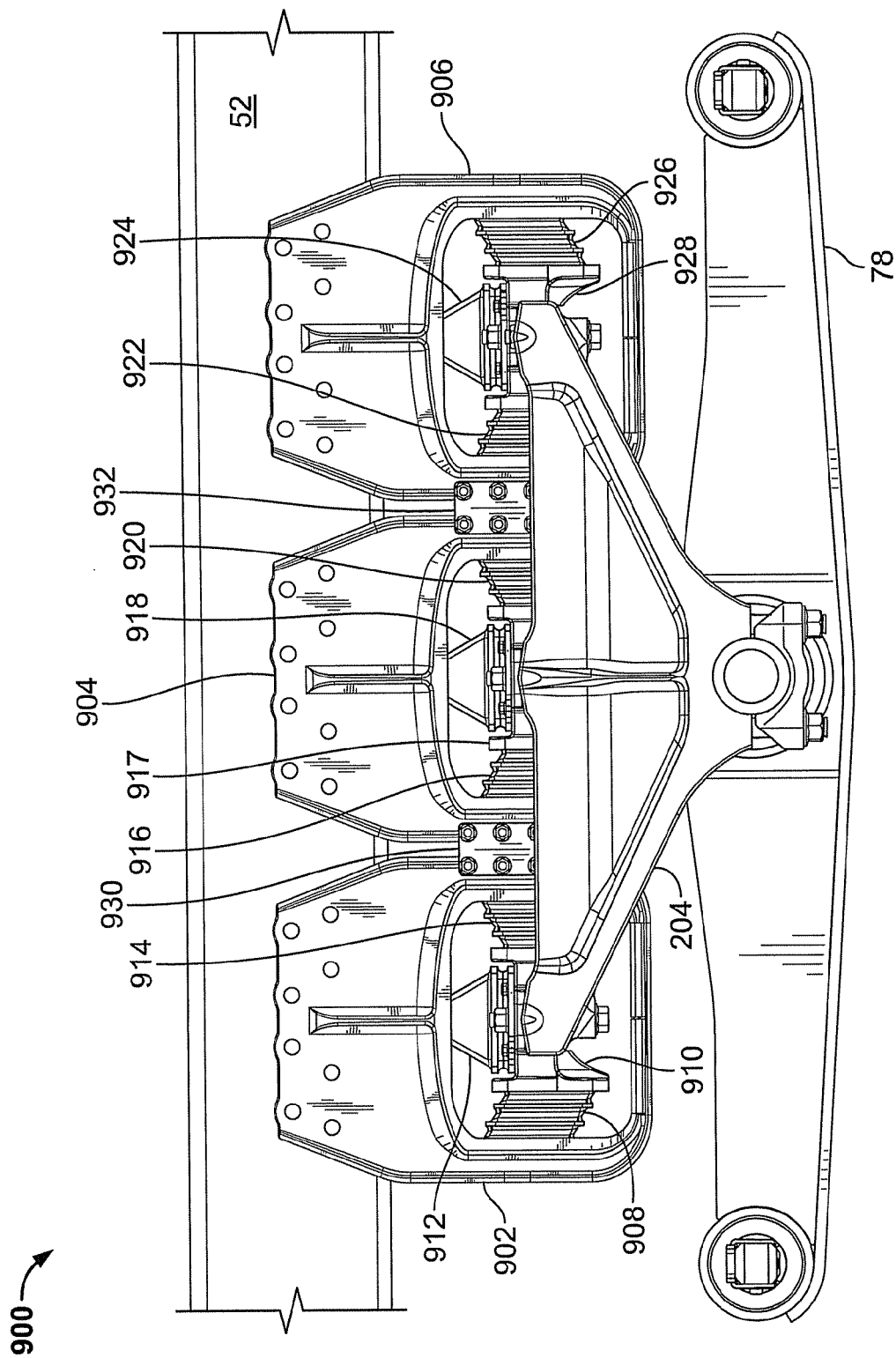
FIG. 71 illustrates an exemplary suspension assembly.

Next FIG. 71 illustrates an exemplary suspension assembly 900. The outboard-side of suspension assembly 900 is shown in FIG. 71. Suspension assembly 900 includes frame hangers 902, 904, 906, saddle assembly 204, walking beam 78, a tie-plate 930, which is attached to adjacent frame hangers 902, 904, and a tie-plate 932, which is attached to adjacent frame hangers 904, 906. Tie-plates 930, 932 may be configured like tie-plate 506, tie-plate 995, or tie-plate 1000.

Frame hangers 902, 904, 906 may each comprise one or more flanges including a respective set of attachment holes corresponding to a set of attachment holes in a tie-plate. As an example, the flanges on frame hangers 902, 904, 906 may be arranged like the flanges of frame hanger 502, 504, 580, 602, 980, or 981. Although FIG. 71 illustrates tie-plates 930, 932 attached to the outboard-side of frame hangers 902, 904, 906, in an alternative arrangement, tie-plates 930, 932 may be attached to the inboard-side of frame hangers 902, 904, 906. In yet another alternative arrangement, tie-plates may be attached to both the inboard and outboard sides of frame hangers 902, 904, 906. In still yet another alternative arrangement, a respective stack of tie-plates may be attached to the inboard-side, the outboard-side, or the inboard and outboard sides of adjacent frame hangers of suspension assembly 900.

Frame hanger 902 comprises a spring mount 910, a progressive spring rate load cushion 912, and shear springs 908, 914 on opposing sides of spring mount 910. Frame hanger 904 comprises a spring mount 917, a progressive spring rate load cushion 918, and shear springs 916, 920 on opposing sides of spring mount 917. Frame hanger 906 comprises a spring mount 928, a progressive spring rate load cushion 924, and shear springs 922, 926 on opposing sides of spring mount 928. The spring mount, load cushion, and shear springs of frame hangers 902, 904, 906 may be arranged like any spring mount, load cushion, and shear springs described for another frame hanger within this description.

Saddle assembly 204 is removably attachable to spring mounts 910, 917, 928 by one or more fasteners at each of the spring mounts. Saddle assembly 204 in FIG. 71 may be arranged as the saddle assembly 204 shown in FIG. 22. Similarly, walking beam 78 in FIG. 71 may be arranged as the walking beam 78 shown in FIG. 22.

As shown in FIG. 71, suspension assembly 900 is attached to frame rail 52 via a plurality of fasteners. Suspension assembly 900 may removed from frame rail 52 for servicing suspension assembly 900. Alternatively, individual portions of suspension assembly 900 may be removed from frame rail 52 while other portions of suspension assembly 900 remain attached to frame rail 52. For example, frame hanger 904 may be removed from frame rail 52 and suspension assembly 900 by (i) removing tie-plates 930, 932, (ii) removing the fastener(s) that attach the spring mount of frame hanger 904 to saddle assembly 204, and (iii) removing the fasteners used to attach frame hanger 904 to frame rail 52.

In an alternative embodiment, the suspension assembly 900 may be modified so as to include one or more additional frame hangers. In this modified suspension assembly, saddle assembly 204 may be extended to reach the spring mounts contained within the left-most and right-most frame hangers. Additionally, in this modified suspension assembly, one or more additional tie-plates may be added so that a tie-plate is attached to each adjacent pair of frame hangers.

3. Exemplary Operating Characteristics

Figure 24A:
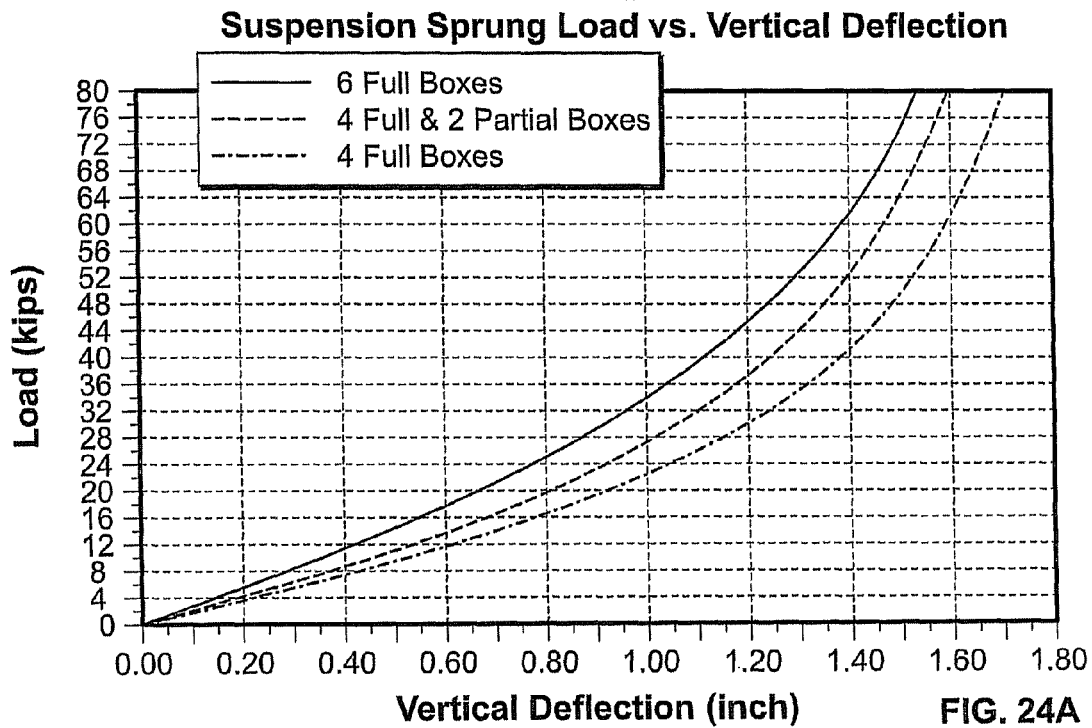
FIGS. 24A and 24B are graphical representations pertaining to the operating characteristics of suspensions constructed in accordance with principles disclosed herein.

FIG. 24A illustrates a graphical representation of operating characteristics that may be obtained for certain embodiments of the suspensions of the type illustrated in FIGS. 1, 22 and 23, respectively. FIG. 24A illustrates suspension sprung load as a function of vertical deflection. As shown, this function is initially generally linear increasing progressively until the amount of vertical deflection begins to taper off as load increases.

Figure 24B:
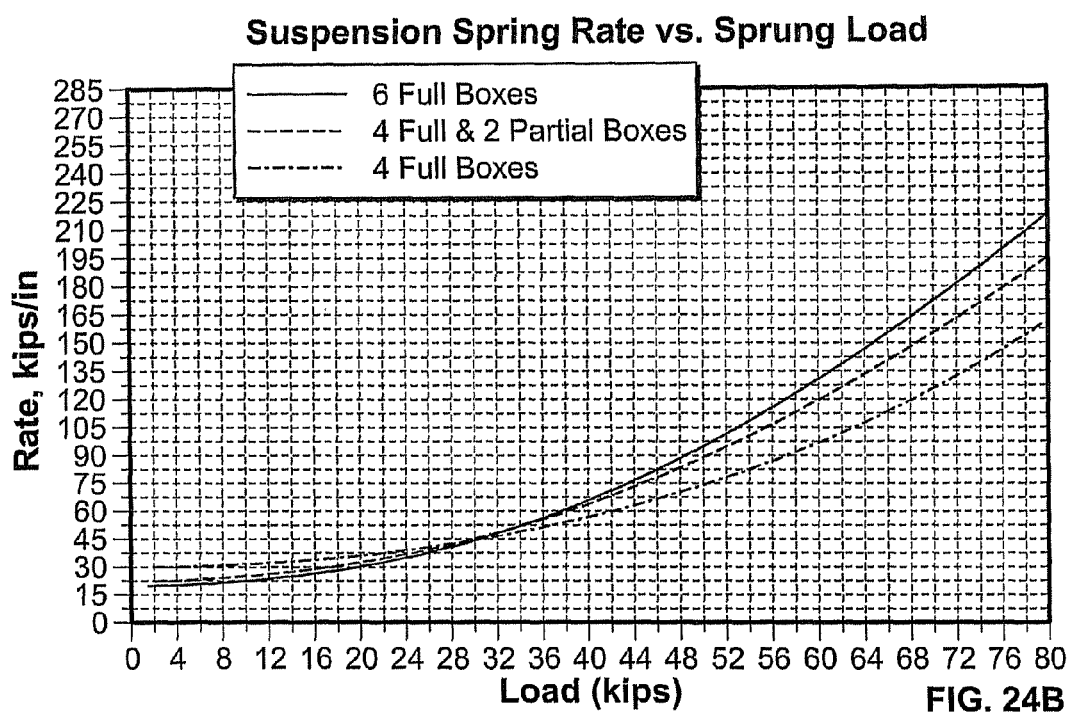

FIG. 24B illustrates a graphical representation of other operating characteristics that may be obtained for certain embodiments of the suspensions of the type illustrated in FIGS. 1, 22 and 23, respectively. FIG. 24B illustrates suspension spring rate as a function of suspension sprung load. As shown, the suspensions have a continuously increasing spring rate (curvilinear and with no discontinuities) as a function of load. Moreover, due to the preferred pyramidal shape of the progressive spring rate load cushions 72 used in these suspensions, the spring rate increases almost linearly with increasing load. There are no abrupt changes in the vertical spring rate, as is the case with elastomeric spring suspensions utilizing auxiliary springs. These operational characteristics resemble the operational characteristics exhibited by pneumatic suspensions, not mechanical suspensions of this type. Accordingly, these suspensions exhibit excellent roll stability without compromising ride quality.

Figure 54:
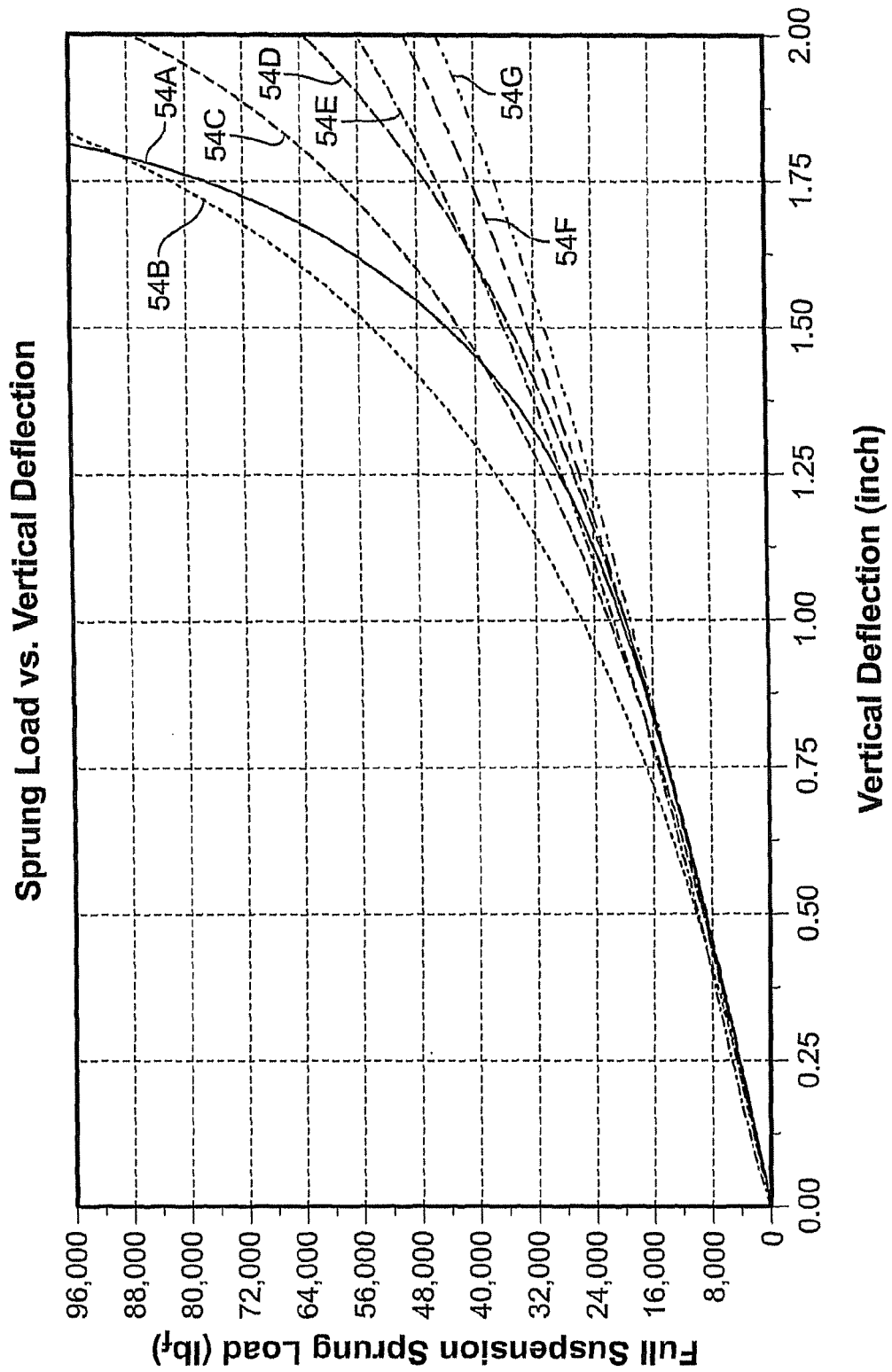
FIG. 54 is a graphical representation of operating characteristics obtainable with suspensions constructed in accordance with the principles disclosed herein.

FIG. 54 illustrates a graphical representation of similar operating characteristics that may be obtained for embodiments employing the suspensions described herein. In this regard, employing the suspensions refers to employing the described suspension on both the left side and right side of the vehicle. FIG. 54 illustrates suspension sprung load as a function of vertical deflection. As shown, this function is initially generally linear increasingly progressively until the amount of vertical deflection begins to taper off as load increases. Line 54A is for an embodiment employing the suspension 50 illustrated in FIG. 1.

Lines 54B, 54C, and 54D are for an embodiment employing a suspension including the frame hanger assembly 330. For lines 54B, 54C, and 54D, the load cushion 348 includes the rate plate 402, and the durometer of the cushion material 404 is 70. For line 54B, a 0.5 inch shim plate (or multiple shim plates equaling 0.5 inches) is inserted between the load cushion 348 and the spring mount 346. For line 54C, a 0.25 inch shim plate (or multiple shim plates equaling 0.25 inches) is inserted between the load cushion 348 and the spring mount 346. For line 54D, no shim plates are inserted between the load cushion 348 and the spring mount 346.

Lines 54E, 54F, and 54G are for an embodiment employing a suspension including the frame hanger assembly 330. For lines 54E, 54F, and 54G, the load cushion used within the frame hanger assembly 330 does not include a rate plate, but the height of the load cushion is the same as the load cushion 348 used in the embodiment for lines 54B, 54C, and 54D. In this regard, the frame hanger assembly may be used with the load cushion 72. The durometer of the load cushion material for lines 54E, 54F, and 54G is 65. For line 54E, a 0.5 inch shim plate (or multiple shim plates equaling 0.5 inches) is inserted between the load cushion and the spring mount. For line 54F, a 0.25 inch shim plate (or multiple shim plates equaling 0.25 inches) is inserted between the load cushion and the spring mount. For line 54G, no shim plate(s) is/are inserted between the load cushion and the spring mount.

The suspension spring rate as a function of suspension sprung load may be customized to achieve a desired ride quality. For instance, for each of the suspension embodiments of the systems illustrated in FIGS. 1, 22, 23, and 26, a shim plate or multiple shim plates may be inserted between the mount and the load cushions 72, 348. The shim plates raise an operating height of the load cushions 72, 348 such that loading of load cushions 72, 348 begins for a lighter load as compared to loading of the load cushions when the shim plates are not used. In a preferred arrangement, the shim plate(s) are the same shape and size as a base plate used within the load cushions 72, 348. In this way, the fasteners used to attach the load cushions 72, 348 or perhaps longer fasteners may be used to secure the shim plate(s) between a mount and a load cushion.

Additionally, a given suspension employing frame hangers 300 or 330, in accordance with a given embodiment, may have and/or provide, but is not limited to having and/or providing, one or more of the following characteristics: (i) a continuously increasing spring rate (curvilinear and with no discontinuities) as a function of an increasing load applied to the given suspension, (ii) an almost linearly increasing spring rate as a function of increasing load applied to the given suspension, (iii) minimal interaxle brake load transfer and/or improved articulation due to a pivot point created at a center bushing of an equalizing beam indirectly attached to the frame hangers 300 or 330, (iv) minimal or no tensile loading to one or more springs of the given suspension, (v) improved durability due to a reduced number of fasteners, mechanical joints that reduce the criticality of fastener preloads, and the elimination of tensile loading in one or more springs of the given suspension, (vi) good ride quality on a lightly loaded chassis without sacrificing roll stability at rated chassis load, (vii) no restrictions with regards to the usage of tire chains, and (viii) no abrupt change in spring rate due to engagement or disengagement of an auxiliary spring as the vehicle employing the given suspension encounters moderate to large variations in roadway or operating conditions.

4. Examples of Additional Embodiments

The following clauses, enumerated within parenthesis, describe additional embodiments.

(1) A load cushion for a suspension system, the load cushion comprising:

a cushion portion comprising a given material; and a base plate having a top side, a bottom side, and multiple edges, wherein the cushion portion extends away from the top side of the base plate and has at least one vertical cross section having two tapering edges.

(2) The load cushion of clause (1), wherein the given material comprises an elastomeric material.

(3) The load cushion of clause (1), wherein the given material comprises a viscoelastomeric material.

(4) The load cushion of clause (1), wherein the given material comprises a material selected from the group consisting of: (i) urethane, and (ii) polyurethane.

(5) The load cushion of clause (1), (2), (3) or (4), wherein the cushion portion is bonded to the base plate.

(6) The load cushion of clause (1), (2), (3), (4) or (5), wherein the cushion portion is pyramidal in shape and has a top surface that is parallel to the top side of the base plate.

(7) The load cushion of clause (1), (2), (3), (4), (5) or (6),
wherein portions of the top side, portions of the bottom side, and portions of the multiple edges are used as chaplets to retain the base plate during manufacture of the load cushion, and
wherein the given material covers all of the base plate except for chaplets.

(8) The load cushion of clause (1), (2), (3), (4), (5), (6), or (7),
wherein the load cushion comprises a plurality of horizontal cross sections, and
wherein each horizontal cross section has a common shape and a respective size.

(9) The load cushion of clause (1), (2), (3), (4), (5), (6), (7) or (8), wherein the common shape is rectangular.

(10) The load cushion of clause (1), (2), (3), (4), (5), (6), (7) or (8), wherein the common shape is circular.

(11) A load cushion for a suspension system, the load cushion comprising:
 a first cushion portion;
 a second cushion portion;
 a base plate having a top side and a bottom side; and
 a rate plate having a top side and a bottom side,
 wherein the top side of the base plate is parallel to the top side of the rate plate,
 wherein the first cushion portion extends away from the top side of the rate plate and has at least one vertical cross section having two tapering edges, and
 wherein the second cushion portion is located between the base plate and the bottom side of the rate plate.

(12) The load cushion of clause (11),
 wherein the base plate has multiple edges between the top side of the base plate and the bottom side of the base plate,
 wherein the rate plate has multiple edges between the top side of the rate plate and the bottom side of the rate plate,
 wherein the second cushion portion covers the multiple edges of base plate, the bottom side of the rate plate, and the multiple edges of the rate plate, and
 wherein the second cushion portion contacts the first cushion portion.

(13) The load cushion of clause (11) or (12),
 wherein the base plate comprises at least one ear having a respective mounting hole, and
 wherein the load cushion is attachable to a spring mount via a respective fastener that is inserted through the hole of each ear and into a respective hole in the spring mount.

(14) The load cushion of clause (11), (12), or (13),
 wherein the base plate is bonded to the second cushion portion, and
 wherein the rate plate is bonded to the first cushion portion and to the second cushion portion.

(15) The load cushion of clause (11), (12), (13), or (14),
 wherein the base plate is made from a material selected from the group consisting of: (i) iron, (ii) steel, (iii) aluminum, (iv) plastic, and (v) a composite material, and
 wherein the rate plate is made from a material selected from the group consisting of: (i) iron, (ii) steel, (iii) aluminum, (iv) plastic, and (v) a composite material.

(16) The load cushion of clause (11), (12), (13), (14), or (15), wherein the first cushion portion and the second cushion portion are elastomeric.

(17) The load cushion of clause (11), (12), (13), (14), (15), or (16), wherein the first cushion portion and the second cushion portion are formed by an elastomer put into a mold that holds the base plate and the rate plate.

(18) The load cushion of clause (11), (12), (13), (14), or (15), wherein the first cushion portion and the second cushion portion made from a material selected from the group consisting of (i) a viscoelastomeric material, (ii) urethane, and (iii) polyurethane.

(19) The load cushion of clause (11), (12), (13), (14), (15), (16), (17), or (18), wherein the first cushion portion has a generally pyramidal shape with a flattened top surface.

(20) The load cushion of clause (11), (12), (13), (14), (15), (16), (17), (18) or (19),
 wherein the load cushion comprises a plurality of horizontal cross sections, and
 wherein each horizontal cross section has a common shape and a respective size.

(21) The load cushion of clause (20), wherein the common shape is rectangular.

(22) The load cushion of clause (20), wherein the common shape is rectangular.

(23) A suspension assembly comprising:
 a spring housing having a first interior wall and a second interior wall;
 a first shear spring;
 a second shear spring; and
 a spring mount;
 wherein the first shear spring is held in compression between the first interior wall and the spring mount and the second shear spring is held in compression between the second interior wall and the spring mount.

(24) The suspension assembly of clause (23),
 wherein the first shear spring includes a first end and a second end,
 wherein the second shear spring includes a first end and a second end,
 wherein the spring mount includes a first mount pocket and a second mount pocket,
 wherein the first interior wall includes a first wall pocket,
 wherein the second interior wall includes a second wall pocket,
 wherein the first end of the first shear spring is locatable within the first wall pocket,
 wherein the second end of the first shear spring is locatable within the first mount pocket,
 wherein the first end of the second shear spring is locatable within the second wall pocket, and
 wherein the second end of the second shear spring is locatable within the second mount pocket.

(25) The suspension assembly of clause (23) or (24),
 wherein the suspension assembly comprises a plurality of through-holes, and
 wherein the suspension assembly attaches to a frame rail via a plurality of u-bolts placed over the frame rail and through the plurality of through-holes.

(26) The suspension assembly of clause (23), (24), or (25), further comprising:
 a frame hanger comprising a lower wall and a side wall,
 wherein the lower wall includes a plurality of through-holes arranged in a given pattern,
 wherein the spring housing includes a plurality of holes arranged in the given pattern,
 wherein the frame hanger is attached to the spring housing via fasteners inserted into the through-holes of the lower wall and into the holes of the spring housing, and
 wherein the spring housing is attachable to a frame rail via fasteners inserted into through-holes of the side wall and into through-holes in frame rail.

(27) The suspension assembly of clause (26), further comprising:
another spring housing that is attached to the frame hanger,
wherein the other spring housing comprises another first interior wall, another second interior wall, another spring mount, another first shear spring, and another second shear spring,
wherein the other first shear spring is held in compression between the other first interior wall and the other spring mount, and
wherein the other second shear spring is held in compression between the other second interior wall and the other spring mount.

(28) The suspension assembly of clause (23), (24), (25), (26), or (27), further comprising:
a load cushion mounted to the spring mount.

(29) The suspension assembly of clause (28), wherein the load cushion comprises an elastomeric progressive spring rate load cushion.

(30) The suspension assembly of clause (28), wherein the load cushion comprises an elastomeric portion that has a pyramidal shape with a flattened top surface.

(31) The suspension assembly of clause (30),
wherein the spring housing further includes a top wall with a dome-like configuration, and
wherein the flattened top surface contacts the dome-like configuration while a load is applied to the load cushion.

(32) The suspension assembly of clause (23), (24), (25), (26), (27), (28), (29), (30), or (31), further comprising:
a first saddle assembly; and
a second saddle assembly,
wherein the spring mount comprises a first saddle interface and a second saddle interface,
wherein the first saddle assembly attaches to the spring mount at the first saddle interface, and
wherein the second saddle assembly attaches to the spring mount at the second saddle interface.

(33) The suspension assembly of clause (32),
wherein the first saddle interface includes a female portion of a first mechanical joint having a given angle,
wherein the second saddle interface forms a female portion of a second mechanical joint having the given angle,
wherein the first saddle assembly includes a male portion of the first mechanical joint having the given angle, and
wherein the second saddle assembly includes a male portion of the second mechanical joint having the given angle.

(34) The suspension assembly of clause (33), wherein the given angle is between 120 degrees and 180 degrees.

(35) The suspension assembly of clause (32), further comprising:
an equalizing beam that is attached to (i) the first saddle assembly, (ii) the second saddle assembly, (iii) a first axle, and (iv) a second axle.

(36) A modular suspension system comprising:
a first suspension assembly as recited in clause (23); and
a second suspension assembly as recited in clause (23).

(37) The modular suspension system of clause (23), (24), (25), (26), (27), (28), (29), (30), or (31) further comprising:
a first saddle assembly; and
a second saddle assembly;
wherein the first saddle assembly is attached to a first location on a spring mount of the first suspension assembly and to a first location on a spring mount of the second suspension assembly, and
wherein the second saddle assembly is attached to a second location on the spring mount of the first suspension assembly and to a second location on the spring mount of the second suspension assembly.

(38) The modular suspension system of clause (37), further comprising:
a first equalizing beam that is attached to the first saddle assembly and to the second saddle assembly,
wherein the first equalizing beam is attachable to a first axle and to a second axle.

(39) The modular suspension system of clause (38), further comprising:
a third suspension assembly as recited in clause (23);
a fourth suspension assembly as recited in clause (23);
a third saddle assembly;
a fourth saddle assembly; and
a second equalizing beam that is attached to the third saddle assembly and to the fourth saddle assembly;
wherein the third saddle assembly is attached to a first location on a spring mount of the third suspension assembly and to a first location on a spring mount of the fourth suspension assembly,
wherein the fourth saddle assembly is attached to a second location on the spring mount of the third suspension assembly and to a second location on the spring mount of the fourth suspension assembly, and
wherein the second equalizing beam is attachable to the first axle and to the second axle.

(40) The modular suspension system of clause (37), (38), or (39), further comprising:
a first load cushion mounted on the spring mount of the first suspension assembly; and
a second load cushion mounted on the spring mount of the second suspension assembly.

(41) The modular suspension system of clause (40),
wherein the first load cushion comprises a first elastomeric cushion; and
wherein the second load cushion comprises a second elastomeric load cushion.

(42) The modular suspension system of clause (41),
wherein the first elastomeric load cushion has a progressive spring rate during loading of the first elastomeric load cushion, and
wherein the second elastomeric load cushion has a progressive spring rate during loading of the second elastomeric load cushion.

(43) The modular suspension system of clause (40),
wherein the first load cushion comprises a first viscoelastomeric cushion; and
wherein the second load cushion comprises a second viscoelastomeric load cushion.

(44) The modular suspension system of clause (43),
wherein the first viscoelastomeric load cushion has a progressive spring rate during loading of the first viscoelastomeric load cushion, and
wherein the second viscoelastomeric load cushion has a progressive spring rate during loading of the second viscoelastomeric load cushion.

5. Conclusion

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims.

Furthermore, it will be appreciated that any such changes and modifications will be recognized by those skilled in the art as an equivalent to one or more elements of the following claims, and shall be covered by such claims to the fullest extent permitted by law.

Finally, the word "exemplary" is used herein to mean "serving as an example, instance, or illustration." Any embodiment described herein as "exemplary" is not necessarily to be construed as preferred or advantageous over other embodiments.

We claim:

1. A tie-plate comprising:
a first plate that is removably attachable to a first frame hanger and to a second frame hanger,
wherein the plate includes a first set of attachment holes that correspond to a set of attachment holes at the first frame hanger,
wherein the plate includes a second set of attachment holes that correspond to a set of attachment holes at the second frame hanger,
wherein the plate is adapted for attachment to the first frame hanger such that a plane containing a center line of a spring pocket within the first frame hanger and a center line of a shear-spring pocket within the second frame hanger passes through the plate,
wherein the plane is parallel or substantially parallel to a bottom of the first frame hanger and a bottom of the second frame hanger; and
wherein the center line of the spring pocket within the first frame hanger substantially coincides with the center line of the shear-spring pocket within the second frame hanger.

2. The tie-plate of claim 1,
wherein the first set of attachment holes comprises a plurality of attachment holes, and
wherein the second set of attachment holes comprises a plurality of attachment holes.

3. The tie-plate of claim 1,
wherein the first set of attachment holes comprises only one attachment hole, and
wherein the second set of attachment holes comprises only one attachment hole.

4. The tie-plate of claim 1 further comprising:
a second plate that is a given width and a given height,
wherein the first plate is the given width and the given height,
wherein the second plate includes a first set of attachment holes that correspond to the set of attachment holes at the first frame hanger,
wherein the second plate includes a second set of attachment holes that correspond to the set of attachment holes at the second frame hanger,
wherein alignment of the first set of attachment holes of the first plate and the first set of attachment holes of the second plate allows fasteners to be placed through both the first set of attachment holes of the first plate and the first set of attachment holes of the second plate, and,
wherein alignment of the second set of attachment holes of the first plate and the second set of attachment holes of the second plate allows fasteners to be placed through both the second set of attachment holes of the first plate and the second set of attachment holes of the second plate.

5. The tie-plate of claim 1,
wherein the first plate comprises a first male-portion that corresponds to a first female-portion on the first frame hanger,
wherein the first plate comprises a second male-portion that corresponds to a second female portion on the second frame hanger,
wherein the first set of attachment holes are located at the first male-portion, and
wherein the second set of attachment holes are located at the second male-portion.

6. The tie-plate of claim 5,
wherein the first male-portion and the first female-portion form a first mechanical joint when the first male-portion is placed into the first female-portion, and
wherein the second male-portion and the second female-portion form a second mechanical joint when the second male-portion is placed into the second female-portion.

7. The tie-plate of claim 1,
wherein the first plate comprises a first female-portion that corresponds to a first male-portion on the first frame hanger,
wherein the first plate comprises a second female-portion that corresponds to a second male portion on the second frame hanger,
wherein the first set of attachment holes are located at the first female-portion, and
wherein the second set of attachment holes are located at the second female-portion.

8. The tie-plate of claim 7,
wherein the first male-portion and the first female-portion form a first mechanical joint when the first male-portion is placed into the first female-portion, and
wherein the second male-portion and the second female-portion form a second mechanical joint when the second male-portion is placed into the second female-portion.

9. A tie-plate comprising:
a plate that is removably attachable to (i) a first frame hanger that comprises a first set of frame-hanger-to-frame-rail attachment holes, and (ii) a second frame hanger that comprises a second set of frame-hanger-to-frame-rail attachment holes,
wherein the plate includes a first set of attachment holes that correspond to a set of tie-plate attachment holes at the first frame hanger,
wherein the plate includes a second set of attachment holes that correspond to a set of tie-plate attachment holes at the second frame hanger, and
wherein the plate is adapted for attachment to the first frame hanger and the second frame hanger such that when the plate is attached at a position below the first set of frame-hanger-to-frame-rail attachment holes and below the second set of frame-hanger-to-frame-rail attachment holes.

10. A suspension assembly comprising:
a first frame hanger that comprises a first set of one or more attachment holes and an opening adapted to receive one or more spring elements;
a second frame hanger that comprises a second set of one or more attachment holes and an opening adapted to receive one or more spring elements;
a first tie-plate that comprises a third set of one or more attachment holes and a fourth set of one or more attachment holes;
wherein one or more first fasteners inserted through the first set of one or more attachment holes and the third set of one or more attachment holes fasten the first tie-plate to the first frame hanger, and
wherein one or more second fasteners inserted through the second set of one or more attachment holes and the fourth set of one or more attachment holes fasten the first tie-plate to the second frame hanger, and wherein when the tie-plate is attached to the first and second frame hangers the tie-plate is positioned in a plane generally parallel to frame rail attachment surfaces of the first and second frame hangers.

11. The suspension assembly of claim 10,
wherein the first frame hanger further includes a first set of frame-hanger-to-frame-rail attachment holes, and
wherein the second frame hanger further includes a second set of frame-hanger-to-frame-rail attachment holes.

12. The suspension assembly of claim 10,
wherein the first frame hanger comprises an opening defined, at least in part, by a first side wall,
wherein the first side wall includes a first pocket to retain a first end of a first shear spring,
wherein the second frame hanger comprises an opening defined, at least in part, by a second side wall,
wherein the second side wall includes a second pocket to retain a first end of a second shear spring,
wherein the first tie-plate attaches to the first frame hanger such that a plane containing a center line of the first pocket and a center line of the second pocket passes through the tie-plate,
wherein the plane is parallel or substantially parallel to a bottom of the first frame hanger, and
wherein the center line of the first pocket substantially coincides with the center line of the second pocket.

13. The suspension assembly of claim 10, wherein the first fasteners and the second fasteners are selected from the group consisting of (i) bolts and nuts, (ii) huck fasteners, (iii) rivets, (iv) screws, and (v) thread-forming screws.

14. The suspension assembly of claim 10, further comprising:
a second tie-plate that comprises a fifth set of attachment holes and a sixth set of attachment holes,
wherein the first fasteners inserted through the fifth set of attachment holes fasten the second tie-plate to the first frame hanger, and
wherein the second fasteners inserted through the sixth set of attachment holes fasten the second tie-plate to the second frame hanger.

15. The suspension assembly of claim 14, wherein the first tie-plate and the second tie-plate have similar height, width, and depth dimensions.

16. The suspension assembly of claim 14,
wherein the first frame hanger comprises a first flange including an inboard-side and an outboard-side,
wherein the second frame hanger comprises a second flange including an inboard-side and an outboard-side,
wherein the first set of attachment holes are located on the first flange,
wherein the second set of attachment holes are located on the second flange,
wherein the first tie-plate abuts the inboard-side of the first flange and the inboard-side of the second flange, and
wherein the second tie-plate abuts the outboard-side of the first flange and outboard-side of the second flange.

17. The suspension assembly of claim 14,
wherein the first frame hanger further comprises a first flange,
wherein the second frame hanger further comprises a second flange,
wherein the first set of attachment holes are located on the first flange,
wherein the second set of attachment holes are located on the second flange,
wherein the first tie-plate abuts the first flange and the second flange, and
wherein the second tie-plate abuts the first tie-plate.

18. The suspension assembly of claim 10,
wherein the first frame hanger comprises a first spring mount, a first load cushion, and a first pair of shear springs on opposing sides of the first spring mount, and
wherein the second frame hanger comprises a second spring mount, a second load cushion, and a second pair of shear springs on opposing sides of the second spring mount.

19. The suspension assembly of claim 10,
wherein the first frame hanger further comprises a first flange and a second flange that form a first tie-plate channel,
wherein the second frame hanger further comprises a third flange and a fourth flange that form a second tie-plate channel, and
wherein a portion of the first tie-plate is located within the first tie-plate channel and another portion of the first tie-plate is located within the second tie-plate channel.

* * * * *